US007201293B2

(12) United States Patent
Iizuka et al.

(10) Patent No.: US 7,201,293 B2
(45) Date of Patent: Apr. 10, 2007

(54) CONTAINER WITH PUMP FOR DISCHARGING BUBBLES

(75) Inventors: Shigeo Iizuka, Tokyo (JP); Hiroshi Mizushima, Tokyo (JP); Haruo Tsuchida, Tokyo (JP); Tadao Saito, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 162 days.

(21) Appl. No.: 10/939,568

(22) Filed: Sep. 14, 2004

(65) Prior Publication Data

US 2005/0029302 A1 Feb. 10, 2005

Related U.S. Application Data

(62) Division of application No. 10/281,099, filed on Oct. 28, 2002, now Pat. No. 6,793,100, which is a division of application No. 09/911,403, filed on Jul. 25, 2001, now abandoned, which is a division of application No. 09/626,921, filed on Jul. 27, 2000, now Pat. No. 6,299,028, which is a division of application No. 09/120,328, filed on Jul. 22, 1998, now Pat. No. 6,119,899, which is a division of application No. 08/666,574, filed as application No. PCT/JP95/02356 on Nov. 17, 1995, now Pat. No. 5,813,576.

(30) Foreign Application Priority Data

| | | |
|---|---|---|
| Nov. 17, 1994 | (JP) | 6-309550 |
| Dec. 12, 1994 | (JP) | 6-332015 |
| Feb. 24, 1995 | (JP) | 7-61876 |
| Mar. 29, 1995 | (JP) | 7-98108 |
| May 23, 1995 | (JP) | 7-149463 |
| Oct. 23, 1995 | (JP) | 7-274462 |
| Oct. 23, 1995 | (JP) | 7-274463 |
| Oct. 27, 1995 | (JP) | 7-281046 |

(51) Int. Cl.
*B67D 5/58* (2006.01)
*G01F 11/00* (2006.01)

(52) U.S. Cl. ................. 222/145.6; 222/190; 222/321.9

(58) Field of Classification Search ............. 222/145.5, 222/145.6, 190, 321.7, 321.9, 333, 401
See application file for complete search history.

(56) References Cited

U.S. PATENT DOCUMENTS

| | | | | |
|---|---|---|---|---|
| 5,271,530 | A | 12/1993 | Uehira et al. | 222/190 |
| 5,385,302 | A | 1/1995 | Foster et al. | 222/383.1 |
| 5,443,569 | A | 8/1995 | Uehira et al. | 222/190 |
| 5,813,576 | A | 9/1998 | Iizuka et al. | 222/190 |
| 6,053,364 | A | 4/2000 | van der Heijden | 222/145.6 |
| 6,220,483 | B1 * | 4/2001 | van der Heijden | 222/136 |
| 6,446,840 | B2 | 9/2002 | Ophardt et al. | 222/190 |

FOREIGN PATENT DOCUMENTS

EP 0 565 713 A1 7/1990

(Continued)

*Primary Examiner*—Joseph A. Kaufman
(74) *Attorney, Agent, or Firm*—Oliff & Berridge, PLC

(57) ABSTRACT

A pump for discharging bubbles is provided on a neck portion of a container body. The pump for discharging bubbles comprises a cylinder for liquid in which a first piston slides, a cylinder for air in which a second piston slides, a pump head on which a nozzle is provided and which is connected to the first piston and the second piston so as to drive the both pistons, a vapor-liquid mixing chamber in which liquid delivered from the cylinder for liquid and air delivered from the cylinder for air are joined and a bubbling member provided between the nozzle and the vapor-liquid mixing chamber. Liquid within the container body and outside air are pumped up to be joined in the vapor-liquid mixing chamber and the vapor-liquid is bubbled via the bubbling member to be discharged in a foamy state from the nozzle by depressing the pump head.

9 Claims, 45 Drawing Sheets

FOREIGN PATENT DOCUMENTS

| | | | |
|---|---|---|---|
| EP | 0 613 728 | A2 | 2/1994 |
| JP | U-60-163249 | | 10/1985 |
| JP | U-61-3243 | | 1/1986 |
| JP | 63-138960 | A | 6/1993 |
| JP | 5-51758 | | 7/1993 |
| JP | A-6-136411 | | 5/1994 |
| WO | WO 92/08657 | | 5/1992 |

* cited by examiner

CONTAINER WITH PUMP FOR DISCHARGING BUBBLES

This is a Division of application Ser. No. 10/281,099 filed Oct. 28, 2002 now U.S. Pat. No. 6,793,100, which is a Divisional of Ser. No. 09/911,403 filed Jul. 25, 2001 (abandoned), which is a Divisional of Ser. No. 09/626,921 filed Jul. 27, 2000 (U.S. Pat. No. 6,299,028 issued Oct. 9, 2001), which is a Divisional of Ser. No. 09/120,328 filed Jul. 22, 1998 (U.S. Pat. No. 6,119,899 issued Sep. 19, 2000), which is a Divisional of Ser. No. 08/666,574 filed Jul. 1, 1996 (U.S. Pat. No. 5,813,576 issued Sep. 29, 1998, which is a National Stage of Application No. PCT/JP95/02356 filed Nov. 17, 1995 (WO96/15952 published May 30, 1996). The entire disclosure of the prior applications is hereby incorporated by reference herein in its entirety.

FIELD OF THE INVENTION

The present invention relates to a container provided with a pump for discharging bubbles which is capable of bubbling up liquid (for instance, liquid for cleansing foam, liquid for shaving cream and the like) received in a container body to make the liquid flow in a foamy state.

BACKGROUND OF THE INVENTION

For instance, the container disclosed in International Publication No. WO92/08657 can be exemplified as a container with a pump for discharging bubbles. The container is provided with a container body for receiving liquid having a bubbling property such as a liquid detergent and a pump for discharging bubbles provided on a neck portion of the container body, and they are constructed so that, by depressing a pump head of the pump for discharging bubbles, the liquid is pumped up from the container body and the air is sucked from the outside of the carrier body to mix the liquid and the air. And then, the vapor-liquid mixture is bubbled via a net (bubbling member) provided within the pump and the bubbles are discharged from a nozzle of the pump head.

The pump for discharging bubbles has had various problems as follows.

(a) It sometimes happens that the sucked outside air intrudes into the container body to bubble the liquid, and the liquid surface within the container body is filled with the bubbles, when the bubbles are discharged.

(b) It is difficult to discharge the bubbles in a straight line form relatively for a long range.

(c) A coil spring for energizing the pump head upwards all the time is received in a region where it is in contact with the liquid, and the contact of the coil spring with the liquid may be not desirable depending on the kind of the liquid received in the container body, (d) It is not possible to change a discharging form of the bubbles.

(e) There is the possibility that only the air passes through the net (bubbling member) before the liquid passes through the net at the first stage of discharging bubbles, and the bubbles will be discharged unseemly in that case, because the liquid which has remained within the net at the last discharging is formed into larger-bubbles by flow of only the air and the large bubbles are discharged from the nozzle of the pump head.

(f) It sometimes happens that the balance of the volumes of the liquid and air to be mixed is lost and the liquid volume becomes smaller than the air volume, and accordingly the bubbling will be incomplete at the first stage of discharging bubbles.

Although the container disclosed Japanese Patent Application No. 6-136411(1994) exists as a container with a pump for discharging bubbles improved in the point of (f), it also leaves room for improvements as follows.

(g) It is difficult to change the size of bubbles (diameter of the bubbles).

(h) A measure for preventing a undesired leakage of liquid which is likely to occur when the container is overturned and so on is not complete.

(e) It sometimes happens that the bubbles adhered to the net (bubbling member) gets dry to clog the net when it is not used, and the bubbles will be formed badly hereafter.

An object of the present invention is to provide a container with a pump for discharging bubbles in which the liquid is not bubbled before it is bubbled in a bubbling member so that the container body will not be filled with bubbles; a container with a pump for discharging bubbles which is capable of discharging the bubbles in a straight line form relatively for a long range; a container with a pump for discharging bubbles in which a coil spring for energizing a pump head upwards all the time is provided in a position isolated from the liquid; a container with a pump for discharging bubbles which is capable of changing a discharging form of bubbles; a container with a pump for discharging bubble which is capable of discharging bubbles stably in a state that the size of bubbles is fixed from the first stage of discharging bubbles; a container with a pump for discharging bubbles which is capable of changing the diameter of bubbles easily; a container with a pump for discharging bubbles which is capable of preventing an undesirable leakage of liquid and a container with a pump for discharging bubbles in which the net (bubbling member) in not clogged up due to drying.

DISCLOSURE OF THE INVENTION

The first invention of the present application provides a container with a pump for discharging bubbles comprising a container body having a neck portion and a pump for discharging bubbles provided on the neck portion of the container body, wherein the pump for discharging bubbles comprises:

(a) a cylinder for liquid in which a first piston slides;

(b) a cylinder for air in which a second piston slides;

(c) a pump head on which a nozzle is provided and which is connected to the first piston and the second piston so as to drive the both pistons;

(d) a vapor-liquid mixing chamber in which liquid delivered from the cylinder for liquid and air delivered from the cylinder for air are joined; and (e) a bubbling member provided on a space between the nozzle and the vapor-liquid mixing chamber, liquid within the container body and outside air are joined in the vapor-liquid mixing chamber and joined vapor-liquid is bubbled via the bubbling member to be discharged in foamy state from the nozzle by depressing the pump head, and the pump head has a double-pipe structured comprising an inside cylinder member and an outside cylinder member which are fitted in a state that they can be rotated one another, the nozzle is provided on the outside cylinder member, the inside cylinder member is provided with a bubble flow portion positioned on the downstream side of the bubbling member, the bubble flow portion is provided with a plurality of discharging holes which vary in diameters, and the container is constructed such that the nozzle of the outside cylinder member is positioned in front of one of the discharging holes of the inside cylinder member to be communicated and the other discharging hole is closed by rotating the outside cylinder member and the inside cylinder member relatively.

By premising the first invention, the second invention of the present application provides one having a position of the outside cylinder member which makes it possible to close the nozzle without connecting the nozzles to any discharging holes of the inside cylinder member.

The third invention of the present application provides a container with a pump for discharging bubbles comprising a container body having a neck portion and a pump for discharging bubbles provided on the neck portion of the container body, wherein the pump for discharging bubbles comprises:

(a) a cylinder for liquid in which a first piston slides;

(b) a cylinder for air in which a second piston slides;

(c) a pump head on which a nozzle is provided and which is connected to the first piston and the second piston so as to drive the both pistons;

(d) a vapor-liquid mixing chamber in which liquid delivered from the cylinder for liquid and air delivered from the cylinder for air are joined; and (e) bubbling member provided between the nozzle and the vapor-liquid mixing chamber, liquid within the container body and outside air are joined in the vapor-liquid mixing chamber and the joined vapor-liquid is bubbled via the bubbling member to be discharged in a foamy state from the nozzle by depressing the pump head, and a nozzle attachment which is capable of reducing the diameter of the hole for discharging bubbles is provided on the nozzle of the pump head.

By premising the third invention, the fourth invention of the present invention provides one in which the nozzle attachment comprises a cylinder body portion provided on the nozzle and a closing body which is provided on an end of the cylinder body portion via a hinge in a state that it can be rotated to open and close the end opening of the cylinder body portion, and a discharging nozzle whose diameter is smaller than that of the end opening of the cylinder body portion is provided on the closing body.

The fifth invention of the present application provides a container with a pump for discharging bubbles comprising a container body having a neck portion and a pump for discharging bubbles provided on the neck portion of the container body, wherein the pump for discharging bubbles comprises:

(a) a cylinder for liquid in which a first piston slides;

(b) a cylinder for air in which a second piston slides;

(c) a pump head on which a nozzle is provided and which is connected to the first piston and the second piston so as to drive the both pistons;

(d) a vapor-liquid mixing chamber in which liquid delivered from the cylinder for liquid and air delivered from the cylinder for air are joined; and (e) a bubbling member provided between the nozzle and the vapor-liquid mixing chamber, and liquid within the container body and outside air are joined in the vapor-liquid mixing chamber and the vapor-liquid is bubbled via the bubbling member to be discharged in foamy state from the nozzle by depressing the pump head, and the pump head has a double-pipe structure comprising an inside cylinder member and an outside cylinder member which are fitted in a state that they can be rotated one another, the inside cylinder member is provided with a bubble flow portion positioned on the downstream side of the bubbling member and a discharging hole is provided on the bubble flow portion, the outside cylinder member is provided with the nozzle and a closing body which slides on the bubble flow portion fluid-tightly to open and close the discharging hole, and the container is constructed so that the closing body opens and closes the discharging hole by rotating the outside cylinder member against the inside cylinder member and the nozzle is positioned in front of the discharging hole when the discharging hole is opened.

The sixth invention of the present application provides a container with a pump for discharging bubbles comprising a container having a neck portion and a pump for discharging bubbles provided on the neck portion of the container body, wherein the pump for discharging bubbles comprises:

(a) a cylinder for liquid in which a first piston slides;

(b) a cylinder for air in which a second piston slides;

(c) a pump head on which a nozzle is provided and which is connected to the first piston and the second piston so as to drive the both pistons;

(d) a vapor-liquid mixing chamber in which liquid delivered from cylinder for liquid and the air delivered from the cylinder for air are joined; and (e) a bubbling member provided between the nozzle and the vapor-liquid mixing chamber, liquid within the container and outside air are joined in the vapor-liquid mixing chamber and the joined vapor-liquid is bubbled via the bubbling member to be discharged in a foamy state from the nozzle by depressing the pump head, and a closing device for opening and closing the nozzle is provided on the nozzle of the pump head.

The seventh invention of the present application provides a container with a pump for discharging bubbles comprising a container body having a neck portion and a pump for discharging-bubbles provided on the neck portion of the container body, wherein the pump for discharging bubbles comprises:

(a) a cylinder for liquid in which a first piston slides;

(b) a cylinder for air in which a second piston slides;

(c) a pump head on which a nozzle is provided and which is connected to the first piston and the second piston so as to drive the both pistons;

(d) a vapor-liquid mixing chamber in which liquid delivered from the cylinder for liquid and air delivered from the cylinder for air are joined; and (e) a bubbling member provided between the nozzle and the vapor-liquid mixing chamber, liquid within the container body and outside air are joined in the vapor-liquid mixing chamber and the joined vapor-liquid is bubbled via the bubbling member to be discharged in a foamy state from the nozzle by depressing the pump head, and a closing device comprising a cylinder body portion provided on the nozzle and a closing body which is provided on the end of the cylinder body portion via a hinge in a state that it can be swung and opens and closes an end opening of the cylinder body portion, is provided on the nozzle of the pump head.

The eighth invention of the present application provides a container with a pump for discharging bubbles comprising a container body having a neck portion and a pump for discharging bubbles provided on the neck portion of the container body, wherein the pump for discharging bubbles comprises:

(a) a cylinder for liquid in which a first piston slides;

(b) a cylinder for air in which a second piston slides;

(c) a pump head on which a nozzle is provided and which is connected to the first piston and the second piston so as to drive the both pistons;

(d) a vapor-liquid mixing chamber in which liquid delivered from the cylinder for liquid and air delivered from the cylinder for air are joined; and (e) a bubbling member provided between the nozzle and the vapor-liquid mixing chamber, liquid within the container body and outside air are joined in the vapor-liquid mixing chamber and the joined vapor-liquid is bubbled via the bubbling member to be discharged in foamy state from the nozzle by depressing the pump head, and a cap-type closing device for covering the nozzle is provided on the nozzle of the pump head and a slit is formed on a front-wall-portion of the closing device so that the front-wall-portion is elastically deformed by pressure buildup within the nozzle to be opened and the front-wall-portion is elastically returned by pressure drop within the nozzle to be closed.

The ninth invention of the present application provides a container with a pump for discharging bubbles comprising a container body having a neck portion and a pump for discharging bubbles provided on the neck portion of the container body, wherein the pump for discharging bubbles comprises:

(a) a cylinder for liquid in which a first piston slides;

(b) a cylinder for air in which a second piston slides;

(c) a pump head on which a nozzle is provided and which is connected to the first piston and the second piston so as to drive the both pistons;

(d) a vapor-liquid mixing chamber in which liquid delivered from the cylinder for liquid and air delivered from the cylinder for air are joined; and (e) a liquid discharge valve which can be attached to and detached from a valve seat provided on a liquid entrance of the vapor-liquid mixing chamber;

(f) a bubbling member provided between the nozzle and the vapor-liquid mixing chamber; and (g) a limitation member which is provided on the upper part of the valve seat of the liquid discharge valve and limits the vertical-direction-maximum-migration-length from the valve seat of the liquid-discharge valve within the range from 0.1 mm and to 1.0 mm, and liquid within the container body and outside air are joined in the vapor-liquid mixing chamber and the joined vapor-liquid is bubbled via the bubbling member to be discharged in a foamy state from the nozzle by depressing the pump head.

By premising the ninth invention, the tenth invention of the present application provides one in which the vertical-direction-maximum-migration-length of the liquid discharge valve is set up within the range of from 0.2 mm to 0.3 mm.

The eleventh invention of the present application provides a container with a pump for discharging bubbles comprising a container body having a neck portion and a pump for discharging bubbles provided on the neck portion of the container body, wherein the pump for discharging bubbles comprises:

(a) a cylinder for liquid in which a first piston slides;

(b) a cylinder for air in which a second piston slides;

(c) a pump head on which a nozzle is provided and which is connected to the first piston and the second piston so as to drive the both pistons;

(d) a coil spring which is provided within the cylinder for air and energizes the pump head in the direction away from the cylinder for air;

(e) a vapor-liquid mixing chamber in which liquid delivered from the cylinder for liquid and air delivered from the cylinder for air are joined; and (f) a bubbling member provided between the nozzle and the vapor-liquid mixing chamber, and liquid within the container body and outside air are joined in the vapor-liquid mixing chamber and the joined vapor-liquid is bubbled via the bubbling member to be discharged in a foamy state from the nozzle by depressing the pump head.

The twelfth invention of the present application provides a container with a pump for discharging bubbles comprising a container body having a neck portion and a pump for discharging bubbles provided on the neck portion of the container body, wherein the pump for discharging bubbles comprises:

(a) a cylinder for liquid in which a first piston slides;

(b) a cylinder for air in which a second piston slides;

(c) a pump head on which a nozzle is provided and which is connected to the first piston and the second piston so as to drive the both pistons;

(d) a vapor-liquid mixing chamber in which liquid delivered from the cylinder for liquid and air delivered from the cylinder for air are joined;

(e) a bubbling member fitting portion provided between the nozzle and the vapor-liquid mixing chamber; and (f) a bubbling element which is made up of nets provided extendedly on one end side opening of a short cylinder and is provided singularly or plurally in the bubbling member fitting portion so that a normal or reverse direction can be selected, and liquid within the container body and outside air are joined in the vapor-liquid mixing chamber and the joined vapor-liquid is bubbled via the bubbling member to be discharged in a foamy state from the nozzle by depressing the pump head.

The thirteenth invention of the present application provides a container with a pump for discharging bubbles comprising a container body having a neck portion and a pump for discharging bubbles provided on the neck portion of the container body, wherein the pump for discharging bubbles comprises:

(a) a cylinder member in which a cylinder for liquid and a cylinder for air inserted into the container body from the neck portion are provided to an axial direction in a concentric arrangement and which has a flange portion mounted on the neck portion;

(b) an attaching trunk which is provided on the neck portion and holds the flange portion of the cylinder member in cooperation with the neck portion;

(c) a piston head which passes through the attaching trunk in a state that it can be moved upward and downward and in which the nozzle is provided on a portion exposed from the attaching trunk;

(d) a stem which has a hollow-cylinder-shape in which upper part and lower ends are made open and is received within the cylinder member in a state that it can be moved upward and downward, and in which the upper part is connected to the piston head to be communicated with the nozzle and an annular flange portion is provided on a portion received within the cylinder for air;

(e) a first circular piston which is provided on the lower end of the stem and is capable of sliding on an internal surface of the cylinder for liquid upward and downward air-tightly;

(f) a second piston which is provided on an external surface of the stem of the piston head in a state that it can be moved upward and downward with only a little stroke, closes the opening end of the cylinder for air and has a basic cylinder portion fitted into the external surface of the stem and a seal cylinder portion which can be slid upward and downward fluid-tightly on the internal surface of the cylinder for air, and in which the upper part of the basic cylinder portion is fitted into the lower part of the piston head air-tightly, an air suction valve is provided on a connecting portion for connecting the basic cylinder portion to the seal cylinder portion and the lower part of the basic cylinder portion can be connected to the flange portion of the stem fluid-tightly;

(g) a liquid suction valve which is suspended from the stem in a state that the upper part thereof is inserted into the stem so that it can be moved upward and downward and can be moved upward and downward together with the stem by engaging with the stem, and whose lower part is inserted into the cylinder for liquid in a state that it can be moved upward and downward to make the lower end function as a lower part valve body for opening and closing the liquid entrance of the cylinder for liquid;

(h) a liquid discharge valve arranged on the upper part inside of the stem;

(i) a bubbling member received between the liquid discharge valve and the nozzle of the pump head;

(j) a vapor-liquid mixing chamber provided between the discharge valve and the bubbling member;

(k) an air passage which is provided among the piston head, the stem and the basic cylinder portion of the second piston and makes the cylinder for air communicate with the vapor-liquid mixing;

(l) a liquid passage-formed among the liquid suction valve, the internal surface of the cylinder for liquid and the internal surface of the stem;

(m) a coil spring which energizes the stem in the direction approaching the piston head; and (n) a limitation mechanism which prevents the upward movement of the liquid suction valve against the cylinder for liquid when the stem is positioned at the upper limit, and a stroke from the starting of the downward movement of the pump head when the pump head positioned at the upper limit is depressed until the pump head is moved downward synchronously with the second piston is smaller than an opening-closing stroke of the lower-part valve body of the liquid suction valve.

By premising the thirteenth invention, the fourteenth invention of the present application provides one in which the second piston is provided with an air hole which makes the inside and the outside of the cylinder for air communicate with one another, the air suction valve of the second piston is made up of an elastic material and comprises a cylinder portion fitted to the basic cylinder portion air-tightly and an annular diaphragm which is projected to the outside from the cylinder portion, and the diaphragm opens and closes the air hole of the second piston.

By premising the thirteenth invention, the fifteenth invention of the present application provides one in which the stem is provided with a taper-surface-shaped valve seat whose lower part has a small diameter in an upper part internal surface thereof, and the liquid discharge valve comprises a fitted plate which is fitted into the internal surface of the stem, a plurality of elastic pieces extending downward from the bottom surface of the fitted plate and a valve body which can be brought into contact with and separated from the valve seat of the stem and is provided on the lower end of the elastic pieces.

The sixteenth-invention of the present application provides a container with a pump for discharging bubbles comprising a container body having a neck portion and a pump for discharging bubbles provided on the neck portion of the container body, wherein the pump for discharging bubbles comprises:

(a) a cylinder member in which a cylinder for liquid and a cylinder for air inserted into the container body from the neck portion are provided in an axial direction in a concentric arrangement and which has a flange portion mounted on the neck portion, and in which an air hole which communicates with the inside of the: container body is provided on the flange portion;

(b) an attaching trunk which is provided on the neck portion and holds the flange portion of the cylinder member in cooperation with the neck portion;

(c) a piston head which passes through the attaching trunk in a state that it can be moved upward and downward and in which the nozzle is provided on the part exposed from the attaching trunk;

(d) a stem which has a hollow-cylinder-shape in which the upper and lower ends are made open and is received within the cylinder member so that it can be moved upward and downward, and in which the upper part is connected to the piston head to be linked with the nozzle and an annular flange portion is provided on a portion received within the cylinder for air;

(e) a first circular piston which is provided on the lower end of the stem and is capable of sliding on the internal surface of the cylinder for liquid upward and downward air-tightly;

(f) a second piston which is provided on the external surface of the stem of the piston head in a state that it can be moved upward and downward only a little stroke, closes the opening end of the cylinder for air and has a basic cylinder portion fitted to the external surface of the stem and a seal cylinder portion which can be slid upward and downward fluid-tightly on the internal surface of the cylinder for air, and in which the upper part of the basic cylinder portion is fitted to the lower part of the piston head air-tightly, a projecting portion is provided on the lower-part external surface of the basic cylinder portion, the lower end of the basic cylinder portion can be brought into contact with the flange portion of the stem air-tightly and an air hole for making the inside and outside of the cylinder for air communicate with one-another is provided on a connecting portion for connecting the basic cylinder portion and the seal cylinder portion;

(g) a second air suction valve which has a cylinder portion fitted to the outside of the projecting portion of the lower-part external surface in the basic cylinder portion of the second piston and an annular diaphragm having an elasticity which is projected to the diagonal upper outside direction from the lower end of the cylinder portion, and in which the diaphragm can be brought into contact with and separated from the connecting portion for connecting the basic cylinder portion and the seal cylinder portion of the second piston to open and close the air hole of the second piston;

(h) a liquid suction valve which is suspended from the stem in a state that the upper part Is inserted into the stem so that it can be moved upward and downward and is capable of moving upward and downward with the stem by engaging with the stem, and whose lower part is inserted into the cylinder for liquid in a state that it can be moved upward and downward to make the lower end function as a lower-part valve body for opening and closing the liquid entrance of the cylinder for liquid;

(i) a liquid discharge valve arranged on the upper-part inside of the stem;

(j) a bubbling member provided between the liquid discharge valve and the nozzle of the pump head;

(k) a vapor-liquid mixing chamber provided between the discharge valve and the bubbling member;

(l) an air passage which is provided among the piston head, the stem and the basic cylinder portion of the second piston and makes the cylinder for air communicate with the vapor-liquid mixing chamber;

(m) a first air suction valve which opens and closes the air passage which is linked to the air hole of the cylinder member from a space between the attaching trunk and the pump head;

(n) a liquid passage formed among the liquid suction valve, the internal surface of the cylinder for liquid and the internal surface of the stem;

(o) a coil spring which energizes the stem in the direction approaching the piston head.

The seventeenth invention of the present application provides a container with a pump for discharging bubbles comprising a container body having a neck portion and a pump for discharging bubbles provided on the neck portion of the container body, wherein the pump for discharging bubbles comprises:

(a) a cylinder member in which a cylinder for liquid and a cylinder for air inserted into the container body from the neck portion are provided in an axial direction in a concentric arrangement and which has a flange portion mounted on the neck portion, and in which an air hole which communicates with the inside of the container body is provided on the flange portion;

(b) an attaching trunk which is provided on the neck portion and holds the flange portion of the cylinder member in cooperation with the neck portion, and has a cylinder-shaped rib arranged in a position separated from the internal surface of the neck portion of the container body;

(c) a piston head which passes through the attaching trunk in a state that it can be moved upward and downward and in which the nozzle is provided on a portion exposed: from the attaching trunk;

(d) a stem which has a hollow-cylinder-shape in which the upper and lower ends are made open and is received within the cylinder member so that it can be moved upward and downward, and in which the upper part is connected to the piston head to be linked with the nozzle and an annular flange portion is provided on a portion received within the cylinder for air;

(e) a circular first piston which is provided on the lower end of the stem and is capable of sliding on the internal surface of the cylinder for liquid upward and downward air-tightly;

(f) a second piston which is provided on the external surface of the stem of the piston head in a state that it can be moved upward and downward only a little stroke, closes the opening end of the cylinder for air and has a basic cylinder portion fitted to the external surface of the stem and a seal cylinder portion which is capable of sliding upward and downward fluid-tightly on the internal surface of the cylinder for air, and in which the upper part of the basic cylinder portion is fitted to the lower part of the piston head air-tightly and the lower end of the basic cylinder portion can be brought into contact with the flange portion of the stem air-tightly;

(g) a second air suction valve which is provided on the connecting portion for connecting the basic cylinder portion and the seal cylinder portion and opens and closes between the inside and outside of the cylinder for air;

(h) a liquid suction valve which is suspended from the stem in a state that the upper part is inserted into the stem so that it can be moved upward and downward and is capable of moving upward and downward with the stem by engaging with the stem, and whose lower part is inserted into the cylinder for liquid in a state that it can be moved upward and downward to make the lower end function as a lower-part valve body for opening and closing the liquid entrance of the cylinder for liquid;

(i) a liquid discharge valve arranged on the upper-part inside of the stem;

(j) a bubbling member provided between the liquid discharge valve and the nozzle of the pump head;

(k) a vapor-liquid mixing chamber provided between the discharge valve and the bubbling member;

(l) an air passage which is provided among the piston head, the stem and the basic cylinder portion of the second piston and makes the cylinder for air communicate with the vapor-liquid mixing chamber;

(m) a first air suction valve in which a cylinder portion is fixed on the attaching trunk in a state that the cylinder portion is fitted to the cylinder-shaped rib of the attaching trunk, the seal cylinder portion is projected in the diagonal upper outside direction from the cylinder portion, the end of the seal cylinder portion is contact with the internal surface of the cylinder for air elastically with pressure, and when the inside of the container body is pressurized negatively, the seal cylinder portion is separated from the internal surface of the cylinder for air to open the air passage linked to the air hole of the cylinder member from a space between the attaching trunk and the pump head;

(n) a liquid passage formed among the liquid suction valve, the internal surface of the cylinder for liquid and the internal surface of the stem;

(o) a coil spring which energizes the stem in the direction approaching the piston head.

The eighteenth invention of the present application provides a container with a pump for discharging bubbles comprising a container body having a neck portion and a pump for discharging bubbles provided on the neck portion of the container body, wherein the pump for discharging bubbles comprises:

(a) a cylinder member in which a cylinder for liquid and a cylinder for air inserted into the container body from the neck portion are provided in an axial direction in a concentric arrangement and which has a flange portion mounted on the neck portion;

(b) an attaching trunk which is provided on the neck portion and holds the flange portion of the cylinder member in cooperation with the neck portion;

(c) a piston head which passes through the attaching trunk in a state that it can be moved upward and downward and in which the nozzle is provided on a portion exposed from the attaching trunk;

(d) a stem which has a hollow-cylinder-shape in which that the upper and lower ends are made open and is received within the cylinder member so that it can be moved upward and downward, and in which the upper part is connected to the piston head to be linked with the nozzle and an annular flange portion is provided on a portion received within the cylinder for air;

(e) a circular first piston which is provided on the lower end of the stem and is capable of sliding on the internal surface of the cylinder for liquid upward and downward air-tightly;

(f) a second piston which is provided on the external surface of the stem of the piston head in a state that it can be moved upward and downward only a little stroke, closes the opening end of the cylinder for air and has a basic cylinder portion fitted to the external surface of the stem and a seal cylinder portion which is capable of sliding upward and downward fluid-tightly on the internal surface of the cylinder for air, and in which the upper part of the basic cylinder portion is fitted to the lower part of the piston head air-tightly, the air suction valve is provided on the connecting portion for connecting the basic cylinder portion and the seal cylinder portion, and the lower end the basic cylinder portion can be brought into contact with the flange portion of the stem air-tightly;

(g) a liquid suction valve which is suspended from the stem in a state that the upper part is inserted into the stem so that it can be moved upward and downward and is capable of moving upward and downward with the stem by engaging with the stem, and whose lower part is inserted into the cylinder for liquid in a state that it can be moved upward and downward to make the upper end function as a lower-part valve body for shutting off the inside of the stem up and down when the piston head is positioned at the lower limit by depressing it, and make the lower end function as a lower-part valve body for opening and closing the liquid entrance of the cylinder for liquid.

(h) a liquid discharge valve arranged on the upper part inside of the stem;

(i) a bubbling member received between the liquid discharge valve and the nozzle of the pump head;

(j) a vapor-liquid mixing chamber provided between the discharge valve and the bubbling member;

(k) an air conduit which is provided among the piston head, the stem and the basic cylinder portion of the second piston and makes the cylinder for air communicate with the vapor-liquid mixing chamber communicate;

(l) a liquid passage formed among the liquid suction valve, the internal surface of the cylinder for liquid and the internal surface of the stem;

(m) a coil spring which energizes the stem in the direction approaching the piston head; and (n) a locking mechanism for making the piston head unmovable upward and downward against the attaching trunk in a state that the piston head is positioned at the lower limit by depressing it.

The nineteenth invention of the present application provides a container with a pump for discharging bubbles comprising:

(a) a container body having a neck portion;

(b) an attaching trunk provided on the neck portion of the container body;

(c) a cylinder member in which the upper end portion is provided and fixed on the attaching trunk, and a cylinder for liquid and a cylinder for air which are inserted into the container body from the neck portion are provided in an axial direction in a concentric arrangement;

(d) a stem which has a second piston fitted to the inside of the cylinder for air and a first piston fitted to the inside of the cylinder for liquid and which is provided on the cylinder member in a state that it is energized upward and it can be moved upward and downward freely;

(e) a pump head which is connected to the upper part of the stem, passes through the attaching trunk to be projected upward and has a nozzle in a portion exposed to the outside from the attaching trunk;

(f) a bubbling element provided in an upstream side of the nozzle of the pump head;

(g) a suction pipe whose upper end opening is connected to the lower end of the cylinder for liquid of the cylinder member and whose lower-end opening is opened to the lower-end corner portion of the inside of the container body;

(h) a direction control mechanism for directing the opening direction of the lower end of the suction pipe and the opening direction of the nozzle of the pump head to the same direction all the time to move the pump head upward and downward to the attaching trunk; and (i) an air hole to the inside of the container body which is provided on the cylinder for air and is provided in an opposite position to the opening direction of the nozzle of the pump head, and liquid within the cylinder for liquid and air within the cylinder for air are mixed by moving the pump head and the stem upward and downward, the mixed vapor-liquid passes through the bubbling element to be bubbled and the bubbled vapor-liquid is discharged from the nozzle of the pump head in a foamy state.

By premising the nineteenth invention, the twentieth invention of the present application provides one which includes a rotation preventive mechanism comprising a plurality of vertical ribs which are provided in a region that the attaching trunk is fitted to the cylinder member and are engaged mutually.

By premising the nineteenth invention, the twenty-first invention of the present application provides one in which the direction control mechanism is provided with a vertical projection and a concave groove which are provided on the window hole marginal portion of the top wall center of the attaching trunk and the peripheral portion of the pump head and are engaged mutually in a state that they can be moved upward and downward.

By premising the nineteenth invention, the twenty-second invention of the present application provides one in which the window hole of the attaching trunk is formed into a non-circular window hole, the peripheral lower part of the pump head is formed like the non-circular wall hole, and the direction control member is formed by making the non-circular members engage with one another.

By premising the nineteenth invention, the twenty-third invention of the present application provides one in which the suction pipe is formed into a cylindrical shape, and the inside of the connection cylinder of the lower end of the cylinder for liquid which fits to the upper end portion of the suction pipe is formed into a square.

The twenty-fourth invention of the present application provides a container with a pump for discharging bubbles comprising a container body having a neck portion and a pump for discharging bubbles provided on the neck portion of the container body, wherein the pump for discharging bubbles comprises:

(a) a cylinder for liquid in which a first piston slides;

(b) a cylinder for air in which a second piston slides;

(c) a pump head on which a nozzle is provided and which is connected to the first piston and the second piston so as to drive the both pistons;

(d) a vapor-liquid mixing chamber in which liquid delivered from the cylinder for liquid and air delivered from the cylinder for air are joined;

(e) a bubbling member provided between the nozzle and the vapor-liquid mixing chamber; and (f) a mouth piece which is provided on the nozzle of the pump head and whose diameter is reduced into a circular cone cylinder shape as it proceeds forward, and in which the nozzle whose inside diameter is not more than 2.0 mm is opened on the end thereof, and liquid within the container body and outside air are joined in the vapor-liquid mixing chamber and the joined vapor-liquid is bubbled via the bubbling member to be discharged in a foamy state from the nozzle by depressing the pump head.

By premising the twenty-fourth invention, the twenty-fifth invention of the present application provides one in which the bubbling member 34 is formed in a state that a net is stretched over one end opening of a short cylinder, and singular or a plurality of bubbling members can be provided on a space between the nozzle and the vapor-liquid mixing chamber in a state that a normal or reverse direction can be selected.

THE PREFERRED EMBODIMENTS OF THE INVENTION

The preferred embodiments of the present invention will be described with reference to the drawings as follows.

The Embodiment 1

The container with a pump for discharging bubbles of the embodiment 1 will be described in accordance with FIG. 1 to FIG. 9.

Figure 1:
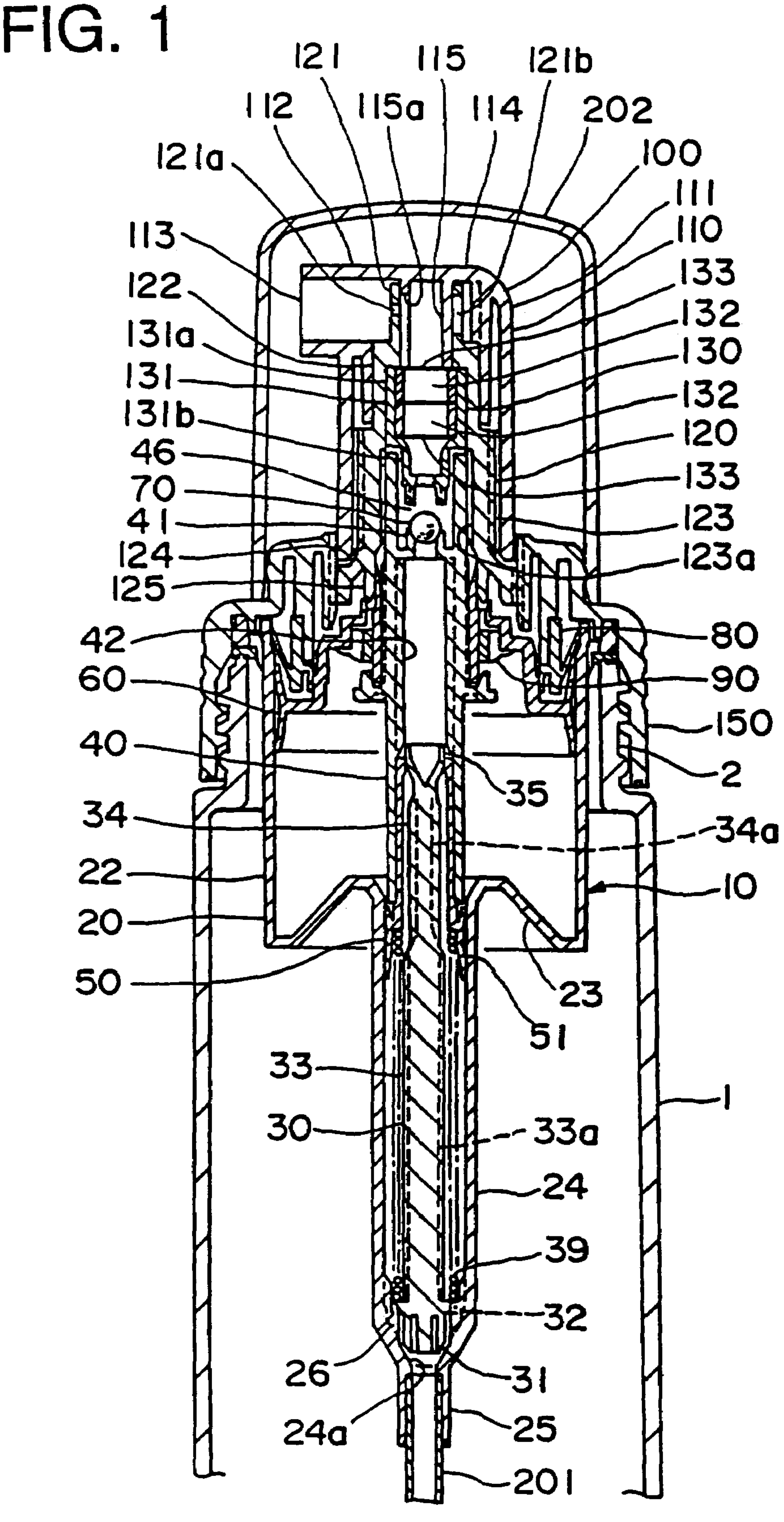
FIG. 1 is a longitudinal section diagram indicating a state that a pump head is positioned at an upper limit in a container with a pump for discharging bubbles of the embodiment 1.
Figure 2:
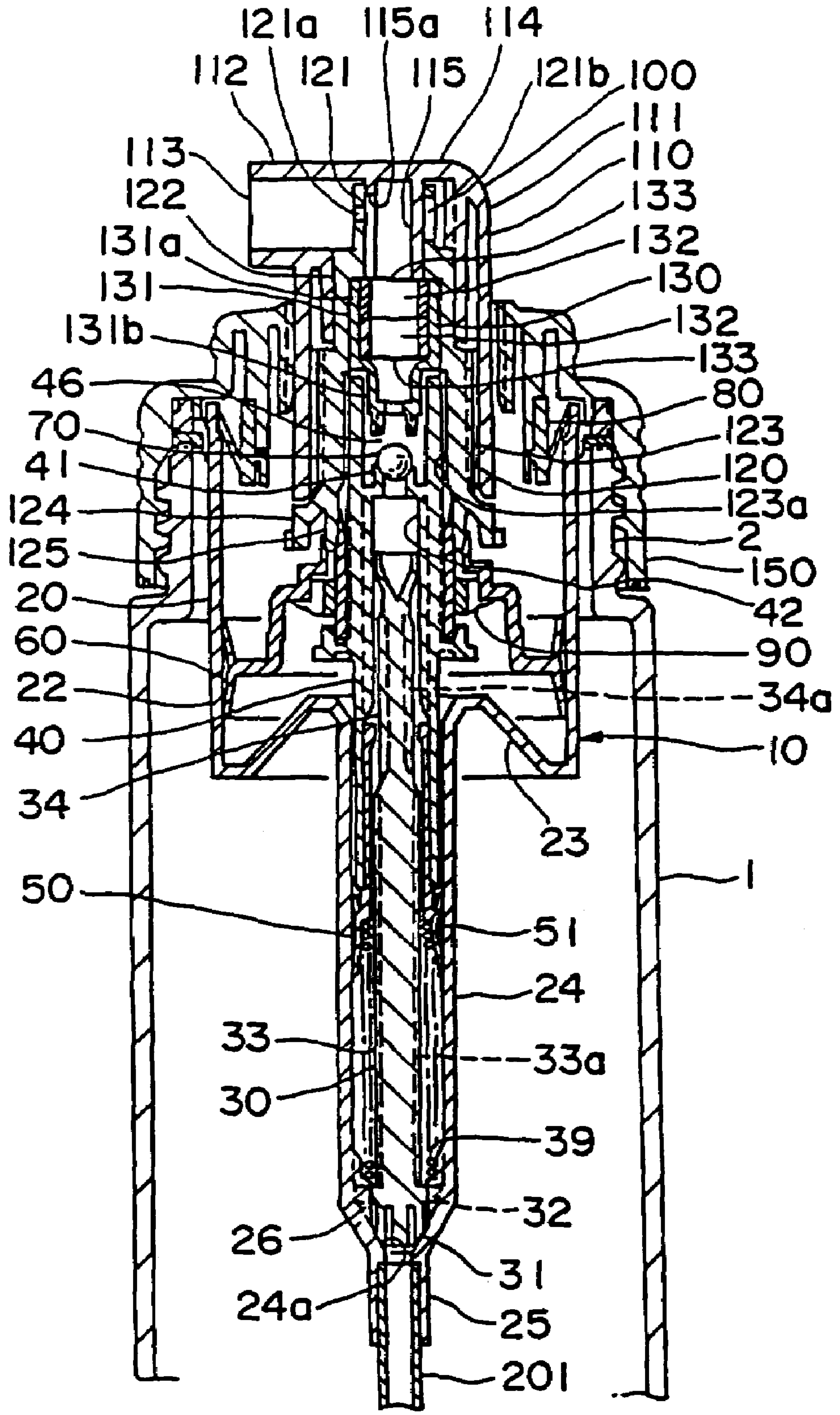
FIG. 2 is a longitudinal section diagram indicating a state that a pump head is partly depressed in a container with a pump for discharging bubbles of the embodiment 1.
Figure 3:
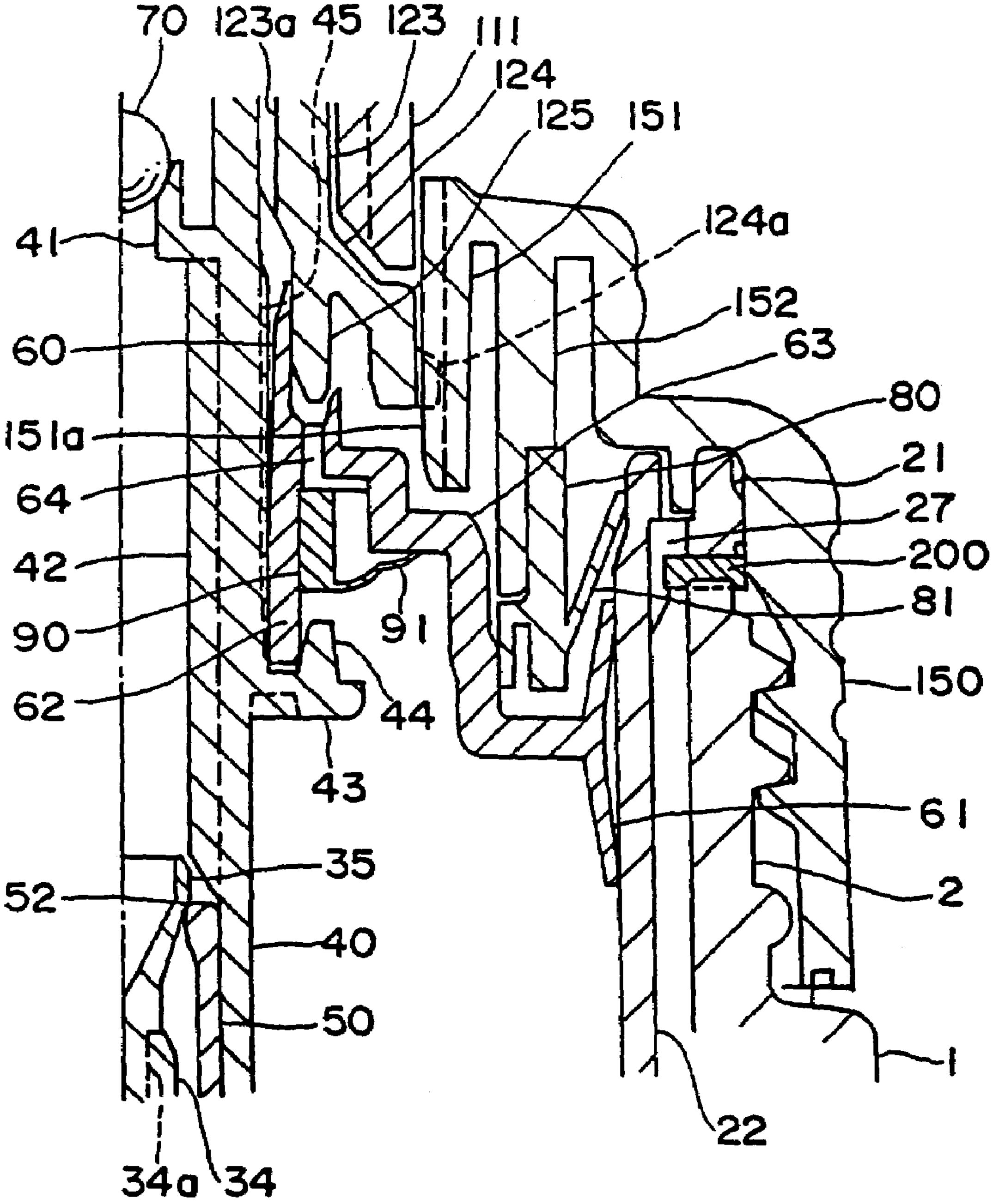
FIG. 3 is an enlarged longitudinal section diagram indicating the principal part of a container with a pump for discharging bubbles of the embodiment 1.
Figure 4:
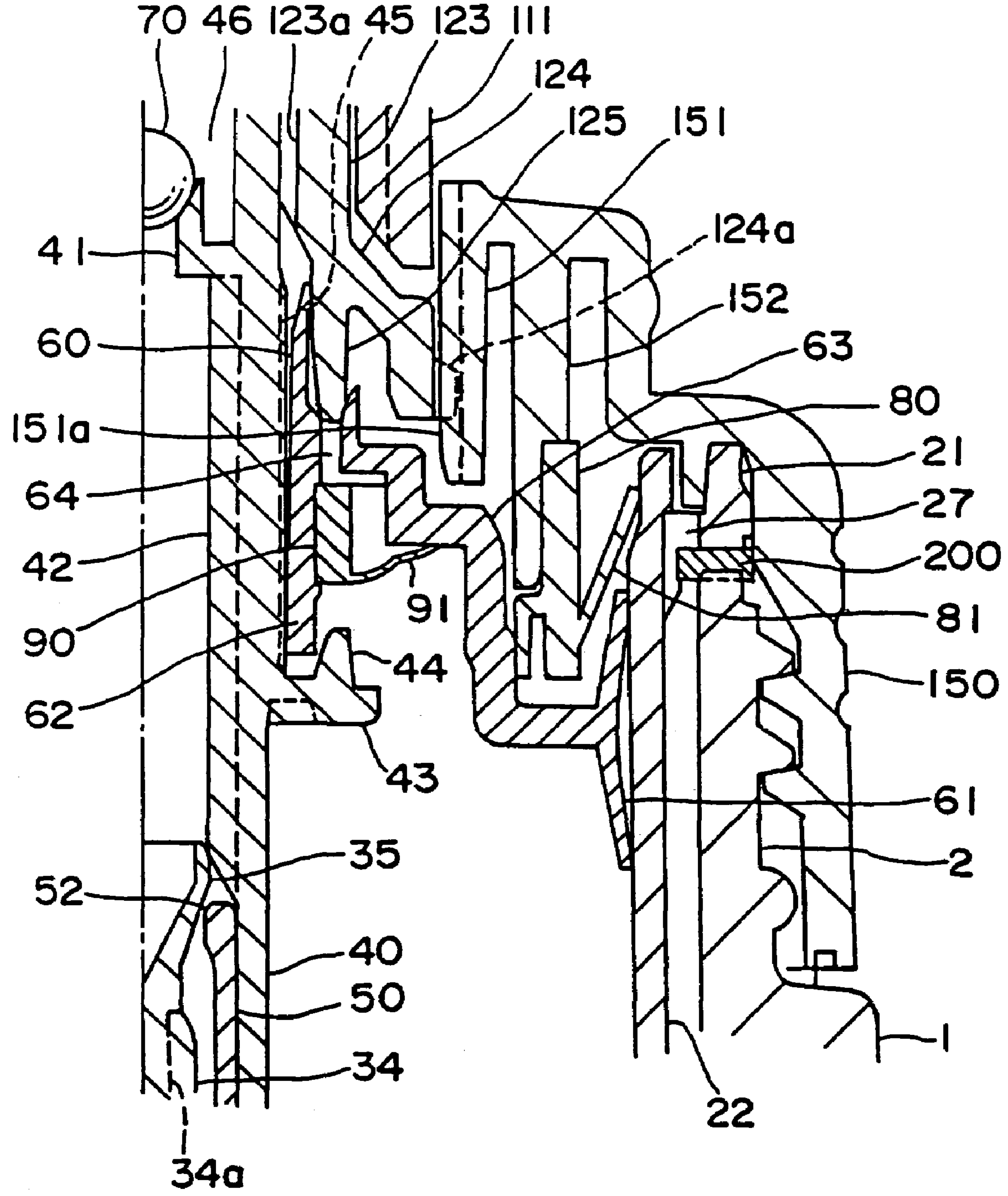
FIG. 4 is an enlarged longitudinal section diagram indicating the principal part of a container with a pump for discharging bubbles of the embodiment 1.

FIG. 1 and FIG. 2 are longitudinal section diagrams of the container with a pump for discharging bubbles in the embodiment 1, and FIG. 3 and FIG. 4 are enlarged diagrams indicating the principal parts of the container.

First of all, the constructions of the container with a pump for discharging bubbles will be described. The container with a pump for discharging bubbles has a pump for discharging bubbles 10 provided on a neck portion 2 of a container body 1. The liquid having a bubbling property such as a liquid for washing face is received within the container body.

The pump for discharging bubbles 10 comprises a cylinder member 20, a liquid suction valve 30, a stem 40, a first piston 50, a second piston 60, a liquid discharge valve 70, a first air suction valve 80, a second air suction valve 90, a pump head 100, a bubbling unit 130 and an attaching trunk 150.

The cylinder member 20 has an annular flange portion 21 is provided on the upper end, and constructed such that a cylinder-shaped large-diameter cylinder-portion (cylinder for air) 22 whose inside functions as an air chamber is extended downward from the flange portion 21, a cylinder-shaped small-diameter cylinder portion (cylinder for liquid) 24 whose inside functions as a liquid chamber is extended downward in a concentric shape from a bottom plate portion 23 of the large-diameter cylinder portion 22, and a connection cylinder 25 is extended downward from the lower end of the small diameter cylinder portion 24.

The cylinder member 20 is fixed on the container body 1 by the attaching trunk 150 screwed on the neck portion 2 in a state that the large-diameter cylinder portion 22, the small diameter cylinder portion 24 and the connection cylinder 25 are inserted into the container body 1 from a neck portion 2 and the flange portion 21 is mounted on a packing 200 arranged on the top face of the neck portion 2. In the flange portion 21, a plurality of air holes 27 are provided in a region inside of the neck portion 2.

A suction pipe 201 is connected to the connection cylinder 25 of the cylinder member 20, and the lower end of the suction pipe 201 is extended to the bottom of the container body 1.

A central cylinder portion 151 is provided in the center of the attaching trunk 150, and the pump head 100 is projected from the central cylinder portion 150 in a state that it can be moved upward and downward.

The bubbling unit 130 is provided within the pump head 100, and the stem 40 which moves in the inside of the cylinder member 20 upward and downward is connected to the lower part of the pump head 100 fixedly. The liquid discharge valve 70 is provided within the stem 40, and the second piston 60 which slides on the internal surface of the large-diameter cylinder 22 air-tightly is provided on the peripheral portion of the stem 40. The second air suction valve 90 is provided on the second piston 60. The first piston 50 which slides on the internal surface of the small-diameter cylinder portion 24 fluid-tightly is linked to the lower part of the stem 40, and the liquid suction valve 30 which is connected to the stem 40 and the first piston 50 to operate and opens and closes the connection cylinder 25, is arranged on the lower portion of the first piston 50.

Each of the constructions will be described in detail below. The liquid suction valve 30, a coil spring 39 and the first piston 50 are received within the small-diameter cylinder portion 24 of the cylinder member 20. The lower end of the liquid suction valve 30 is formed into a lower-part valve body 31 which can be brought into contact with and separated from a valve seat 24*a* having a taper surface formed on the lower end of the small diameter cylinder portion 24, and opens and closes the connection cylinder 25.

In the liquid suction valve 30, a plurality of engagement pins 32 which are projected to the outside are provided above the lower-part valve body 31, and the engagement pin 32 is inserted between vertical ribs 26 provided on the lower end of the small-diameter cylinder portion 24 in a state that they can be moved upward and downward.

In the liquid suction valve 30, the portion upper than the engagement pin 32 is a large-diameter portion 33, and a small-diameter portion 34 is linked to the upper part of the large-diameter portion 33. Vertical grooves 33*a* and 34*a* which are extended in the vertical direction are formed on the external surface of the large-diameter portion 33 and the external surface of the small-diameter portion 34, respectively. The upper end of the liquid suction valve 30 linked to the small-diameter portion 34 is an upper-part valve body 35 of taper cylinder shape whose diameter gets larger as it proceeds upward.

The first piston 50 is formed in a hollow cylinder shape in which the upper and lower ends are opened, the lower part of the first piston 50 functions as a seal portion 51 which slides on the internal surface of the small-diameter cylinder portion 24 fluid-tightly, and the upper part opening margin of the first piston 50 functions as a valve seat 52.

The upper-part valve body 35 of the liquid suction valve 30 is projected upward from the upper-part opening of the first piston 50 and can be brought into contact with and detached from the valve seat 52 of the first piston 50, and opens and closes the upper-part opening of the first piston 50.

As shown in FIG. 1, normally, the small-diameter portion 34 of the liquid suction valve 30 is inserted into the first piston 50 in a state that there is enough space between the small-diameter portion 34 and the internal surface of the first piston 50. As shown in FIG. 2, when the stem 40 is descended by depressing the pump head 100, the large-diameter portion 33 of the liquid suction valve 30 can be intruded into the first piston 50 in a state that there is a little space between the internal surface of the first piston 50 and the large-diameter portion 33, and a liquid passage is secured by the vertical groove 33*a*.

The coil spring 39 is provided between the upper end of the vertical rib 26 in the cylinder member 20 and the first piston 50 and energizes the first piston 50 upward. On the other hand, the engagement pin 32 of the liquid suction valve 30 can hold the lower end of the coil spring engagedly from the downward, and accordingly controls the upper limit of the liquid suction valve 30 when it is moved upward.

The stem 40 is formed in a cylinder shape in which the upper and lower ends are opened, and is received within the large-diameter cylinder portion 22 and the small-diameter cylinder portion 24 in a state that it can be moved upward and downward. The upper part of the first piston 50 is inserted into the lower part of the stem 40 fixedly so that the seal portion 51 is projected from the lower part of the stem 40.

An annular valve seat 41 which is projected in a cross section of an L-like shape is formed in the inside upper part of the stem 40. In the inside of the stem 40, the upper side of the valve seat 41 functions as a vapor-liquid mixing chamber 46, and the spherical liquid discharge valve 70 which can be brought into contact with and separated from the valve seat 41 is received therein in a state that it can be moved.

In the inside of the stem 40, a plurality of vertical ribs 42 which are extended in the vertical direction are provided on the portion from a position upper than the region to which the first piston 30 is fixed, up to the lower part of the valve seat 41, in a state that they are dispersed with respect to the circumferential direction. As shown in FIG. 2, when the stem 40 is descended by depressing the pump head 100, the upper part valve body 35 and the small diameter portion 34 of the liquid suction valve 30 can be intruded into the inside of the vertical rib 42, and the space between the vertical ribs 42 and the vertical groove 34*a* in the small-diameter portion 34 of the liquid suction valve 30 functions as a liquid passage at the time.

The pump head 100 connected to the upper part of the stem 40 is provided with an outside cylinder member 110 and an inside cylinder member 120. The inside cylinder member 120 is formed in a hollow cylinder shape in which the upper and lower ends are opened and is provided with a small-diameter portion (bubble flow portion) 121, a medium-diameter portion 122 and a large-diameter portion 123 from top to bottom, and a skirt cylinder portion 124 whose diameter is larger than the large-diameter portion 123 is linked to the lower end of the large-diameter portion 123. Besides, in the inside of the skirt cylinder portion 124, a cylinder-shaped valve body 125 is formed projectingly on the downward extension of the large-diameter portion 123.

In the small-diameter portion 121 of the inside cylinder member 120, two discharging holes 121*a* and 121*b* which are different in diameters are opened in a position where they are separated one another at 180 degrees with respect to the circumferential direction.

The upper part of the stem 40 is fitted into the inside of the large-diameter portion 123 of the inside cylinder member 120 to be fixed. Besides, the internal surface of the large-diameter portion 123 is provided with a plurality of vertical grooves 123*a* which are extended in the vertical direction in a state that they are dispersed with respect to the circumferential direction. The upper end of the vertical groove 123*a* is extended to the position a little upper than the upper end of the stem 40, and the vertical groove 123*a* functions as a air passage.

The bubbling unit 130 is received and fixed on the inside of the medium-diameter portion 122 of the inside cylinder member 120. The bubbling unit 130 comprises a casing 131 of a hollow cylinder shape in which the upper and lower ends are opened and two bubbling elements 132 provided on the casing 131. The upper portion of the casing 131 functions as a large-diameter portion 131*a* and the lower portion of the casing 131 functions as a small-diameter portion 131*b*. The large-diameter portion 131*a* is inserted into and fixed on the inside of the medium-diameter portion 122 of the inside cylinder portion 120 and the small diameter portion 131*b* is inserted into the inside of the stem 40 in a state that there is a space in the diametral direction. Besides, there is a space between the bottom portion of the large-diameter portion 131*a* and the upper end of the stem 40, and the spaces function as an air passage.

The bubbling element 132 is composed of a net (bubbling member) 133 provided on one end opening of a cylinder body in which the upper and lower ends are opened. In the bubbling element 132 arranged on the lower portion of the casing 131, the net 133 is provided on the lower end opening of the cylinder body. Besides, in the bubbling element 132 arranged on the upper side of the casing 131, and the net 133 is arranged on the upper end opening of the cylinder body 132*a*.

On the lower-part internal surface of the small-diameter portion 131*b* of the casing 131, a plurality of vertical grooves which are extended upward from the lower end thereof are formed so that the passages for liquid and air can be secured even when the liquid discharge valve 70 comes into contact with the lower end of the small-diameter portion 131*b*.

The outside cylinder member 110 of the pump head has a peripheral wall portion 111 of a topped cylinder shape, and a projection portion 112 which is projected to the side is provided on the upper part side of the peripheral wall portion 111. The inside of the peripheral wall portion 111 is formed as a stepped hole in which the lower portion has a large diameter and the upper portion has a small diameter. On the other hand, the projecting portion 112 is formed in a cylinder shape in which an end is opened as an approximately rectangular nozzle 113, and the nozzle 113 is linked to the upper end of the stepped hole in the inside of the outside cylinder member 110. Further, the shape of the nozzle 113 is not limited to the rectangle, and a circular nozzle, elliptical nozzle and the like can be substituted for the rectangular nozzle.

A cylinder portion 115 is extended downward from the inside of a top board portion 114 of the outside cylinder member 110, and only one opening 115*a* is opened in the cylinder portion 115.

In the outside cylinder member 110, the cylinder portion 115 is fitted fluid-tightly into the small-diameter portion 121 of the inside cylinder member 120 in a state that it can be rotated, the medium-diameter portion 122 of the inside cylinder member 120 is fitted fluid-tightly into the small-diameter part of the stepped hole of the outside cylinder member 110 in a state that it can be rotated, and the large-diameter portion 123 of the inside cylinder member 120 is inserted into the large-diameter part of the stepped hole in a state that there is a space between them, and accordingly the outside cylinder member is fitted outwardly to the inside cylinder member 120 so that it can be rotated.

Figure 5:
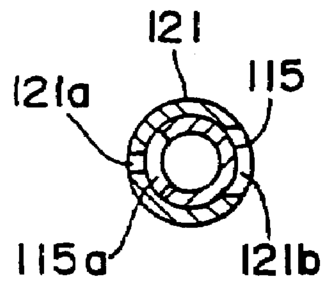
FIG. 5 is a partial cross section diagram of a pump head of a container with a pump for discharging bubbles of the embodiment 1.
Figure 6:
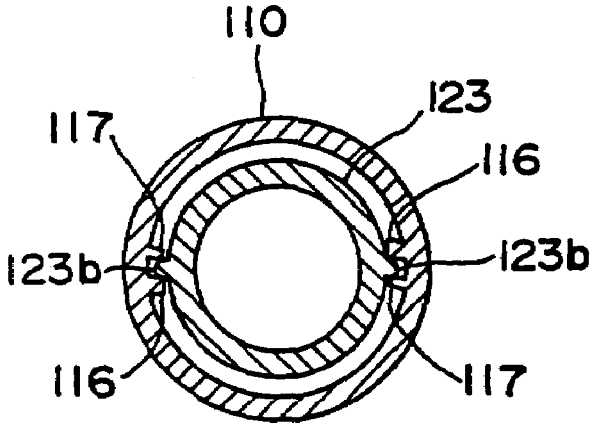
FIG. 6 is a partial cross section diagram of a pump head of a container with a pump for discharging bubbles of the embodiment 1.

FIG. 5 is a cross section diagram of the cylinder portion 115 of the outside cylinder member 110 and the small-diameter portion 121 of the inside cylinder member 120, and FIG. 6 is a cross section diagram of the large-diameter portion of the stepped hole of the outside cylinder member 110 and the large-diameter portion 123 of the inside cylinder member 120.

As shown in FIG. 6, on the internal surface of the large-diameter portion of the stepped hole of the outside cylinder member 110, sets of a stopper projection 116 which is extended in the vertical direction and a passable projection 117 are each formed in positions which are separated one another at 180 degrees with respect to the circumferential direction. On the other hand, on the external surface of the large-diameter portion 123 of the inside cylinder member 120, projections 123*b* which are extended in the vertical direction are each formed in positions which are separated one another at 180 degrees with respect to the circumferential direction. When the outside cylinder member 110 is rotated relatively to the inside cylinder member 117, although the projection 123*b* of the inside cylinder member 120 can pass over the passable projection 117 with a predetermined resistance, it can not pass over the stopper projection 116, and accordingly the rotation of the outside cylinder member 110 is limited by the stopper projection 116.

As shown in FIG. 6, when the projection 123*b* is positioned between the stopper projection 116 and the passable projection 117, the opening 115*a* of the cylinder portion 115 in the outside cylinder member 110 and the discharging hole 121*a* of a small diameter in the inside cylinder member 120 are made to communicate with one another, and the discharging hole 121*b* of large diameter is closed by the peripheral surface of the cylinder portion 115. Besides, when the outside cylinder member 110 is rotated against the inside cylinder member 120 and the projection 123*b* is made to pass over the passable projection 117 to be held onto the other stopper projection 117 separated at 180 degrees, the opening 115*a* of the cylinder portion 115 and the discharging hole 121*b* of large diameter in the inside cylinder member 120 are made to communicate with one another and the discharging hole 121*a* of a small diameter is closed by the peripheral surface of the cylinder portion 115.

Figure 7:
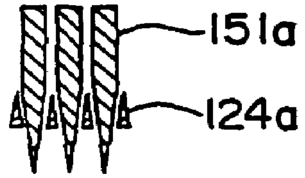
FIG. 7 is a longitudinal section diagram of an engagement part of a pump head and an attaching trunk of a container with a pump for discharging bubbles of the embodiment 1.

The skirt cylinder portion 124 of the inside cylinder member 120 is projected to the portion lower than the peripheral wall portion 111 of the outside cylinder member 110, and the skirt cylinder portion 124 and the peripheral wall portion 111 are inserted into the central cylinder portion 151 of the attaching trunk 150 so that they can be moved upward and downward. A large number of vertical ribs 151*a* which are extended in the vertical direction are formed on the internal surface of the central cylinder portion 151, and a large number of engagement projections 124*a* which are each inserted between the vertical ribs 151*a* are formed on the lower end of the external surface of the skirt cylinder portion 124 in a state that they are projected to the outside. As shown in FIG. 7, the lower end of the vertical rib 151*a* tapers off as it proceeds downward and the upper end of the engagement projection 124*a* tapers off as it proceeds upward so that the vertical rib 151*a* and the engagement projection 124*a* are guided by the respective taper surface, when the pump head 100 is ascended from the lower part.

In the periphery of the stem 40, an annular flange portion 43 which is projected to the outside is formed near the middle in the vertical direction and an annular rising wall 44 is provided projectingly, upwardly on the upper surface of the flange portion 43. The internal surface of the rising wall 44 is formed on the taper surface whose diameter is enlarged as it proceeds upward.

In the stem 40, the second piston 60 is fitted outwardly to the space between the flange portion 43 and the pump head 100 in a state that it can be moved upward and downward a little. The second piston 60 is formed in a hollow cylinder shape in which the upper and lower ends are opened, the utmost external portion is formed to the seal cylinder portion 61 which slides on the internal surface of the large diameter cylinder portion 22 of the cylinder member 20 air-tightly, the utmost internal portion is formed to the basic cylinder portion 62 which is fitted outwardly to the stem 40 and the seal cylinder portion 61 and the basic cylinder portion 62 are connected with one another by the stepped cylinder portion 63 in which the cross section is bent in a step form.

The upper part of the basic cylinder portion 62 is contacted air-tightly with the internal surface of the cylinder-shaped valve body 125 with pressure in a state that it can be slid. The air hole 64 is provided on the part in which the basic cylinder portion 62 is connected to the stepped cylinder portion 63 in a state that they are dispersed with respect to the circumferential direction, and the air hole 64 is opened and closed by the relative upward and downward movement between the pump head 100 and the second piston 60. Namely, the air hole 64 is closed when the pump head 100 moves upward and downward relatively to the second piston 60 so that the cylinder-shaped valve body 125 of the pump head comes into contact with the part where the basic cylinder portion 62 is connected to the stepped cylinder portion 63, and the air hole 64 is opened when the cylinder-shaped valve body 125 is separated from the above-mentioned connection part.

The lower end of the basic cylinder portion 62 is brought into contact with and separated from the internal surface of the rising wall 44 of the stem 40 by the relative upward and downward movement between the stem 40 and the second piston 60 in the external surface of the stem 40, a plurality of vertical grooves 45 which are extended in the vertical direction are provided in a region to which the basic cylinder portion 62 is fitted outwardly in a state that they are dispersed with respect to the circumferential direction. The vertical groove 45 is made to communicate with the inside of the large diameter cylinder portion 22 when the lower end of the basic cylinder portion 62 is separated from the rising wall of the stem 40, and the vertical groove 45 is shut off from the inside of the large-diameter cylinder portion 22 when the lower end of the basic cylinder portion 62 is comes into contact with the rising wall 44.

A second air suction valve 90 is fixed on the lower part of the basic cylinder portion 62. The second air suction valve 90 is provided with an annular diaphragm 91 of upward taper which is extended outside in the diametral direction from the lower end thereof. The diaphragm 91 has an elasticity, and operates so that the peripheral end portion of the diaphragm 91 is brought into contact with the lower surface of the stepped cylinder portion 63 of the second piston 60 with pressure to be sealed under normal conditions, and the peripheral edge of the diaphragm 91 is pulled downward by negative pressure within the large-diameter cylinder portion 22 to be separated from the stepped cylinder portion 63.

In the attaching trunk 150, a cylinder-shaped rib 152 is provided on the outside of the central cylinder portion 151, and the first air suction valve 80 which seals the space between the attaching trunk 150 and the internal surface of the large-diameter cylinder portion 22 is fixed on the lower end of the cylinder-shaped rib 152. A seal cylinder portion 81 of the first air suction valve 80 in contact with the large-diameter cylinder portion 22 is formed in a taper cylinder shape to be extended in the diagonal upper direction, and has an elasticity. Besides, the upper end portion of the seal cylinder portion 81 operates so that it is pulled inside in the diametral direction by negative pressure within the container body 1 to be separated from the internal surface of the large-diameter cylinder portion 22.

Further, a clear cover 202 is detachably provided on the attaching trunk 150.

Then, the operation of the container with a pump for discharging bubbles of the embodiment 1 will be described.

FIG. 1 and FIG. 3 indicate a state that the pump head is not yet depressed, namely, a state that the pump head is positioned at the upper limit. In this state, the liquid suction valve 30 is pushed up through the first piston 50 by the coil spring 39, the lower-part valve body 31 is separated from the valve seat 24*a* of the cylinder member 20, and the inside of the small-diameter cylinder portion 24 is made to communicate with the inside of the container body 1 through the suction pipe 201. The upper-part valve body 35 of the liquid suction valve 30 is in contact with the valve seat of the first piston 50 to close the upper-part opening of the first piston 50. The lower end of the basic cylinder portion 62 of the second piston 60 is in contact with the rising wall 44 of the stem 40, the first air suction valve 80 is in contact with the stepped cylinder portion 63 of the second piston 60 and the large-diameter cylinder portion 22 of the cylinder member 20 with pressure, and the lower end of the cylinder-shaped valve body 125 of the pump head 100 is separated from the stepped cylinder portion 63 of the second piston 60 to open the air hole 64.

As the pump head 100 is depressed from the above-mentioned state, the stem 40 and the first piston 50 are descended together with the pump head 100. As a result, as shown in FIG. 4, the upper-part valve body 35 of the liquid suction valve 30 is separated from the valve seat 52 of the first piston 50 to open the upper-part opening of the fist piston 50. At almost the same time, the inside of the small-diameter cylinder portion 24 is pressurized by descending the first piston 50, the liquid suction valve 30 is descended by liquid pressure within the small-diameter cylinder portion 24, and the lower-part valve body 31 comes into contact with the valve seat 24*a* to close the lower part opening of the small diameter cylinder portion 24. On the other hand, the second piston 60 is standing by frictional force between the seal cylinder portion 61 and the large-diameter cylinder portion 22 right after the depressing of the pump head has started. As a result of descending of the stem 40 in the state, the lower end of the basic cylinder portion 62 of the second piston 60 is separated from the rising projection 44 of the stem 40, and the lower end of the cylinder-shaped valve body 125 of the pump head 100 comes into contact with the stepped cylinder portion 63 of the second piston 60 to close the air hole 64.

The second piston 60 is also descended together with the pump head 100, the stem 40 and the first piston 50 after the lower end of the cylinder-shaped valve body 125 of the pump head 100 comes into contact with the stepped cylinder portion 63 of the second piston 60.

As the pump head 100 is descended after that, the liquid within the small-diameter cylinder portion 24 pressurized by the first piston 30 passes through the upper end opening of the first piston 30 and the vertical grooves 33*a* and 34*a* of the liquid suction valve 30 and passes through the space between the vertical ribs 42 of the stem 40 to be pushed into the upper-part of the upper part valve body 35. Further, the liquid pushes up the liquid discharge valve 70 with hydraulic pressure to flow into the vapor-liquid mixing chamber 46 (See FIG. 2). On the other hand, the air received within the large diameter cylinder portion 22 passes through the space between the flange portion 43 and rising projection 44 of the stem 40 and the lower end of the basic cylinder portion 62 of the second piston 60, passes through the vertical groove 45 of the stem 40, passes through the vertical groove 123*a* of the inside cylinder member 120 of the pump head 100, and passes through the passage between the casing 131 of the bubbling unit 130 and the stem 40 to flow into the vapor-liquid mixing chamber 46.

Figure 8:
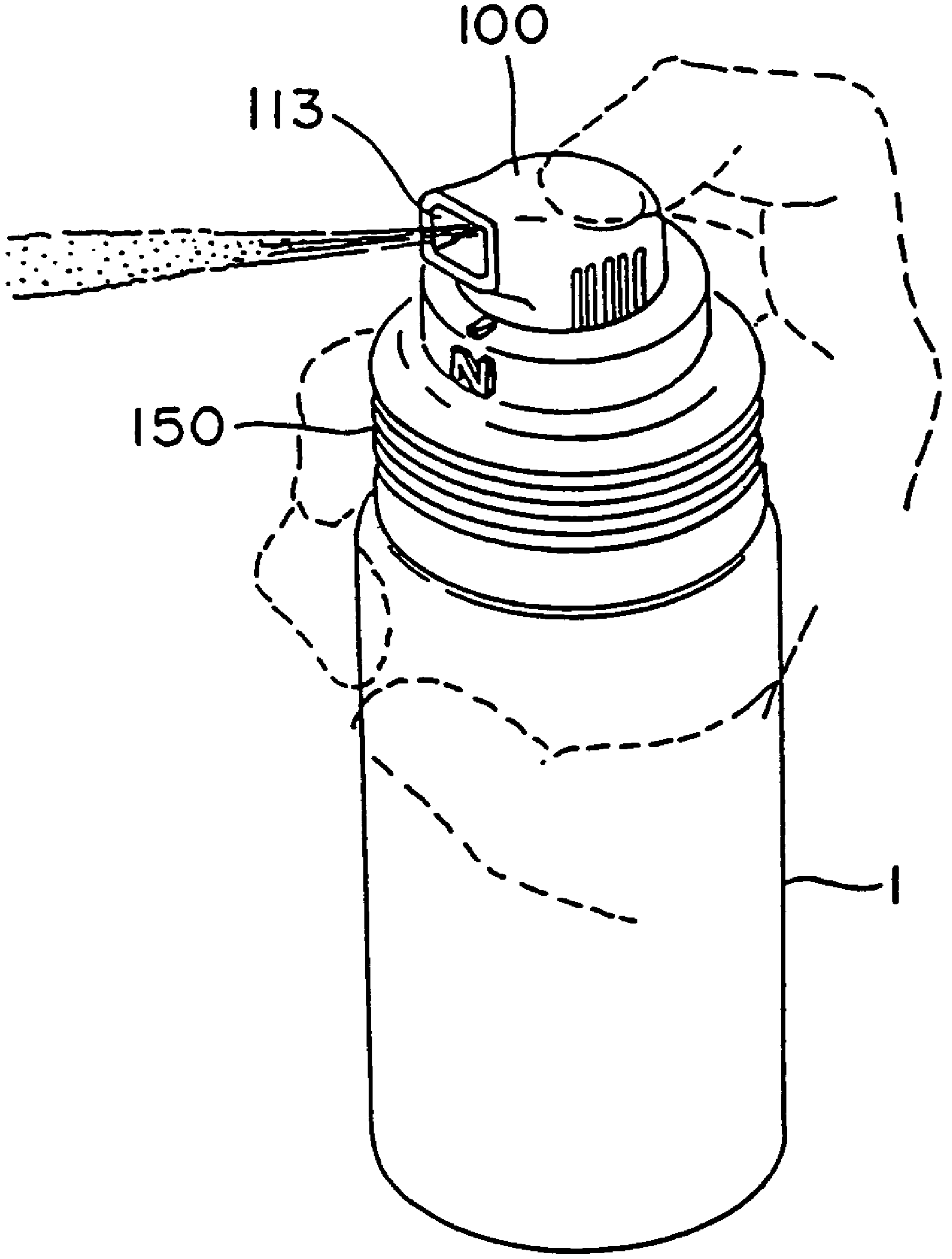
FIG. 8 is a perspective outside diagram indicating a discharging state of bubbles of a container with a pump for discharging bubbles of the embodiment 1.

Then, the liquid and the air are joined and mixed in the vapor-liquid mixing chamber 46 to be delivered into the bubbling unit 130. After that, the liquid is bubbled when it passes through the upper and lower two nets 133 of the bubbling unit 130 to be pushed into the cylinder portion 115 of the pump head 100 in a foamy state. The bubble passes through the opening 115*a* of the cylinder portion 115 and the small-diameter discharging hole 121*a* of the small-diameter cylinder member 120 to be discharged from the nozzle 113 of the pump head 100. FIG. 8 indicates a discharging state of the bubbles at the moment, and the bubbles are discharged strongly in a state that they are converged finely.

Figure 9:
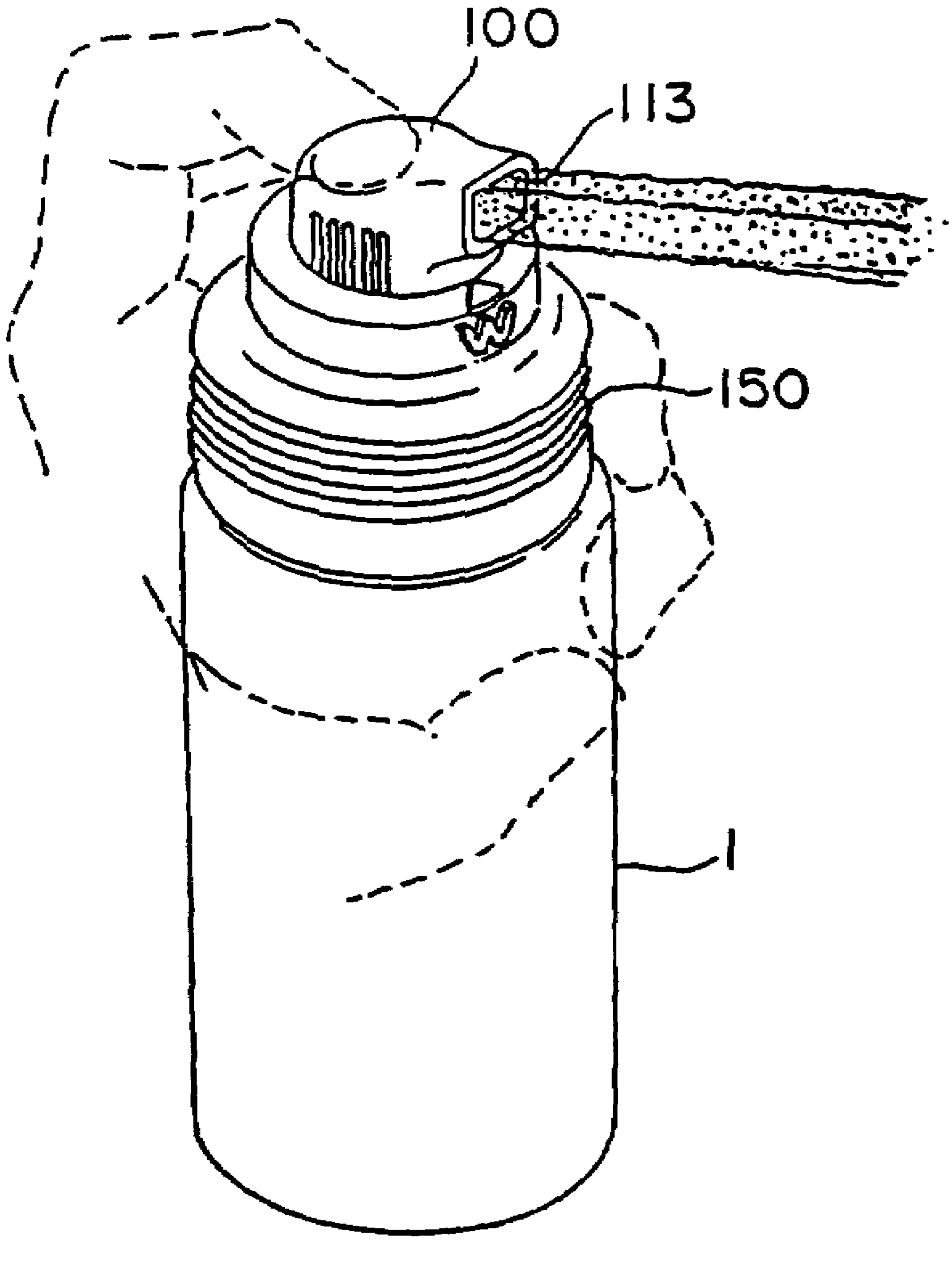
FIG. 9 is a perspective outside diagram indicating a discharging state of bubbles of a container with a pump for discharging bubbles of the embodiment 1.

When the outside cylinder member 110 is rotated at 180 degrees against the inside cylinder member 120, the opening 115*a* of the cylinder portion 115 in the outside cylinder member 110 is made to communicate with the large-diameter discharging hole 121*b* of the inside cylinder member 120 before depressing the pump head 100, and the pump head 100 is depressed in the state, the thick bubbles are discharged from the nozzle 113, as shown in FIG. 9. The strength of the bubbles discharged at this case is weaker than that of the bubbles discharged through the small-diameter discharging hole 121*a*.

Namely, in the container with a pump for discharging bubbles, it is possible to select one of the large and small discharging holes 121*a* and 121*b* to let the bubbles pass through the discharging hole so as to change the discharging form of the bubbles, if relative position in the circumferential direction of the outside cylinder member 110 and the inside cylinder member 12 of the pump head 100 is selected according to circumstances.

If the finger is off from the pump head 100 after the depressing of the pump head 100, the hydraulic pressure within the small-diameter cylinder portion 24 and the air pressure within the large-diameter cylinder portion 22 falls, the liquid discharge valve 70 is brought into contact with the valve seat 41, and the first piston 50, stem 40 and the pump head 100 are pushed up by the elasticity of the coil spring 39.

Hereupon, the second piston 60 is standing by frictional force between the seal cylinder portion 61 and the large-diameter cylinder portion 22 right after the pushing up of the pump head has begun. As a result of ascending of the stem 40 in the state, the internal surface of the rising projection 44 of the stem 40 is brought into contact with the lower end of the basic cylinder portion 62 of the second piston 60 with pressure to close the space between the inside of the large-diameter cylinder portion 22 and the vertical groove 45 of the stem 40. At the same time, the lower end of the cylinder-shaped valve body 125 of the pump head 100 is separated from the stepped cylinder portion 63 of the second piston 60 to open the air hole 64.

The first piston 50, the stem 40, the second piston 60 and the pump head 100 are ascended together, after the internal surface of the rising projection 44 comes into contact with the lower end of the basic cylinder portion 62.

The inside of the small-diameter cylinder potion 24 is pressurized negatively when the first piston 50 is ascended, and accordingly the liquid suction valve 30 is pulled up and the lower-part valve body 31 is separated from the valve seat 24*a* to make the inside of the small diameter cylinder portion 24 communicate with the inside of the container body 1. As a result, the liquid within the container body 1 is sucked up into the small-diameter cylinder portion 24, as the first piston 50 is ascended.

The inside of the container body 1 is pressurized negatively when the liquid is pumped up into the small-diameter cylinder portion 24, and accordingly the seal cylinder portion 81 of the first air suction valve 80 is drawn to the direction away from the internal surface of the large diameter cylinder portion 22, and a gap is generated between the seal cylinder portion 81 and the large diameter cylinder portion 22.

Besides, the inside of the large-diameter cylinder portion 22 is pressurized negatively as the second piston 60 is ascended, and accordingly the diaphragm 91 of the second air suction valve 90 is drawn downward and separated from the stepped cylinder portion 63 of the second piston 60 to generate a gap.

As a result of operating of the first air suction valve 80 and the second air suction valve 90 in the above-mentioned way, the outside air is sucked into the attaching trunk 150 through the space between the central cylinder portion 151 of the attaching trunk 150 and the pump head 100. Then, part of the air passes through the air hole 64 of the second piston 60 to get into the large-diameter cylinder portion 22, and the other air passes through the flange portion 21 of the cylinder member 20 to get into the container body 1. By these actions, the pressures within the large-diameter cylinder portion 22 and the container body 1 are equal to the air pressure, the first piston 50 and the second piston 60 are ascended smoothly and the liquid is pumped up into the small-diameter cylinder portion 24 smoothly.

The container with a pump for discharging bubbles is in a initial state shown in FIG. 1 and FIG. 3, when the pump head 100 returns to the upper limit.

The Embodiment 2

The container with a pump for discharging bubbles of the embodiment 2 will be described in accordance with FIG. 10 and FIG. 11.

The basic constructions of the container with a pump for discharging bubbles of the embodiment 2 is the same as those of the embodiment 1, and the difference lies in a part of the construction of the pump head 100.

In the pump head 100 in the embodiment 2, the outside cylinder member 110 can be held in a position where the opening 115*a* of the outside cylinder member 110 is closed without being connected to any one of the discharging holes 121*a* and 121*b* of the inside cylinder member 120.

The construction will be described. FIG. 10 and FIG. 11 are cross section diagrams corresponding to FIG. 5 and FIG. 6 of the embodiment 1. As shown in FIG. 11, in the internal surface of the peripheral wall portion 111 of the outside cylinder member 110, a pair of passable projections 118*a* and 118*b* in addition to the stopper projection 116 and passable projection 117 are provided in a position separated at 180 degrees in the circumferential direction one another.

Figure 10:
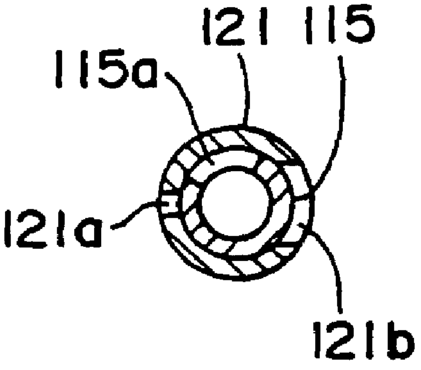
FIG. 10 is a partial cross section diagram of a pump head of a container with a pump for discharging bubbles of the embodiment 2.

When the projection 123*b* of the inside cylinder member 120 is positioned in a space between the passable projection 118*a* and the passable projection 118*b*, the opening 115*a* of the cylinder portion 115 of the outside cylinder member 110 is closed by the internal surface of the small-diameter portion 121 of the inside cylinder member 120 without being made to communicate with any one of the discharging holes 121*a* and 121*b* of the inside cylinder member 120, and the discharging holes 121*a* and 121*b* are closed by the external surface of the cylinder portion 115 at the same time, as shown in FIG. 10.

If the opening 115*a* is closed in the above-mentioned way, the inside of the inside cylinder member 120 can be prevented from getting dry. Although it sometimes happens that part of the bubbles are solidified in a state that it is adhered to the net 133, the meshes of the net 133 are clogged and the formation of the bubbles is insufficient or unstable when the pump is operated after that, if the inside cylinder member 120 gets dry, in the embodiment 2, it is possible to prevent the bubbles within the pump head 100 from getting dry, and accordingly a clogging of the net 133 as a bubbling member can be prevented and the bubbles can be formed well and stably.

Figure 11:
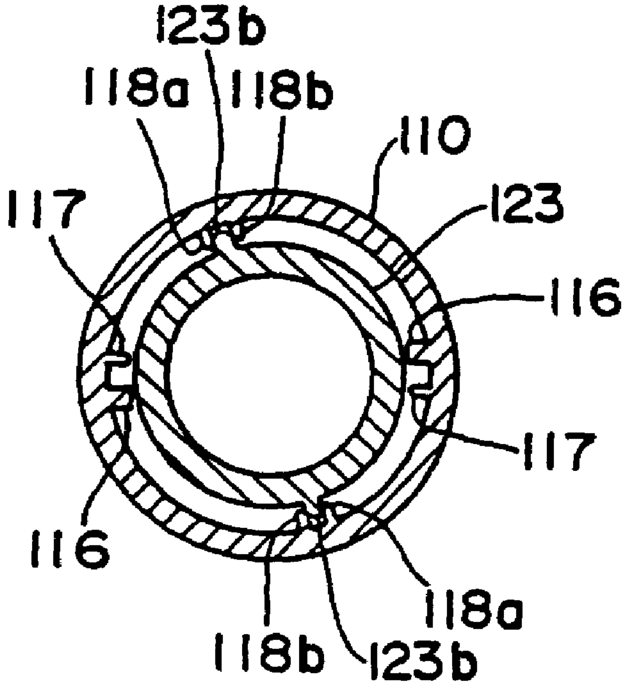
FIG. 11 is a partial cross section diagram of a pump head of a container with a pump for discharging bubbles of the embodiment 2.

Further, if the outside cylinder member 110 is rotated against the inside cylinder member 120 in the state of FIG. 10 and FIG. 11, the project 123*b* can pass over the passable projection 118*a* or the passable projection 118*b*, and accordingly the opening 115*a* can be made to communicate with the discharging hole 121*a* or the discharging hole 121*b*.

The Embodiment 3

The container with a pump for discharging bubbles of the embodiment 3 will be described in accordance with FIG. 12 to FIG. 15.

Figure 12:
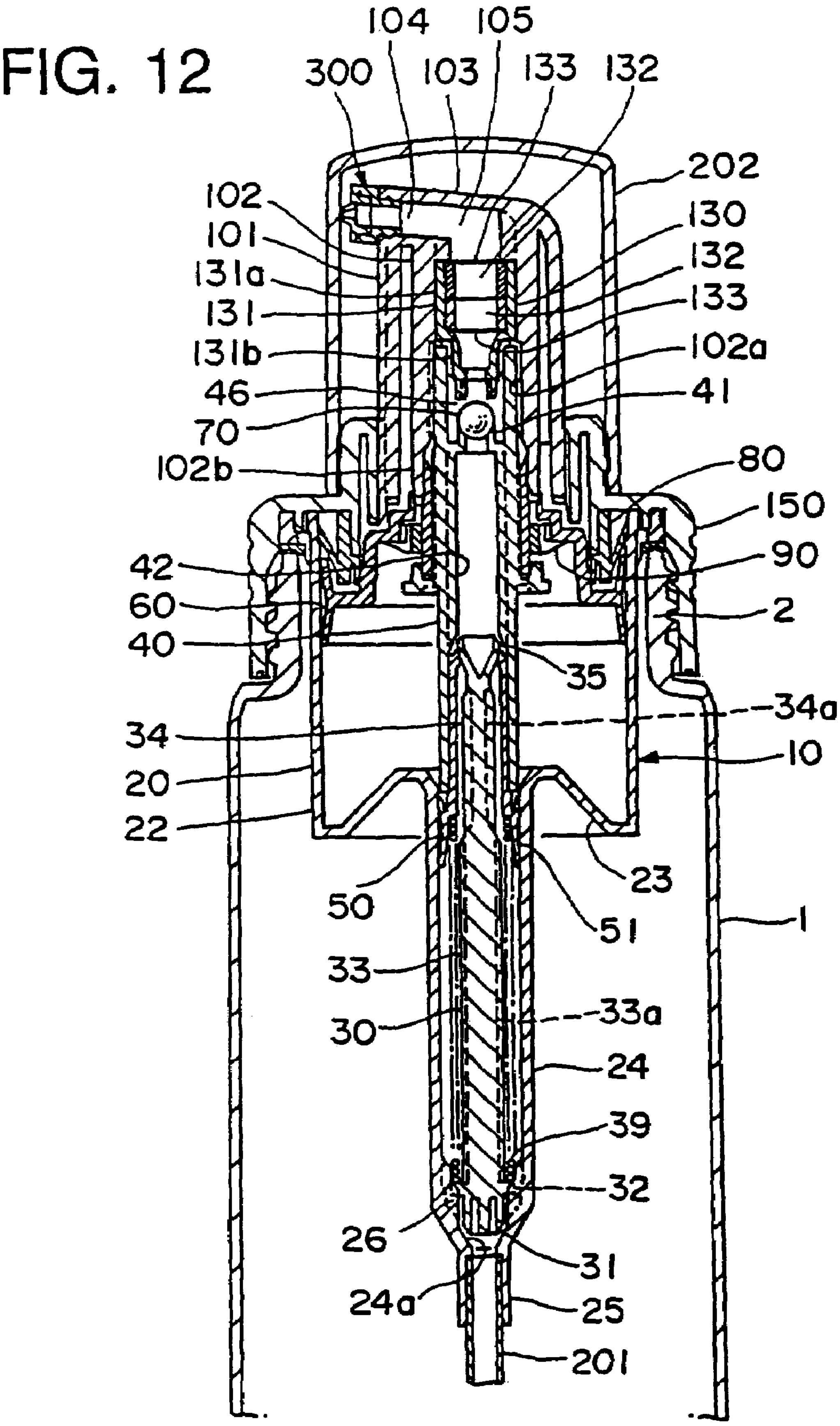
FIG. 12 is a longitudinal section diagram indicating a state that a pump head is positioned at an upper limit in a container with a pump for discharging bubbles of the embodiment 3.

FIG. 12 is a longitudinal section diagram of the container with a pump for discharging bubbles of the embodiment 3. The difference between the embodiment 3 and the embodiment 1 lies in the pump head 100, and other constructions of the embodiment 3 are the same as those of the embodiment 1. Only the difference will be described below, and the descriptions concerning the constructions which are the same as those of the container with a pump for discharging bubbles of the embodiment 1 will be omitted by giving the identical numbers to the same conditional parts.

Unlike the embodiment 1, the pump head in the embodiment 3 is not made up of two parts of the outside cylinder member and inside cylinder member, and the parts corresponding to the members are made up of one part in a body.

Namely, the pump head 100' has a structure in which the outside cylinder portion 101, the inside cylinder portion 102 and the top board portion 103 are formed in a body. The nozzle 104 is opened in the one side upper part of the outside cylinder portion 101 and the upper part of the stem 40 is inserted into and fixed on the lower part of the inside cylinder portion 102 and the bubbling unit 130 is received and fixed on the upper part of the inside cylinder portion 102. Besides, the bubbling unit 130 is linked to the nozzle 104 through the bubbling passage 105 provided within the pump head 100.

Besides, in the internal surface of the inside cylinder portion 102, the vertical groove 102*a* corresponding to the vertical groove 123*a* in the embodiment 1 is formed on the region to which the stem 40 is fitted inwardly, and the lower end portion 102*b* of the inside cylinder portion 102 has the same function as the cylinder-shaped valve body 125 in the embodiment 1 and opens and shuts the air hole 64 of the second piston 60.

Figure 13:
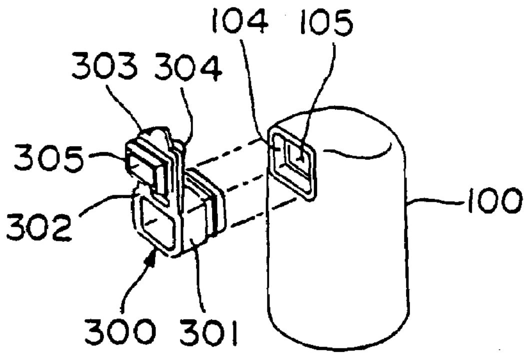
FIG. 13 is a perspective exploded diagram of a pump head and a nozzle attachment of a container with a pump for discharging bubbles of the embodiment 3.
Figure 14:
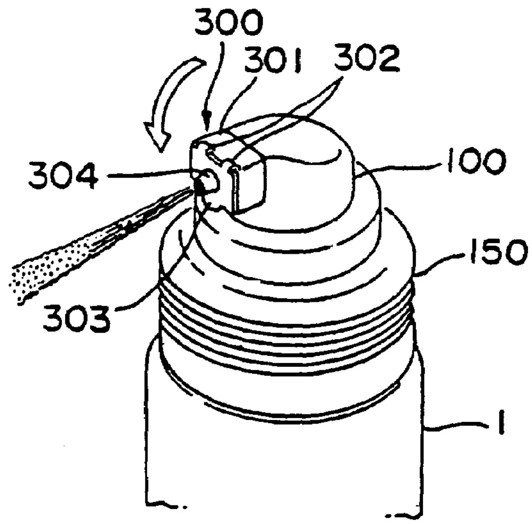
FIG. 14 is a perspective outside diagram indicating a discharging state of bubbles of a container with a pump for discharging bubbles of the embodiment 3.
Figure 15:
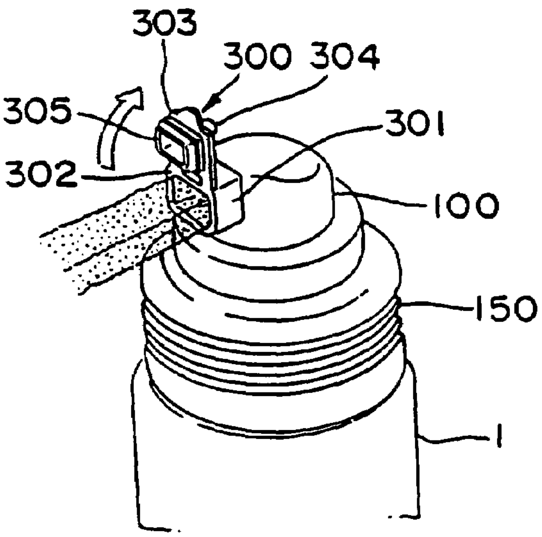
FIG. 15 is a perspective outside diagram indicating a discharging state of bubbles of a container with a pump for discharging bubbles of the embodiment 3.

In the embodiment 3, a nozzle attachment 300 is provided on the nozzle 104. As shown in FIG. 13 to FIG. 15, the nozzle attachment 300 is provided with a cylinder body portion 301 of a rectangle cross section whose inside functions as a bubble passage and a closing body 303 provided on the point of the cylinder body portion 301 through a hings portion 302 in a state that it can be swung in the vertical direction. A discharging nozzle 304 of taper cylinder shape is projected forward from the front-side center of the closing body 303, and a fitting cylinder portion 305 of a rectangle cross section which can be fitted to the cylinder body portion 301 is projected from the back face of the closing body 303. The nozzle attachment 300 is fixed on the pump head 100 by fitting the base of the cylinder body portion 301 into the bubble passage 105 through the nozzle 104.

The opening area of the end opening of the discharging nozzle 304 is sufficiently smaller than that of the cylinder body portion 301.

In the embodiment 3, as shown in FIG. 14, the bubbles are discharged strongly in a state that they are converged finely, if the pump head 100 is depressed for pumping up in a state that the closing body 303 is swung downward and the fitting cylinder portion 305 of the closing body 303 is fitted into the end of the cylinder body portion 301.

On the other hand, as shown in FIG. 15, the thick bubbles will be discharged from the end opening of the cylinder body portion 301, if the pump head 100 is depressed for pumping up in a state that the closing body 303 is swung upward and the end opening of the cylinder body portion 301 is being exposed.

Namely, in case of the embodiment 3, it is possible to change the discharging form of the bubbles by selecting the state of the used closing body 300 in which it is swung downward or upward.

Further, the cross section shape of the cylinder body portion 301 is not limited to the rectangle and may be determined by the shape of the nozzle 104.

Embodiment 4

The container with a pump for discharging bubbles of the embodiment 4 will be described in accordance with FIG. 16 to FIG. 23.

Figure 16:
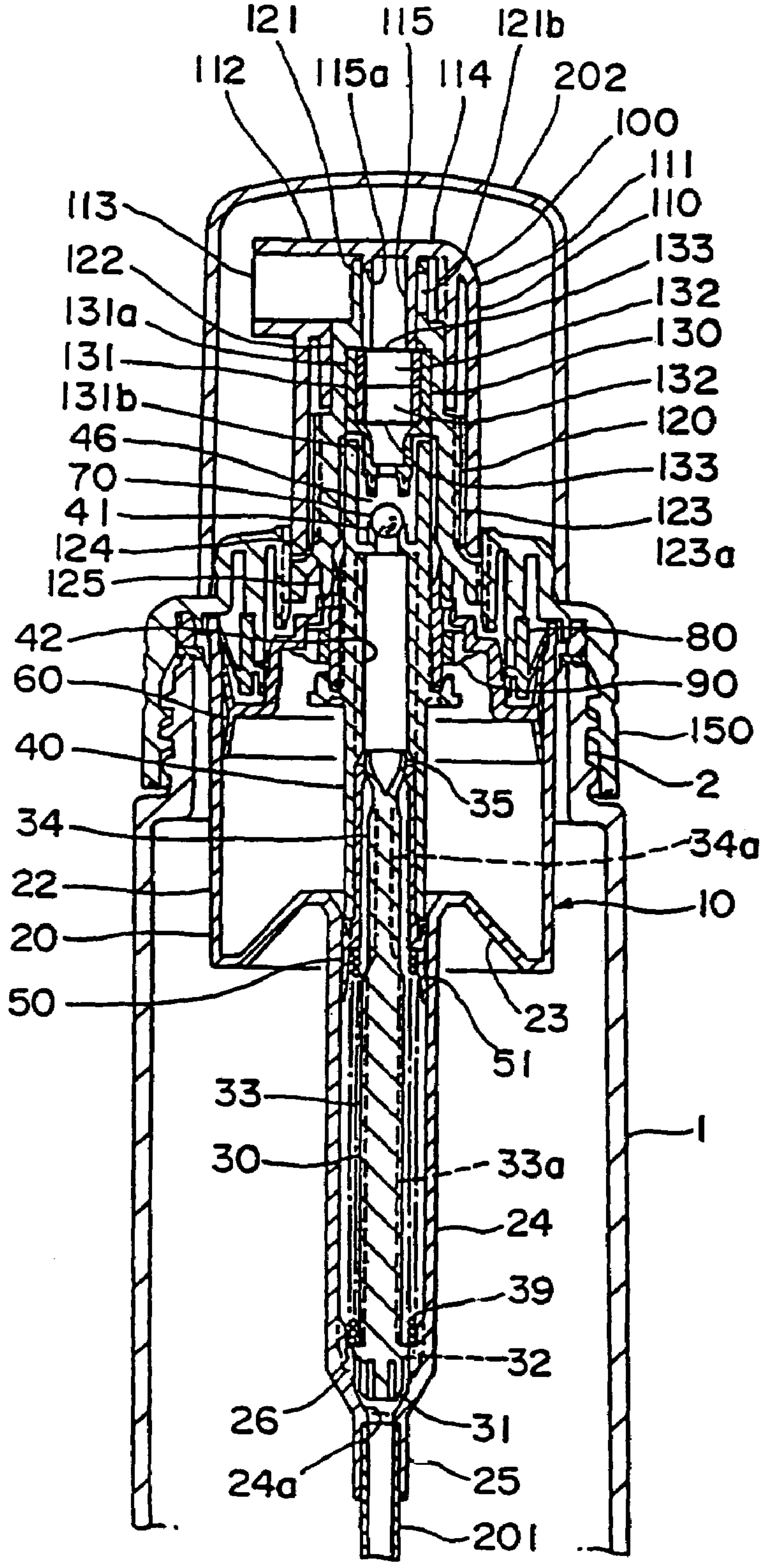
FIG. 16 is a longitudinal section diagram indicating a state that a pump head is positioned at an upper-limit in a container with a pump for discharging bubbles of the embodiment 4.
Figure 17:
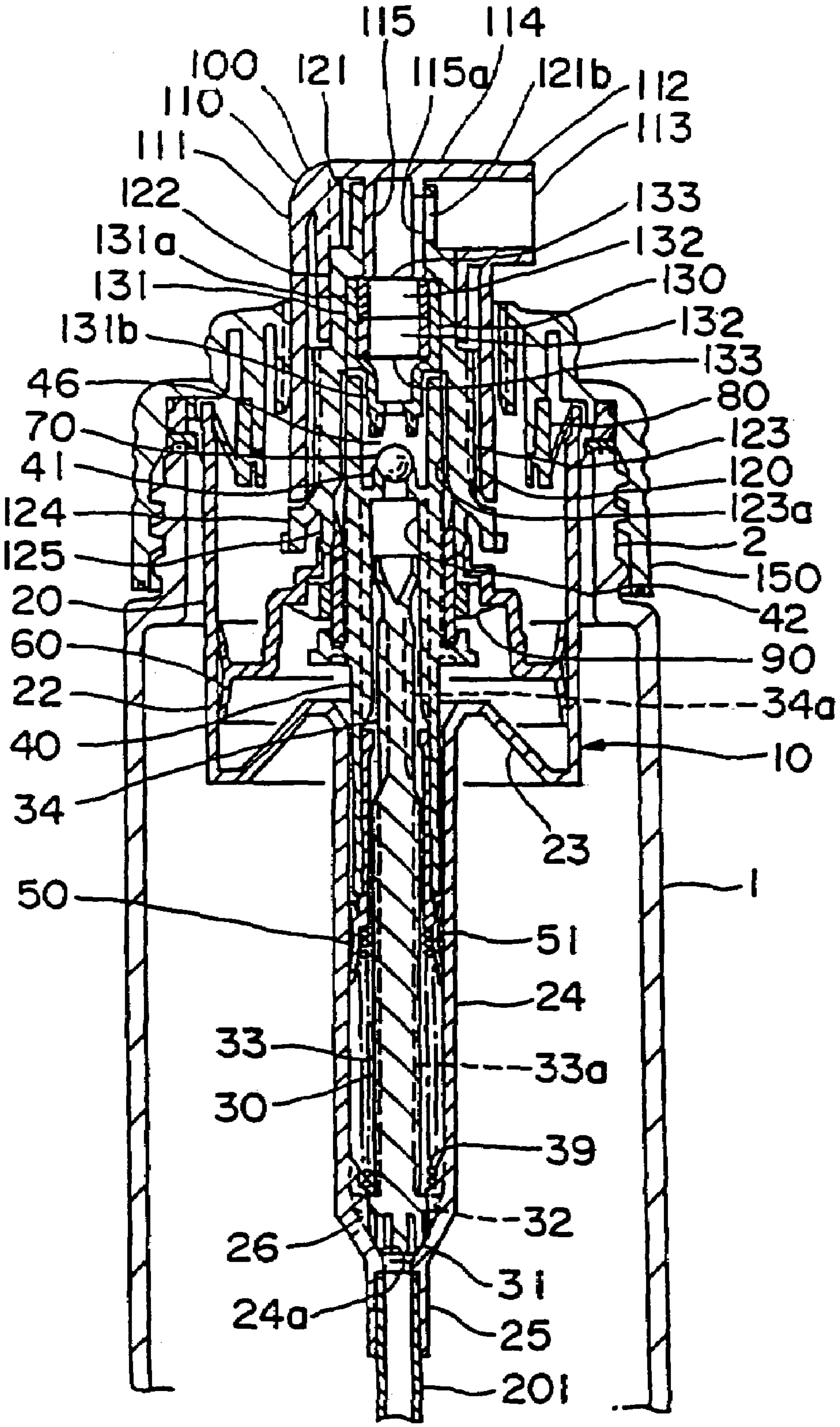
FIG. 17 is a longitudinal section diagram indicating a state that a pump head is partly depressed in a container with a pump for discharging bubbles of the embodiment 4.
Figure 18:
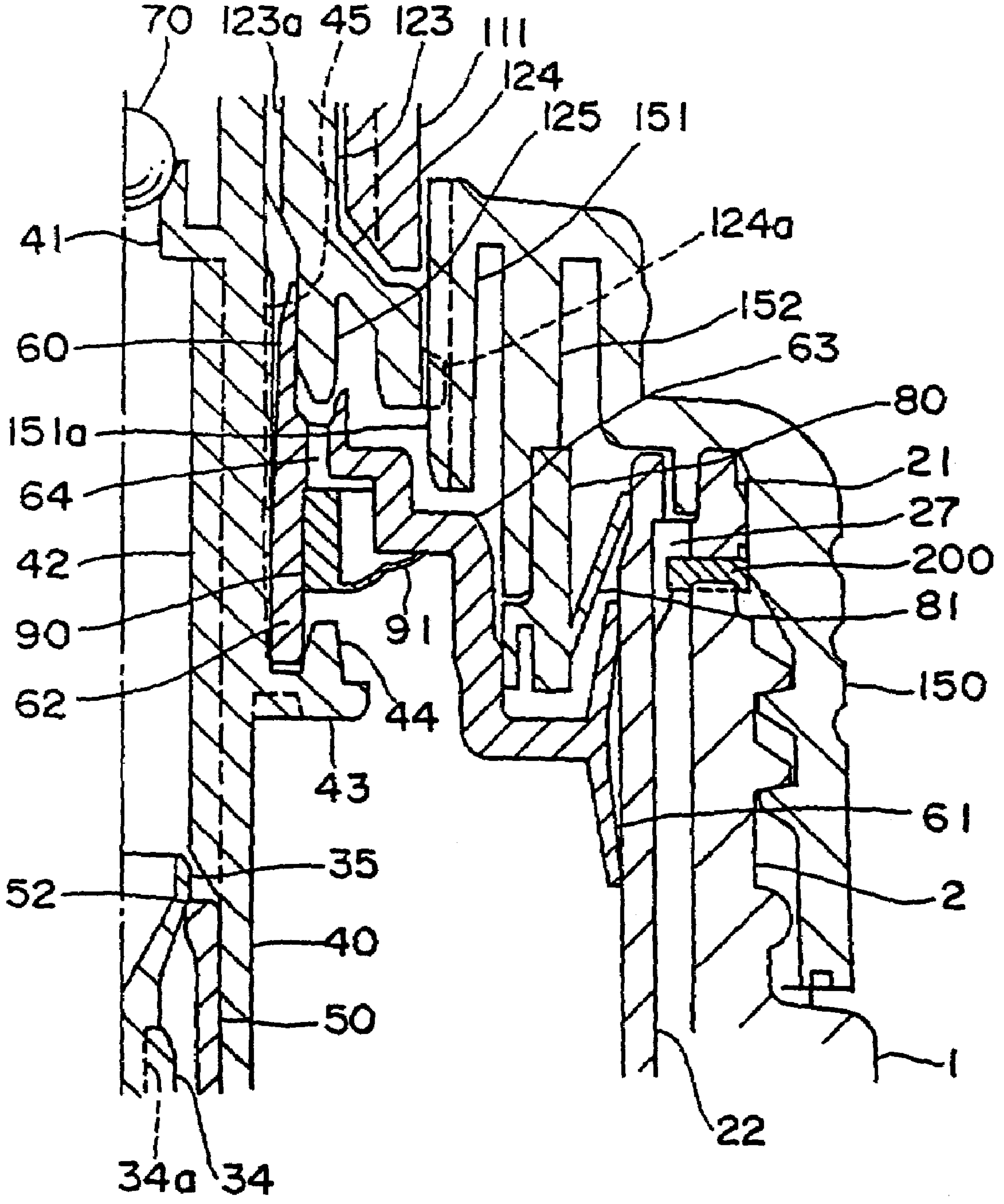
FIG. 18 is an enlarged longitudinal section diagram indicating the principal part of a container with a pump for discharging bubbles of the embodiment 4.
Figure 19:
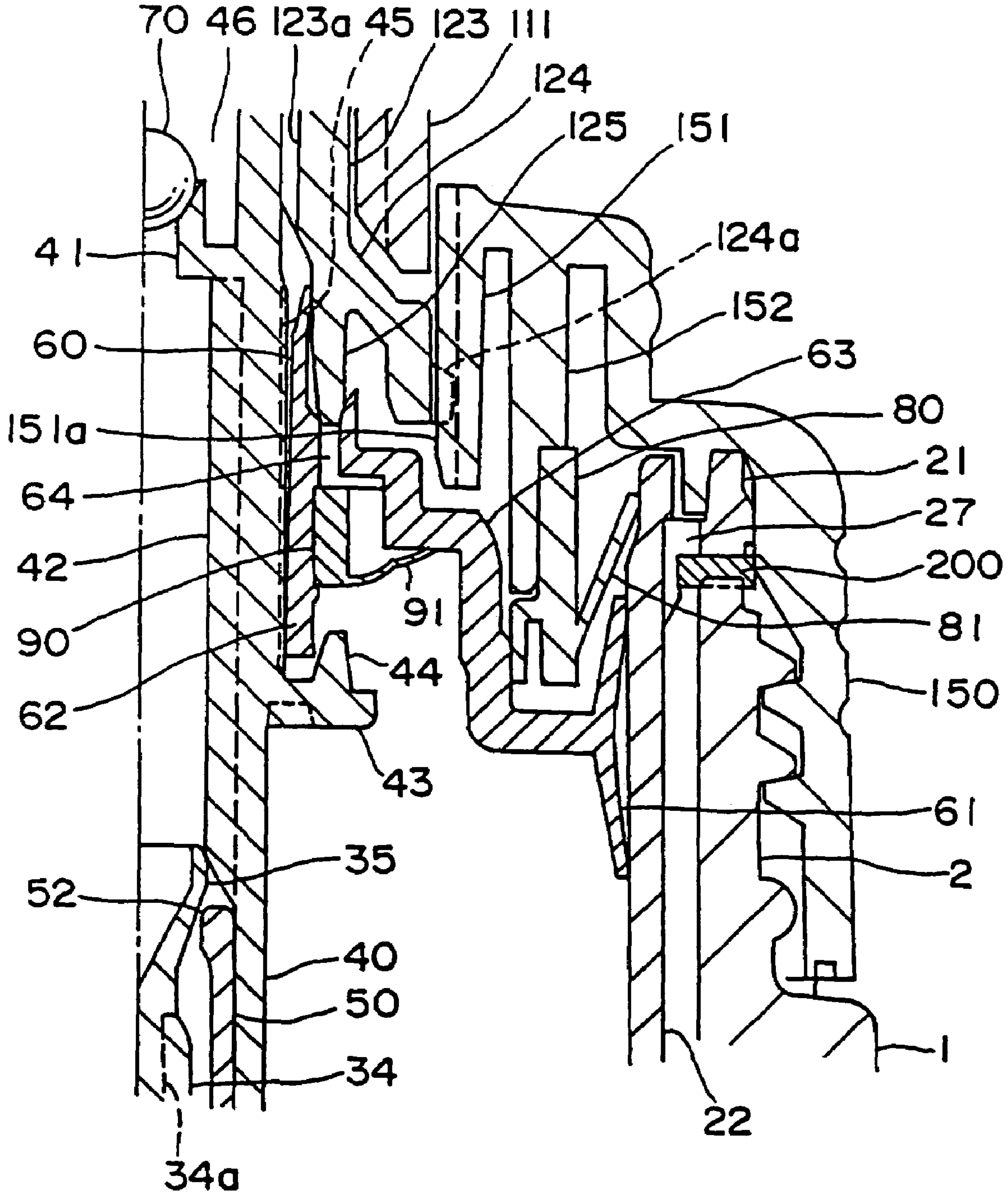
FIG. 19 is an enlarged longitudinal section diagram indicating the principal part of a container with a pump for discharging bubbles of the embodiment 4.

FIG. 16 and FIG. 17 are longitudinal section diagrams of the container with a pump for discharging bubbles of the embodiment 4, and FIG. 18 and FIG. 19 are enlarged diagrams indicating the principal parts.

In the container with a pump for discharging bubbles, the pump for discharging bubbles 10 is provided on the neck portion 2 of the container body 1. The liquid having a bubbling property such as a liquid for washing face is received within the container body 1.

The pump for discharging bubbles 10 comprises a cylinder member 20, a liquid suction valve 30, a stem 40, a first piston 50, a second piston 60, a liquid discharge valve 70, a first air suction valve 80, a second air suction valve 90, a pump head 100, a bubbling unit 130 and an attaching trunk 150.

The cylinder member 20 has an annular flange portion 21 on the upper end, and is constructed such that a cylinder-shaped large diameter cylinder portion (cylinder for air) 22 whose inside functions as an air chamber is extended downward from the flange portion 21, a cylinder-shaped small diameter cylinder portion (cylinder for liquid) 24 whose inside functions as a liquid chamber is extended downward in a concentric shape from a bottom board portion 23 of the large-diameter cylinder portion. 22, and a connection cylinder 25 is extended downward from the lower end of the small diameter cylinder 24.

The cylinder member 20 is fixed on the container body 1 by the attaching trunk 150 screwed to the neck portion 2 in a state that the large-diameter cylinder portion 22, the small-diameter cylinder portion 24 and the connection cylinder 25 are inserted into the container body 1 from the neck portion 2, the flange portion 21 is mounted on the packing 200 arranged on the upper surface of the neck portion 2. In the flange portion 21, a plurality of air holes 27 are provided in a region inside the neck portion 2.

The suction pipe 201 is connected to the connection cylinder 25 of the cylinder member 20, and the lower end of the suction pipe 201 is extended to the bottom of the container body 1.

The central cylinder portion 151 is provided on the center of the attaching trunk 150, and the pump head 100 is projected from the central cylinder portion 151 in a state that it can be moved upward and downward. The bubbling unit 130 is provided on the inside of the pump head 100, and the stem 40 which moves in the inside of the cylinder member 20 upward and downward is connected to the lower part of the pump head 100 fixedly. The liquid discharge valve 70 is provided on the inside of the stem 40, and the second piston 60 which slides on the internal surface of the large-diameter cylinder portion 22 air-tightly is provided on the peripheral portion of the stem 40. The second air suction valve 90 is provided on the second piston 60. The first piston 50 which slides on the internal surface of the small-diameter cylinder 24 fluid-tightly is linked to the lower part of the stem 40, and the liquid suction valve 30 which is connected to the stem 40 and the first piston 50 to be operated and opens and closes the connection cylinder 25, is arranged on the lower portion of the first piston 50.

Each of the constructions will be described in detail below. The liquid suction valve 30., coil spring 39 and the first piston 50 are received within the small-diameter cylinder portion of the cylinder member 20. The lower end of the liquid suction valve 30 is formed into the lower part valve body 31 which can be brought into contact with or separated from the valve seat 24*a* of a taper surface formed on the lower end of the small cylinder portion 24, and opens and closes the connection cylinder 25.

In the liquid suction valve 30, a plurality of engagement pins 32 which are projected to the outside are provided above the lower part valve body 31, and the engagement pin 32 is inserted between vertical ribs 26 provided on the lower end of the small-diameter cylinder portion 24 in a state that they can be moved upward and downward.

In the liquid suction valve 30, the portion upper than the engagement pin 32 is a large diameter portion 33, and the small-diameter portion 34 is linked to the upper part of the large-diameter portion 33. The vertical grooves 33*a* and 34*a* which are extended in the vertical direction are formed on the external surface of the large-diameter portion 33 and the external surface of the small-diameter portion 34, respectively. The upper end of the liquid suction valve 30 linked to the small-diameter portion 34 is as an upper part valve body 35 of taper cylinder shape whose diameter gets larger as it proceeds upward.

The first piston 50 is formed in a hollow cylinder shape in which the upper and lower ends are opened, the lower part of the first piston 50 functions as a seal portion 51 which slides on the internal surface of the small-diameter cylinder portion 24 fluid-tightly, and the upper-part opening margin of the first piston 50 functions as a valve seat 52.

The upper part valve body 35 of the liquid suction valve 30 is projected upward from the upper-part opening of the first piston 50 and can be brought into contact with or separated from the valve seat 52 of the first piston 50, and opens and closes the upper part opening of the first piston 50.

As shown in FIG. 16, normally, the small-diameter portion 34 of the liquid suction valve 30 is inserted into the first piston 50 in a state that there is the enough space between the internal surface of the first piston 50 and the small-diameter portion 34. As shown in FIG. 17, when the stem 40 is descended by depressing the pump head 100, the large-diameter portion 33 of the liquid suction valve 30 can be inserted into the first piston 50 in a state that there is a little space between the internal surface of the first piston 50 and the large-diameter portion 33, and the liquid passage is secured by the vertical groove 33*a*.

The coil spring 39 is provided between the upper end of the vertical rib 26 in the cylinder member 20 and the first piston 50 and energizes the first piston 50 upward. On the other hand, the engagement pin 32 of the liquid suction valve 30 can hold the lower end of the coil spring 39 from the lower direction, and accordingly controls the upper limit of the liquid suction valve 30 when it is moved upward.

The stem 40 is formed in a cylinder shape in which the upper and lower ends are opened, and is received within the large-diameter cylinder portion 22 and the small-diameter cylinder portion 24 in a state that it can be moved upward and downward. The upper part of the first piston 50 is inserted into the lower part of the stem 40 fixedly, and the seal portion 51 is projected from the lower part of the stem 40.

The annular valve seat 41 which is projected in a cross section of a L-like shape is formed on the inside upper part of the stem 40. In the inside of stem 40, the upper side of the valve seat 41 functions as a vapor-liquid mixing chamber 46, and the spherical liquid discharge valve 70 which can be brought into contact with and separated from the valve seat 41 is received within therein in a state that it can be moved.

In the inside of the stem 40, a plurality of vertical ribs 42 which are extended in the vertical direction are provided on the region from the region upper than the region to which the first piston 30 is fixed up to the lower part of the valve seat 41, in a state that they are dispersed with respect to the circumferential direction. As shown in FIG. 17, when the stem 40 is descended by depressing the pump head 100, the upper-part valve body 35 and the small-diameter portion 34 of the liquid suction valve 30 can be intruded into the inside of the vertical rib 42, and the space between the vertical ribs 42 and the vertical groove 34*a* in the small-diameter portion 34 of the liquid suction valve 30 functions as a liquid passage.

The pump head 100 connected to the upper part of the stem 40 is provided with an outside cylinder member 110 and an inside cylinder member 120. The inside cylinder member 120 is formed in a hollow cylinder shape in which the upper and lower ends are opened, and is provided with a small-diameter portion (bubble flow portion), a medium-diameter portion 122 and a large-diameter portion 123 from top to bottom, and a skirt cylinder portion 124 whose diameter is larger than that of the large-diameter portion 123 is linked to the lower end of the large-diameter portion 123. Besides, in the inside of the skirt cylinder portion 124, a cylinder-shaped valve body 125 is formed projectingly on the downward extension of the large-diameter portion 123.

Only one discharging hole 121*b* is opened in the small-diameter portion 121 of the inside cylinder member 120.

The upper part of the stem 40 is fitted into the inside of the large-diameter portion 123 of the inside cylinder member 120 to be fixed. Besides, a plurality of vertical grooves which are extended in the vertical direction are provided on the internal surface of the large-diameter portion 123 in a state that they are dispersed with respect to the circumferential direction. The upper end of the vertical grove 123*a* is extended to a position a little upper than the upper end of the stem 40 and the vertical groove 123*a* functions as an air passage.

The bubbling unit 130 is received and fixed on the inside of the medium-diameter portion 122 of the inside cylinder member 120. The bubbling unit 130 comprises a casing 131 of a hollow cylinder shape in which the upper and lower ends are-opened and two bubbling elements 132 provided on the casing 131. The upper portion of the casing 131 functions as a large-diameter portion 131*a* and lower portion of the casing 131 functions as a small-diameter portion 131*b*. The large-diameter portion 131*a* is inserted into and fixed on the inside of the medium diameter portion 122 of the inside cylinder member 120 and the small-diameter portion 131*b* is inserted into the inside of the stem 40 in a state that there is a space in the diametral direction. Besides, there is a space between the bottom of the large-diameter portion 131*a* and the upper end of the stem 40, and the spaces function as an air passage.

The bubbling element 132 is composed of a net (bubbling member) 133 provided on one end opening of the cylinder body in which the upper and lower ends are opened. In the bubbling element 132 arranged on the lower portion of the casing 131, the net 133 is provided on the lower end opening of the cylinder body, and in the bubbling element 132 arranged on the upper portion of the casing 131, the net 133 is provided on the upper end opening of the cylinder body 132*a*.

On the lower part internal surface of the small-diameter portion 131*b* of the casing 131, a plurality of vertical grooves which are extended upward from the lower end thereof are formed so that the passage for liquid and air can be secured even when the liquid discharge valve 70 comes into contact with the lower end of the small diameter portion 131*b*.

The outside cylinder member 110 of the pump head 100 has a peripheral wall portion 111 of a topped cylinder shape, and the projecting portion 112 which is projected to the side is provided on one side upper part of the peripheral wall portion 111. The inside of the peripheral wall portion 111 functions as a stepped hole in which the lower portion has a large diameter and the upper portion has a small diameter. On the other hand, the projecting portion 112 is formed in a cylinder shape in which the end is opened as an approximately rectangular nozzle 113, and the nozzle 113 is linked to the upper end of the stepped hole in the inside of the outside cylinder member 110. Further, the shape of the nozzle 113 is not limited to the rectangle, and the circle nozzle, elliptical nozzle and the like can be substituted for the rectangular nozzle 113.

The cylinder portion (closing body) 115 is extended from the internal surface of the top board portion 114 of the outside cylinder member 110, and only one opening. 115*a* is opened in the cylinder portion 115.

In the outside cylinder member 110, the cylinder portion 115 is fitted into the small-diameter portion 121 of the inside cylinder member 120 fluid-tightly in a state that it can be rotated, the medium-diameter portion 122 of the inside cylinder member 120 is fitted into the small-diameter part of the stepped hole of the outside cylinder member 110 fluid-tightly in a state that it can be rotated, the large-diameter portion 123 of the inside cylinder member 120 is inserted into the large-diameter part of the stepped hole in a state that there is a space between them, and accordingly the outside cylinder member is fitted outwardly to the inside cylinder member 120 so that it can be rotated.

Figure 20:
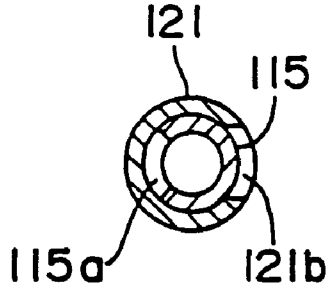
FIG. 20 is a partial cross section diagram of a pump head of a container with a pump for discharging bubbles of the embodiment 4.
Figure 21:
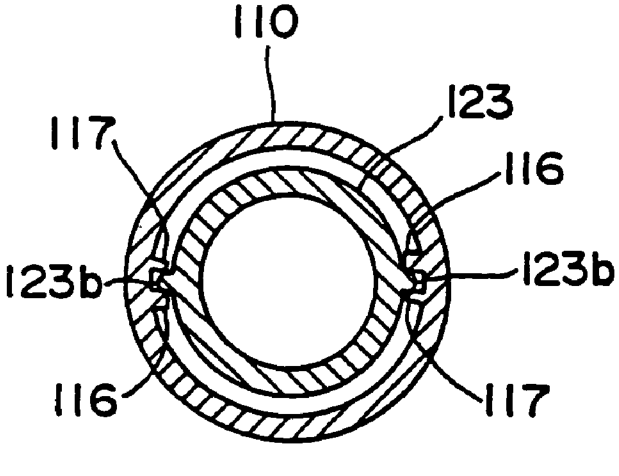
FIG. 21 is a partial cross section diagram of a pump head of a container with a pump for discharging bubbles of the embodiment 4.

FIG. 20 is a cross section diagram of the cylinder portion 115 of the outside cylinder member 110 and the small-diameter portion 121 of the inside cylinder member 120, and FIG. 21 is a cross section diagram of the large-diameter portion of the stepped hole of the outside cylinder member 110 and the large-diameter portion 123 of the inside cylinder member 120.

As shown in FIG. 21, in the internal surface of the large-diameter portion of the stepped hole of the outside cylinder member 110, sets of stopper projection 116 and passable projection 117 which are extended in the vertical direction are formed in positions which are separated at 180 degrees one another in the circumferential direction. On the other hand, on the external surface of the large-diameter portion 123 of the inside cylinder member 120, the projections 123*b* which are extended in the vertical direction are each formed on the positions which are separated at 180 degrees one another in the circumferential direction.

When the outside cylinder member 110 is rotated relatively to the inside cylinder member 120, although the projection 123*b* can pass over the passable projection 117 with a predetermined resistance, it can not pass over the stopper projection 116, and accordingly the rotation of the outside cylinder member 110 is limited by the stopper projection 116.

As shown in FIG. 21, when the projection 123*b* is positioned between the stopper projection 116 and the passable projection 117, the peripheral surface of the cylinder portion 115 closes the discharging hole 121*b* and the peripheral surface of the small-diameter portion 121 closes the opening 115*a* of the cylinder portion 115. Then, the opening 115*a* of the cylinder portion 115 is made to communicate with the discharging hole 121*b*, and the nozzle 113 is positioned in front of the discharging nozzle 121*b* in a state that the outside cylinder member 110 is rotated against the inside cylinder member 120, and the projection 123*b* is made to pass over the passable projection 117 to be stopped on the other stopper projection 117 which is separated at 180 degrees.

Figure 22:
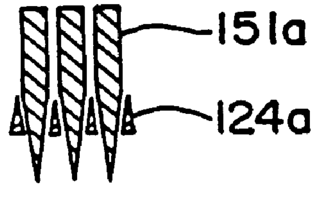
FIG. 22 is a longitudinal section diagram of an engagement part of a pump head and an attaching trunk of a container with a pump for discharging bubbles of the embodiment 4.

The skirt cylinder portion 124 of the inside cylinder member 120 is projected to the position lower than the peripheral wall portion 111 of the outside cylinder member 110, and the skirt cylinder portion 124 and the peripheral wall portion 111 are inserted into the central cylinder portion 151 of the attaching trunk 150 so that they can be moved upward and downward. A large number of vertical ribs 151*a* which are extended in the vertical direction are formed on the internal surface of the central cylinder portion 151, and a large number of engagement projections 124*a* which are each inserted between the vertical ribs 151*a* are formed on the lower end of the external surface of the skirt cylinder portion 124 in a state that they are projected to the outside. As shown in FIG. 22, the lower end of the vertical rib 151*a* tapers off as it proceeds downward, and the upper end of the engagement projection 124*a* tapers off as it proceeds upward so that the vertical rib 151*a* and the engagement projection 124*a* will be guided by the respective taper surface, when the pump head 100 is ascended from the lower position.

In the periphery of the stem 40, the annular flange portion 43 which is projected to the outside is formed near the middle in the vertical direction, and an annular rising wall 44 is provided projectingly, upwardly on the upper surface of the flange portion 43. The internal surface of the rising wall 44 is formed on the taper surface whose diameter is enlarged as it proceeds upward.

In the stem 40, the second piston 60 is fitted outwardly to the space between the flange portion 43 and the pump head 100 in a state that it can be moved upward and downward a little. The second piston 60 is formed in a hollow cylinder shape in which the upper and lower ends are opened, the utmost external portion is formed to the seal cylinder portion 61 which slides on the internal surface of the large-diameter cylinder portion 22 of the cylinder member 20 air-tightly, and the utmost internal portion is formed to the basic cylinder portion 62 which is fitted to the stem 40 outwardly so that the seal cylinder portion 61 and the basic cylinder portion 62 are connected with one another by the stepped cylinder portion 63 whose cross section is bent in a step form.

The upper part of the basic cylinder portion 62 is brought into contact with the internal surface of the cylinder-shaped valve body 125 of the pump head 100 air-tightly with pressure in a state that it can be slid. The air holes 64 are provided on the part where the basic cylinder portion 62 is connected to the stepped cylinder portion 63 in a state that they are dispersed with respect to the circumferential direction, and the air holes 64 are opened and closed by relative upward and downward movement between the pump head 100 and the second piston 60. Namely, the air hole 64 is closed when the pump-head 100 moved upward and downward relatively to the second piston 60 so that the cylinder-shaped valve body 125 of the pump head 100 comes into contact with the part where the basic cylinder portion 62 is connected to the stepped cylinder portion 63, and the air hole 64 is opened when the cylinder-shaped valve body 125 is separated from the above-mentioned connection part.

The lower end of the basic cylinder portion 62 is brought into contact with and separated from the internal surface of the rising wall 44 of the stem 40 by the relative upward and downward movement between the stem 40 and the second piston 60. In the external surface of the stem 40, a plurality of vertical grooves 45 which are extended in the vertical direction are provided on the region to which the basic cylinder portion 62 is fitted outwardly in a state that they are dispersed with respect to the circumferential direction. The vertical groove 45 is made to communicate with the inside of the large-diameter cylinder portion 22 when the lower end of the basic cylinder portion 62 is separated from the rising wall 44 of the stem 40, and the vertical groove 45 is shut off from the inside of the large-diameter cylinder portion 22 when the lower end of the basic cylinder portion 62 is brought into contact with the rising wall 44.

The second air suction valve 90 is fixed on the lower part of the basic cylinder portion 62. The second air suction valve 90 is provided with an annular diaphragm-91 of upward taper which is extended to the outside in the diametral direction from the lower end thereof. The diaphragm 91 has an elasticity and operates so that the peripheral end portion of the diaphragm 91 comes into contact with the lower surface of the stepped cylinder portion 63 of the second piston 60 to be sealed under normal conditions, and the peripheral end of the diaphragm 91 is pulled downward by negative pressurization within the large diameter cylinder portion 22 to be separated from the stepped cylinder portion 63.

In the attaching trunk 150, the cylinder-shaped rib 152 is provided on the outside of the central cylinder portion 151, and the first air suction valve 80 for sealing the space between the attaching trunk 150 and the internal surface of the large-diameter cylinder portion 22, is fixed on the lower end of the cylinder-shaped rib 152. A seal cylinder portion 81 of the first suction valve 80 in contact with the large-diameter cylinder portion 22 is formed in a taper cylinder shape to be extended in the diagonal upper direction and has: an elasticity, and the upper end portion of the seal cylinder portion 81 operates so that it is pulled inside in the diametral direction by negative pressurization within the container body 1, to be separated from the internal surface of the large-diameter cylinder portion 22.

Further, the clear cover 202 is detachably provided on the attaching trunk 150.

Then, the operation of the container with a pump for discharging bubbles of the embodiment 4 will be described.

FIG. 16 and FIG. 18 indicate a state that the pump head is not yet depressed, namely, a state that the pump head 100 is positioned at the upper limit. Besides, FIG. 16 indicates a state that the discharging hole 121*b* of the inside cylinder member 120 in the pump head 100 is closed.

When the bubbles are discharged, first of all, the cover 202 is removed and the outside cylinder member 110 is rotated against the inside cylinder member 120 so as to make the discharging hole 121*b* of the inside cylinder member 120 communicate with the opening 115*a* of the outside cylinder member 110.

In a state that the pump head 100 is not yet depressed, the liquid suction valve 30 is pushed up by the coil spring 39 through the first piston 50, the lower-part valve body 31 is separated from the valve seat 24*a* of the cylinder member 20, and the inside of the small-diameter cylinder portion 24 is made to communicate with the inside of the container body 1 through the suction pipe 201. The upper-part valve body 35 of the liquid suction valve 30 is in contact with the valve seat 52 of the first piston 50 to close the upper part opening of the first piston 50. The lower end of the basis cylinder portion 62 of the second piston 60 is in contact with the rising wall 44 of the stem 40, the first air suction valve 80 is in contact with the stepped cylinder portion 63 of the second piston 60 and the large-diameter cylinder portion 22 of the cylinder member 20 with pressure, and the lower end of the cylinder-shaped valve body 125 of the pump head 100 is separated from the stepped cylinder portion 63 of the second piston 60 to open the air hole 64.

As the pump head 100 is depressed from that state, the stem 40 and the first piston 50 are descended together with the pump head 100. As a result., as shown in FIG. 19, the upper-part valve body 35 of the liquid suction valve 30 is separated from the valve seat 52 of the first piston 50 to open the upper-part opening of the first piston 50. At almost the same time, the inside of the small-diameter cylinder portion 24 is pressurized by descending of the first piston 50, the liquid suction valve 30 is descended by the hydraulic pressure within the small-diameter cylinder portion 24 and the lower-part valve body 31 comes into contact with the valve seat 24*a* to close the lower-part opening of the small diameter cylinder portion 24. On the other hand, the second piston 60 is standing by the frictional force between the seal cylinder portion 61 and the large-diameter cylinder portion 22 right after the depressing of the pump head has been started. As a result of descending of the stem 40 in the state, the lower end of the basic cylinder portion 62 of the second piston 60 is separated from the rising projection 44 of the stem 40, and the lower end of the cylinder-shaped valve body 125 of the pump head 100 comes into contact with the stepped cylinder portion 63 of the second piston 60 to close the air hole 64.

The second piston 60 is also descended together with the pump head 100, the stem 40 and the first piston 50, after the lower end of the cylinder-shaped valve body 125 of the pump head 100 comes into contact with the stepped cylinder portion 63 of the second piston 60.

As the pump head 100 is descended after that, the liquid within the small-diameter cylinder portion 24 pressurized by the first piston 30 passes through the upper-end opening of the first piston 30 and the vertical grooves 33*a* and 34*a* of the liquid suction valve 30, and passes through the space between the vertical ribs 42 of the stem 40 to be pushed into the upper-part of the upper part valve body 35. Further the liquid pushes up the liquid discharge valve 70 with the hydraulic pressure to flow into the vapor-liquid mixing chamber 46 (See FIG. 17). On the other hand, the air received within the large-diameter cylinder portion 22 passes through the space between the flange portion 43 and the rising projection 44 of the stem 40 and the lower end of the basic cylinder portion 62 in the second piston 60, passes through the vertical groove 45 of the stem 40 and passes through the vertical groove 123*a* of the inside cylinder member 120 in the pump head 100. Further, the air passes through the passage between the casing 131 of the bubbling unit 130 and the stem-40 to flow into the vapor-liquid mixing chamber 46.

Figure 23:
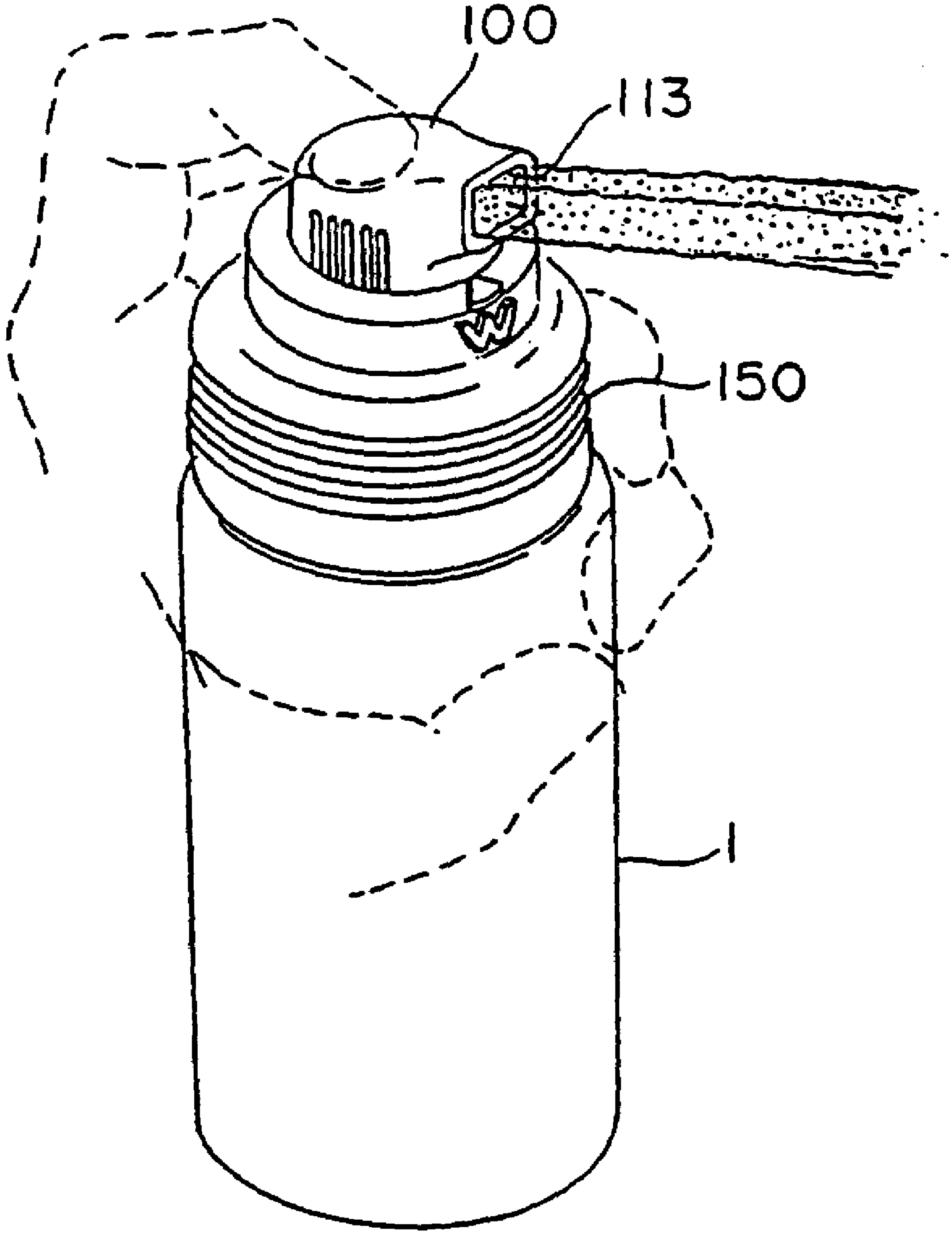
FIG. 23 is a perspective outside diagram indicating a discharging state of bubbles of a container with a pump for discharging bubbles of the embodiment 4.

Then, the liquid and the air are joined and mixed within the vapor-liquid mixing chamber 46 to be delivered into the bubbling unit 130. After that, the liquid is bubbled when it passes through two upper and lower nets 133 of the bubbling unit 130 to be pushed into the cylinder portion 115 of the pump head 100 in a foamy state. The bubbles pass through the opening 115*a* of the cylinder portion 115 and the discharging hole 121*b* of the small-diameter portion 121 to be discharged from the nozzle 113 of the pump head 100. FIG. 23 indicates a discharging state of the bubbles at the time.

If the finger is off from the pump head 100 after the depressing of the pump head 100, the hydraulic pressure within the small-diameter cylinder portion 24 and the air pressure within the large-diameter cylinder portion 22 fall, the liquid discharge valve comes into contact with the valve seat 41, and the first piston 50, the stem 40 and the pump head 100 are pushed up by the elasticity of the coil spring 39.

Hereupon, the second piston 60 is standing by the frictional force between the seal cylinder portion 61 and large-diameter cylinder portion 22 right after the pushing up of the stem 40 has begun. As a result of ascending of the stem 40 in the state, the internal surface of the rising projection 44 of the stem 40 comes in contact with the lower end of the basic cylinder portion 62 of the second piston 60 with pressure to close the space between the inside of the bid diameter cylinder portion 22 and the vertical groove 45 of the stem 40. At the same time, the lower end of the cylinder-shaped valve body 125 of the pump head 100 is separated from the stepped cylinder portion 63 of the second piston 60 to open the air hole 64.

The first piston 50, the stem 40, the second piston 69 and the pump head 100 are ascended together after the internal surface of the rising projection 44 comes into contact with the lower end of the basic cylinder portion 62.

The inside of the small-diameter cylinder portion 24 is pressurized negatively when the first piston 50 is ascended, and accordingly the liquid suction valve 30 is pulled up and the lower part valve body 31 is separated from the valve seat 24*a* so as to make the inside of the small diameter cylinder portion 24 communicate with the inside of the container body 1. As a result, the liquid within the container body 1 is sucked up into the small diameter cylinder portion 24 as the first piston 50 is ascended.

The inside of the container body 1 is pressurized negatively when the liquid is pumped up into small-diameter cylinder, and accordingly the seal cylinder portion 81 of the first air suction valve 80 is drawn to the direction away from the internal surface of the large-diameter cylinder portion 22, and the gap is generated between the seal cylinder portion 81 and the large-diameter cylinder portion 22.

Besides, the inside of the large-diameter cylinder portion 22 is also pressurized negatively as the second piston 60 is ascended, and accordingly the diaphragm 91 of the second air suction valve 90 is drawn downward and separated from the stepped cylinder portion 63 of the second piston 60 so as to generate the gap.

As a result of operating of the first air suction valve 80 and the second air suction valve 90 in the above-mentioned way, the outside air is sucked into the attaching trunk 150 from the space between the central cylinder portion 151 of the attaching trunk 150 and the pump head 100. Then, part of the air passes through the air hole 64 of the second piston 60 to get into the large-diameter cylinder portion 22, and the other air passes through the air hole 27 of the flange portion 21 in the cylinder member 20 to get into the container body 1. Accordingly, the pressures within the large-diameter cylinder portion 22 and the container body 1 are equal to the air pressure, the first piston 50 and the second piston 60 are ascended smoothly, and the liquid is pumped up into the small diameter cylinder portion 24 smoothly.

When the container is in a state that it is not used after returning the pump head 100 to the upper limit position, the outside cylinder member 110 of the pump head 100 is rotated against the inside cylinder member 120, the discharging hole 121*b* of the inside cylinder member 120 is closed by the cylinder portion 115 of the outside cylinder member 110, and the opening 115*a* of the cylinder portion 115 is closed by the small-diameter portion 121 of the inside cylinder member 120. At that time, the projection 123*b* of the outside cylinder member 110 passes over the passable projection 117 of the inside cylinder member 120 to come into contact with the stopper projection 116.

As mentioned hereinbefore, if the opening 151*a* and the discharging hole 121*b* are closed, the inside of the pump for discharging bubbles 10 can be prevented from getting dry, and the bubbles which are not discharged and are remaining within the pump for discharging bubbles 10 do not get dry to be solidified. Accordingly, the bubbles adhered to the net 133 of the bubbling unit 130 do not get dry to be solidified, and the net 133 is not be clogged. As a result, the bubbles can be formed securely and stably even when the bubbles are discharged for the next time.

Embodiment 5

The container with a pump for discharging bubbles of the embodiment 5 will be described in accordance with FIG. 24 and FIG. 27.

Figure 24:
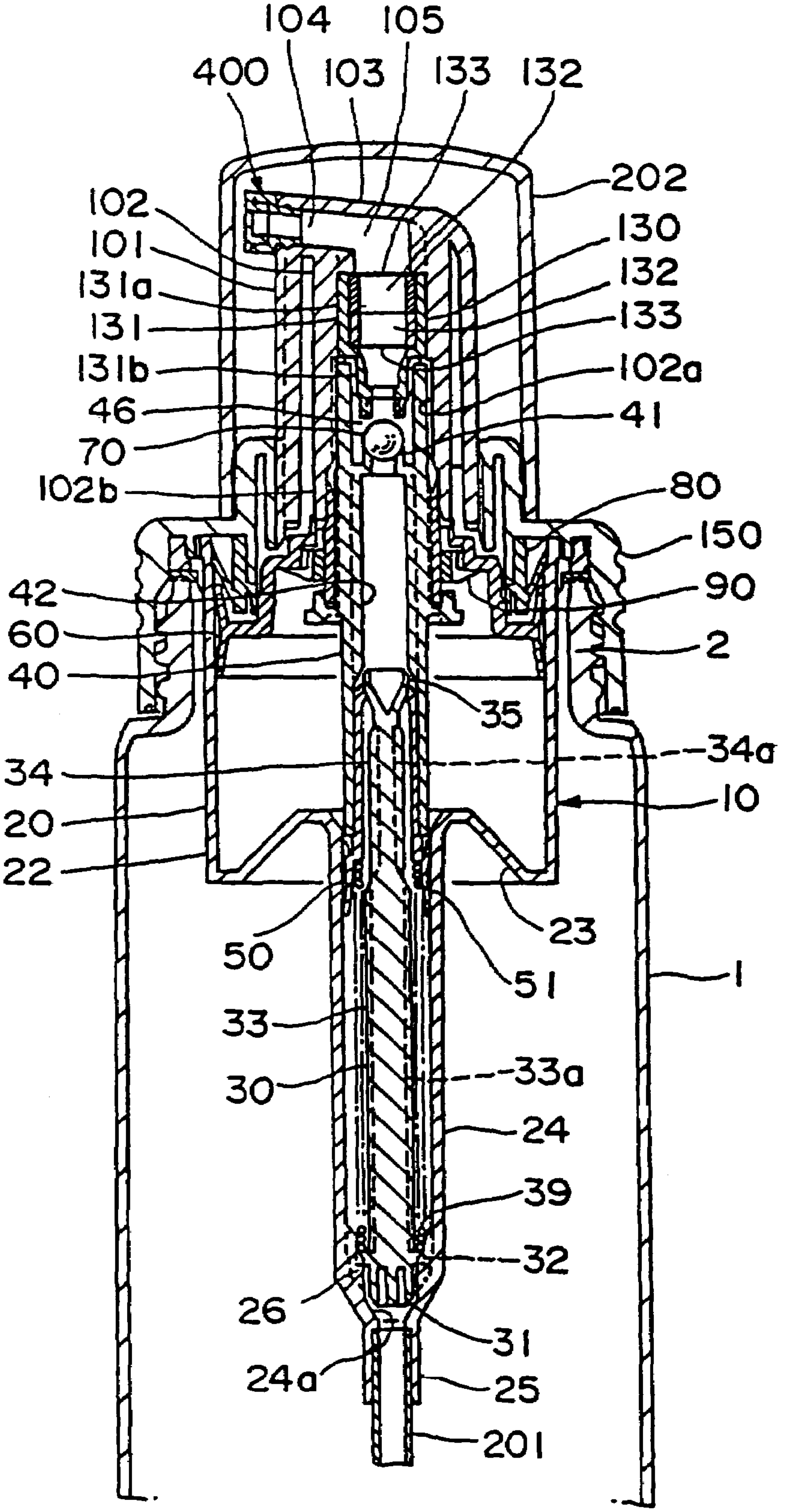
FIG. 24 is a longitudinal section diagram indicating a state that a pump head is positioned at an upper limit in a container with a pump for discharging bubbles of the embodiment 5.

FIG. 24 is a longitudinal section diagram of the container with a pump for discharging bubbles of the embodiment 5. The difference between the embodiment 5 and the embodiment 4 lies in the pump head 100, and other constructions are the same as those of the embodiment 4. Only the difference will be described below and the descriptions concerning the constructions which are the same as those of the container with a pump for discharging bubbles of the embodiment 4 will be omitted by giving the identical numbers to the same conditional parts.

Unlike the embodiment 4, the pump head 100 in the embodiment 5 is not made up of two parts of the outside cylinder member and the inside cylinder member, and the parts corresponding to the members are made up of one part in a body.

Namely, the pump head 100 has a structure in which the outside cylinder portion 101, the inside cylinder portion 102 and the top board portion 103 are formed in a body. The nozzle 104 is opened in the one side upper part of the outside cylinder portion 101 and the upper part of the stem 40 is inserted into and fixed on the lower part of the inside cylinder portion 102 and the bubbling unit 130 is received and fixed on the upper part of the inside cylinder portion 102. Besides, the bubbling unit 130 is connected to the nozzle 104 through the bubbling passage 105 provided within the pump head 100.

Besides, in the internal surface of the inside cylinder portion 102, the vertical groove 102*a* corresponding to the vertical groove 123*a* of the embodiment 4 is formed on the region to which the stem 40 is fitted inwardly, and the lower end portion 102*b* of the inside cylinder portion 102 has the same function as the cylinder-shaped valve body 125 in the embodiment 4 and opens and closes the air hole 64 of the second piston 60.

Figure 25:
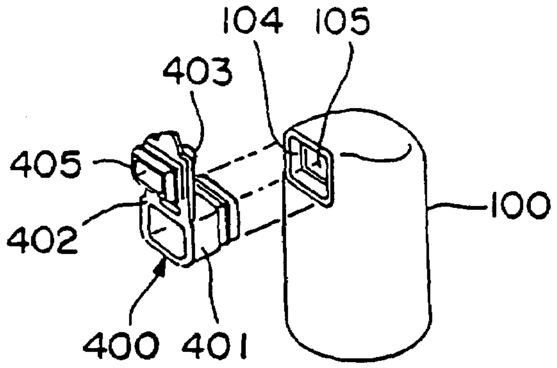
FIG. 25 is a perspective exploded diagram of a pump head and a closing device of a container with a pump for discharging bubbles of the embodiment 5.
Figure 26:
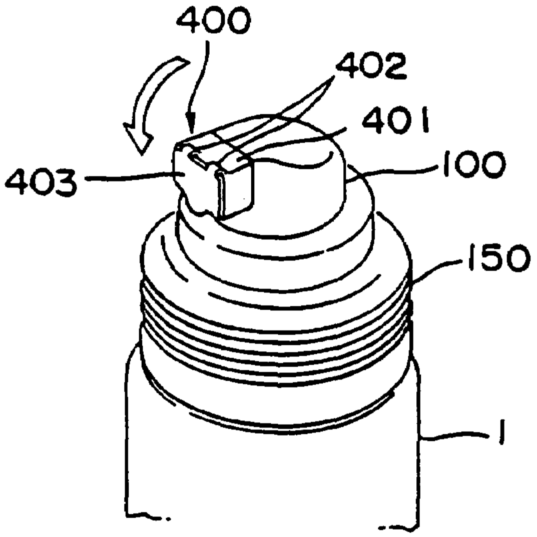
FIG. 26 is a perspective diagram indicating a state that a closing device of a container with a pump for discharging bubbles of the embodiment 5 is closed.

In the embodiment 5, a closing device 400 is provided on the nozzle 104. As shown in FIG. 25 to FIG. 27, the closing device 400 is provided with a cylinder body portion 401 of a rectangle cross section whose inside functions as a bubble passage and a closing body 403 which is provided on the end of the cylinder body portion 401 through a hinge portion 402 in a state that it can be swung in the vertical direction. An fitting cylinder portion 405 of a rectangle section which can be fitted into the cylinder body portion 401 is projected from the back face of the closing body 403. The closing unit 400 is fixed on the pump head 100 by fitting the base of the cylinder body portion 401 into the bubbling passage 105 from the nozzle 104.

In the embodiment 5, as shown in FIG. 26, it is possible to close the nozzle 104 and seal up the inside of the pump for discharging bubbles 10 by swinging the closing body 403 downward and fitting the fitting cylinder portion 405 of the closing body 403 into the end of the cylinder body portion 401. Accordingly, also in case of the embodiment 5, the bubbles within the pump for discharging bubbles 10 do not get dry to be solidified even when they are not used, it is possible to prevent the net 133 from being clogged, and the bubbles can be formed securely and stably.

Figure 27:
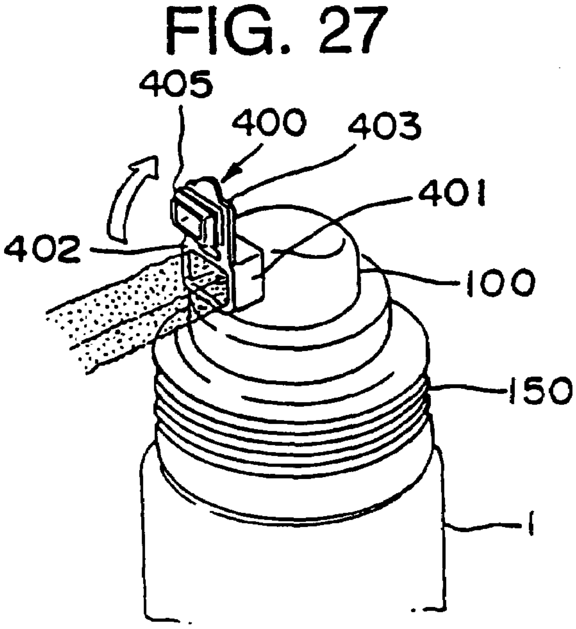
FIG. 27 is a perspective diagram indicting a state that a closing device of a container with a pump for discharging bubbles of the embodiment 5 is opened to discharge bubbles.

Further, as shown in FIG. 27, when the bubbles are discharged, the pump head 100 is depressed for pumping up in a state that the closing body 403 of the closing device 400 is swung upward so as to expose the end opening of the cylinder body portion 401. Then, the bubbles are discharged from the end opening of the cylinder body portion 401.

Further, the cross section shape of the cylinder body portion 401 is not limited to the rectangle, and it may be determined by the shape of the nozzle 104.

Embodiment 6

The container with a pump for discharging bubbles of the embodiment 6 will be described in accordance with FIG. 28 to FIG. 34.

Figure 28:
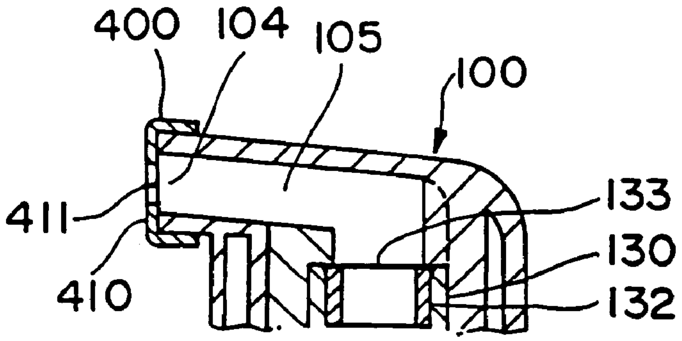
FIG. 28 is a longitudinal section diagram of a pump head and a closing device of a container with a pump for discharging bubbles of the embodiment 6.
Figure 29:
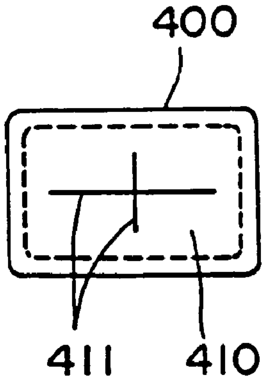
FIG. 29 is a front view diagram of a closing device of a container with a pump for discharging bubbles of the embodiment 6.

The difference between the embodiment 6 and the embodiment 5 lies in the closing device 400, and other constructions are the same as those of the embodiment 5. FIG. 28 is a longitudinal section diagram indicating a part in which the pump head 100 is connected to the closing device 400, and FIG. 29 is a front view diagram of the closing device 400.

The closing device 400 of the embodiment 6 is formed in a capped shape which covers the nozzle 104 of the pump head 100. The closing device 400 is made up of a material having an elasticity such as elastomer, and as shown in FIG. 29, a slit 411 is provided on a front wall portion 410 thereof in a cross shape. The slit 411 is closed under normal conditions, and when the pump head 100 is pushed down to discharge the bubbles into the bubble passage 105 and raise the pressure within the bubble passage 105, each part of the front wall portion 410 divided by the slit 411 is deformed elastically to be projected to the front. Then, the front wall portion 410 is opened and the bubbles are discharged from the opening.

When the depressing of the pump head 100 is stopped and the pressure within the bubbling passage 105 is reduced, the front wall portion 401 of the closing device 400 returns by its own elasticity to close the front wall portion 410. As a result, also in case of the embodiment 6, the bubbles within the pump for discharging bubbles 10 do not get dry to be solidified and it is possible to prevent the net 133 from clogging even when they are not used, and the bubbles can be formed securely and stably.

Figure 30:
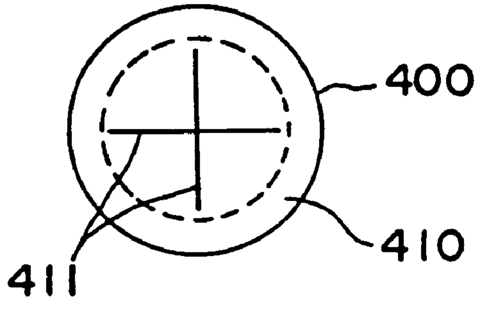
FIG. 30 is a front view diagram indicating a modified embodiment of a closing device of a container with a pump for discharging bubbles of the embodiment 6.

FIG. 30 to FIG. 34 are the modified examples of the embodiment 6. Namely, the shape of the front wall portion 410 of the closing device 400 is determined according to the shape of the nozzle 104, and as shown in FIG. 30, the shape of the front wall portion 410 can be made into a circle, when the shape of the nozzle 104 is a circle.

Figure 31:
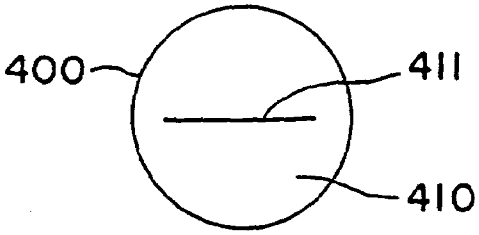
FIG. 31 is a front view diagram indicating a deformed example of a closing device of a container with a pump for discharging bubbles of the embodiment 6.
Figure 32:
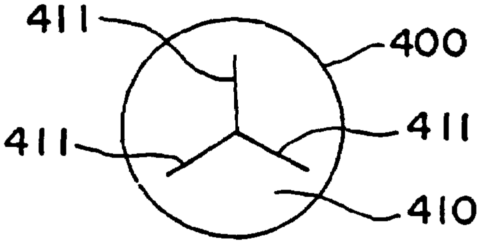
FIG. 32 is a front view diagram indicating a modified embodiment of a closing device of a container with a pump for discharging bubbles of the embodiment 6.
Figure 33:
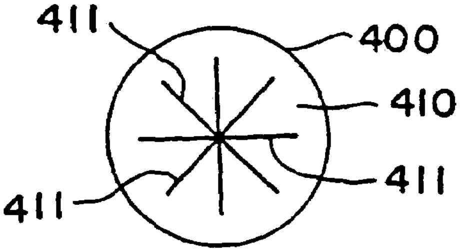
FIG. 33 is a front view diagram indicating a modified embodiment of a closing device of a container with a pump for discharging bubbles of the embodiment 6.

Besides, the shape of the slit 411 is not limited to the cross, the slit of a straight line shape can be substituted for the slit 411 as shown in FIG. 31, the Y-shaped slit can be substituted for the slit 411 as shown in FIG. 32, and eight pieces of slits can be formed in a radial shape as shown in FIG. 33.

Figure 34:
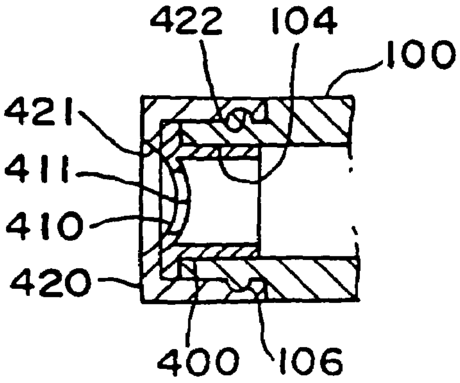
FIG. 34 is a longitudinal section diagram indicating a modified embodiment of a closing device of a container with a pump for discharging bubbles of the embodiment 6.

Further, in the form shown in FIG. 34, the closing device 400 is provided on the nozzle 104 in a state it is inserted into the nozzle 104, the closing device 400 provided on the nozzle 400 is covered with the cover 420 having an opening 421, and the cover 420 is fitted to the pump head 100 to engage the engagement projection 106 of the pump head 100 with the engagement concave portion 422 of the cover 420 so that the closing device 400 is not disconnected from the pump head 100.

Embodiment 7

The container with a pump for discharging bubbles of the embodiment 7 will be describe in accordance with FIG. 35 to FIG. 40.

Figure 35:
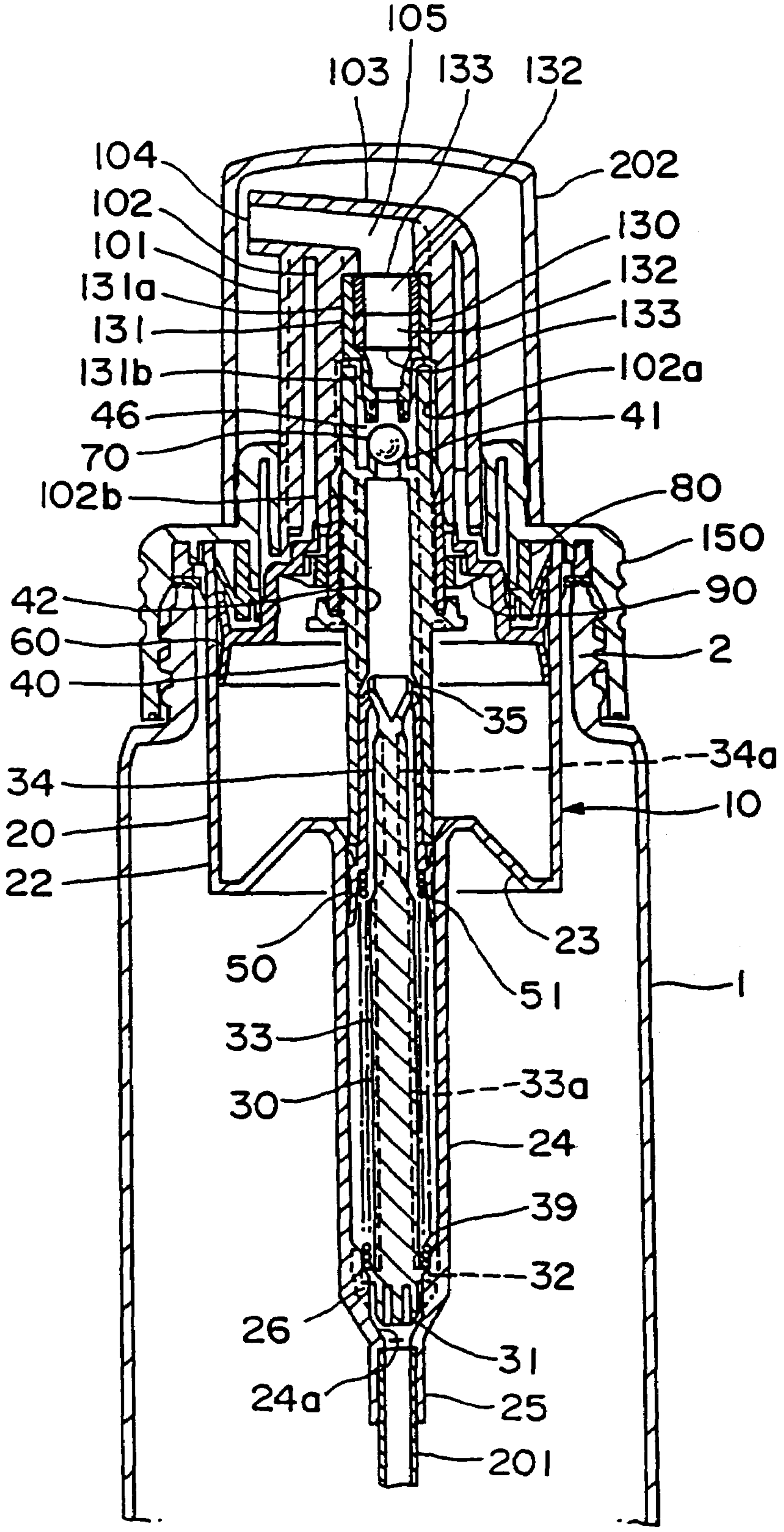
FIG. 35 is a longitudinal section diagram indicating a state that a pump head is positioned at an upper limit in a container with a pump for discharging bubbles of the embodiment 7.
Figure 36:
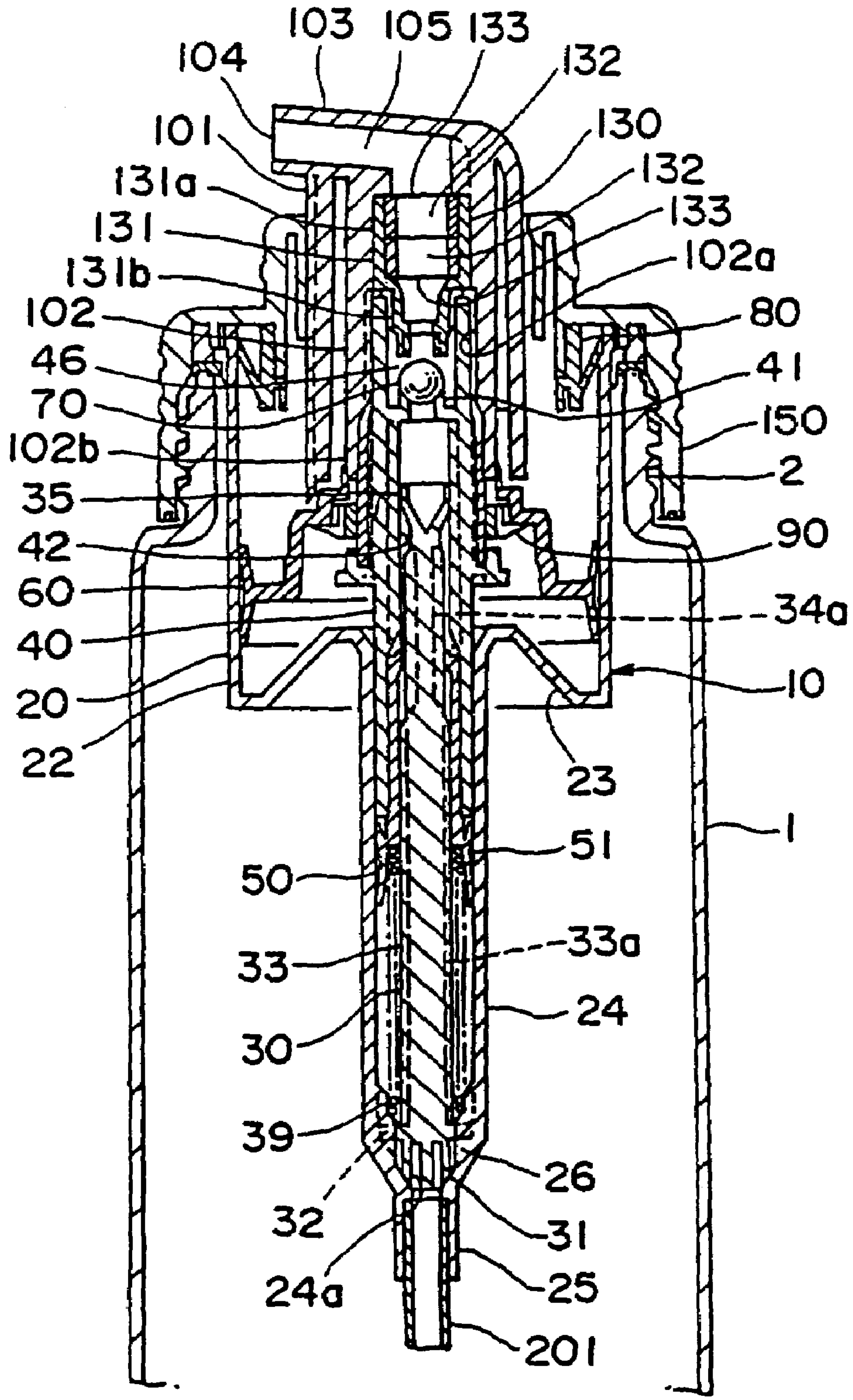
FIG. 36 is a longitudinal section diagram indicating a state that a pump head is partly depressed in a container with a pump for discharging bubbles of the embodiment 7.
Figure 37:
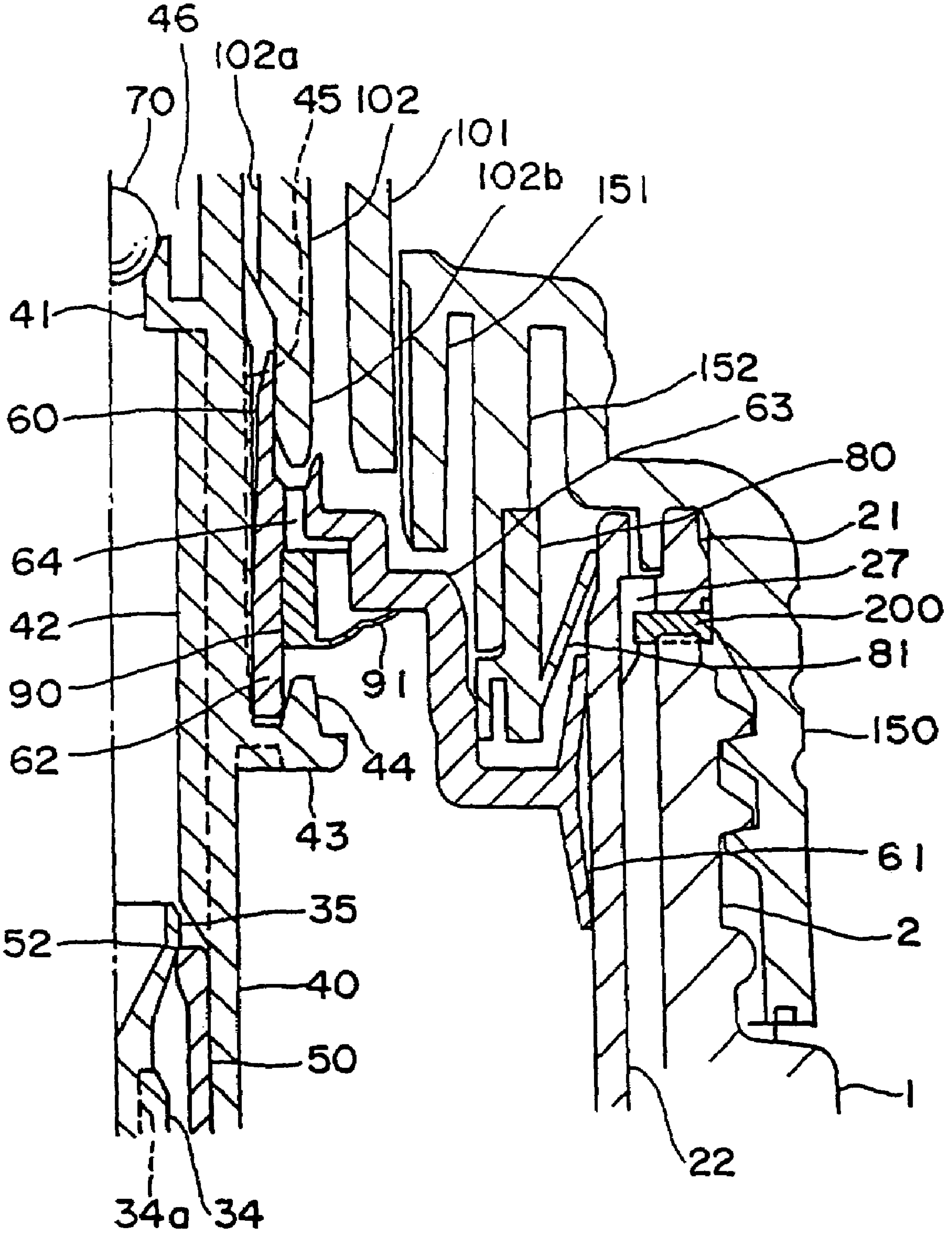
FIG. 37 is an enlarged longitudinal section diagram indicating the principal part of a container with a pump for discharging bubbles of the embodiment 7.
Figure 38:
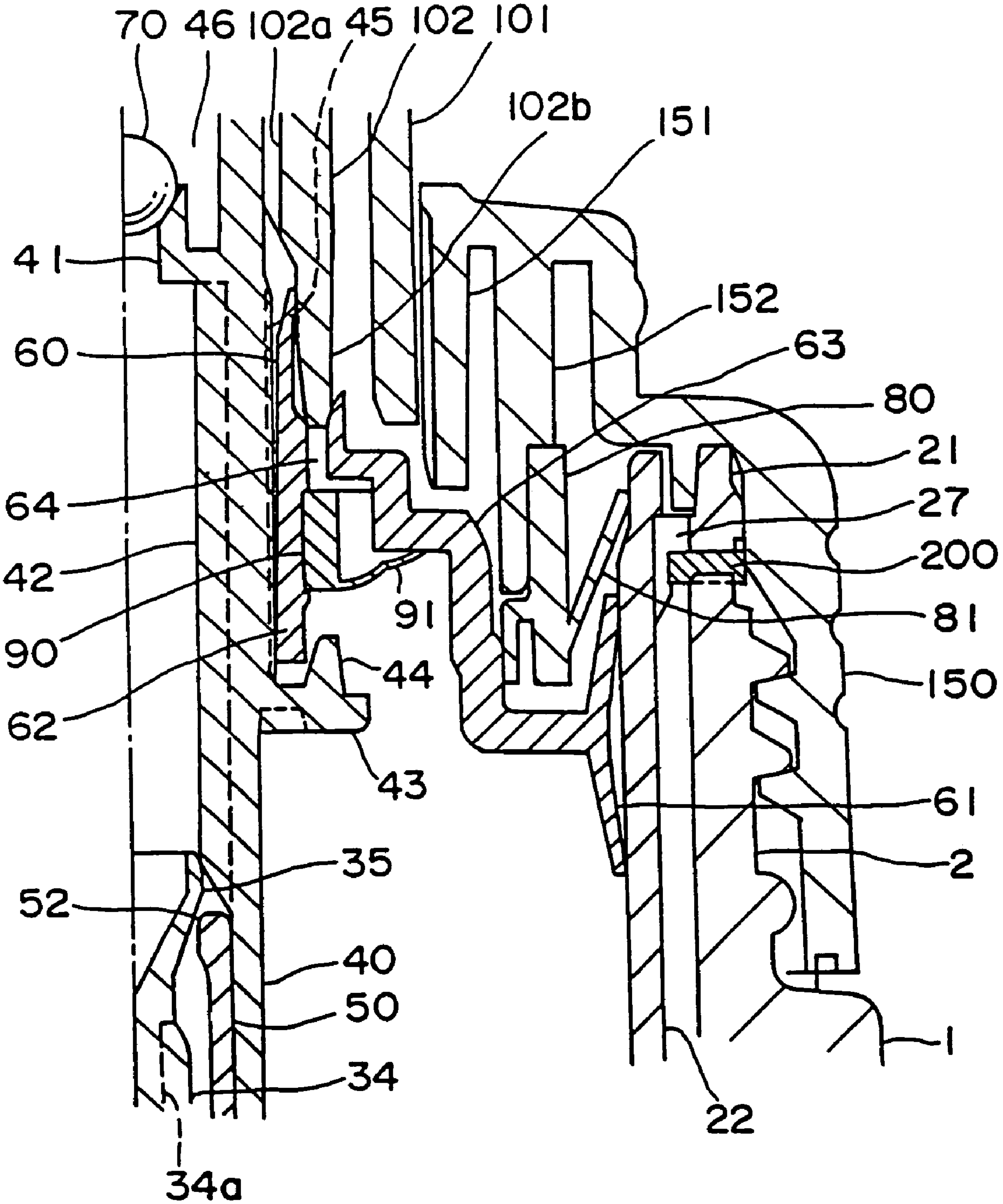
FIG. 38 is an enlarged longitudinal section diagram indicating the principal part of a container with a pump for discharging bubbles of the embodiment 7.
Figure 39:
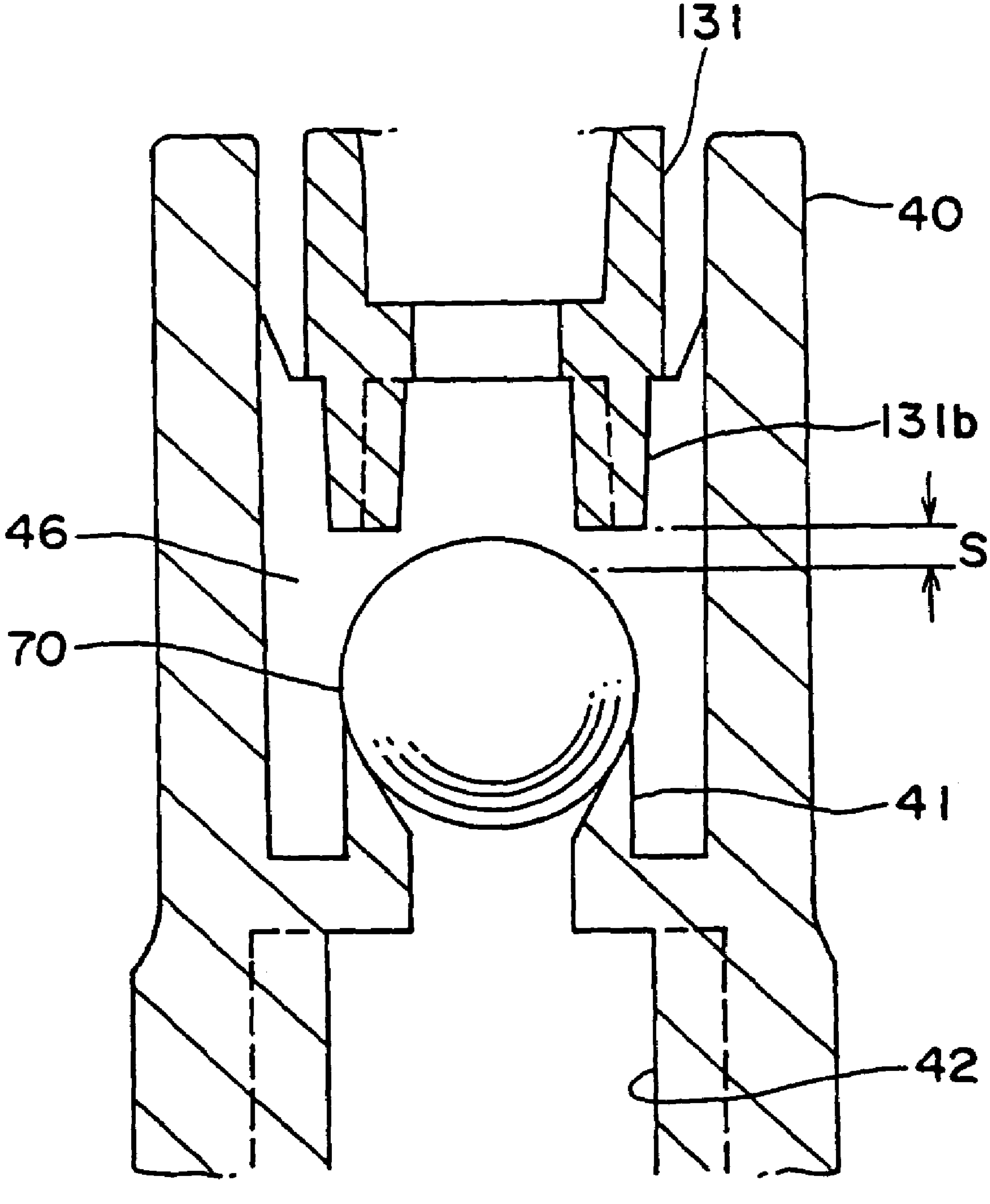
FIG. 39 is an enlarged longitudinal section diagram around a liquid discharge valve of a container with a pump for discharging bubbles of the embodiment 7.

FIG. 35 and FIG. 36 are longitudinal section diagrams of the container with a pump for discharging bubbles of the embodiment 7, and FIG. 37 to FIG. 39 are enlarged diagrams indicating the principal parts.

In the container with a pump for discharging bubbles, the pump for discharging bubbles 10 is provided on the neck portion of the container body 1. The liquid having a bubbling property such as a liquid for washing faces is received within the container body 1.

The pump for discharging bubbles 10 comprises a cylinder member 20, a liquid suction valve 30, a stem 40, a first piston 50, a second piston 60, a liquid discharge valve 70, a first air suction valve 80, a second air suction valve 90, a pump head 100, a bubbling unit 130 and an attaching trunk 150.

The cylinder member 20 has an annular flange portion 21 on the upper end, and is constructed such that a large-diameter cylinder portion (cylinder for air) 22 of a cylinder shape whose inside functions as a vapor chamber is extended downward from the flange unit 21, a small diameter cylinder portion (cylinder for liquid) 24 of a cylinder shape whose inside functions as a liquid chamber is extended downward from a bottom plate portion 23 of the large-diameter cylinder portion 22 in a concentric shape, and a connection cylinder 25 is extended downward from the lower end of the small-diameter cylinder portion 24.

In a state that the large-diameter cylinder 22, the small diameter cylinder portion 24 and the connection cylinder 25 are inserted into the container body 1 from the neck portion 2, and a flange portion 21 is mounted on a packing 200 arranged on the upper surface of the neck portion 2, the cylinder member is fixed on the container body 1 by the attaching trunk 150 screwed on the neck portion 2. In the flange portion 21, a plurality of air holes 27 are provided in a region inside than the neck portion 2.

A suction pipe 201 is connected to the attaching trunk 25 of the cylinder member 20, and the lower end of the suction pipe 201 is extended to the bottom of the container body 1.

A central cylinder portion 151 is provided on the center of the attaching trunk 150, and a pump head 100 is projected from the central cylinder portion 151 in a state that it can be moved upward and downward. The bubbling unit 130 is provided within the pump head 100, and the stem 40 which moves in the inside of the cylinder member 20 upward and downward is connected to the lower part of the pump head 100 fixedly. The liquid discharge valve 70 is provided on the inside of the stem 40, and the second piston 60 which slides on the internal surface of the large-diameter cylinder unit 22 air-tightly is provided on the peripheral portion of the stem 40. The second air suction valve 90 is provided on the second piston 60. The first piston 50 which slides on the internal surface of the small diameter cylinder portion 24 fluid-tightly is linked to the lower part of the stem 40, and the liquid suction valve 30 which is connected to the stem 40 and the first piston 50 to be operated and opens and closes the connection cylinder 25, is arranged on the lower portion of the first piston 50.

Each of the constructions will be described in detail below. The liquid suction valve 30, a coil spring 39 and the first piston 50 are received within the small-diameter cylinder portion 24 of the cylinder member 20. The lower end of the liquid suction valve 30 is formed into the lower-part valve body 31 which can be brought into contact with and separated from the valve seat 24*a* of a taper surface formed on the lower end of the small diameter cylinder portion 25.

In the liquid suction valve 30, a plurality of engagement pins 32 which are projected to the outside are provided above the lower-part valve body 31, and the engagement pin 32 is inserted between the vertical ribs 26 provided on the lower end of the small diameter cylinder portion 24 in a state that they can be moved upward and downward.

In the liquid suction valve 30, the portion upper than the engagement pins 32 is as a large-diameter portion 33, and the small-diameter portion 34 is linked to the upper part of the large-diameter portion 33. The vertical grooves 33*a* and 34*a* which are extended in the vertical direction are formed on the external surface of the large-diameter portion 33 and the peripheral surface of the small-diameter portion 34 respectively. The upper end of the liquid suction valve 30 linked to the small-diameter portion 34 functions as an upper part valve body of a taper cylinder shape whose diameter gets larger as it proceeds upward.

The first piston 50 is formed in a hollow cylinder shape in which the upper and lower ends are opened, the lower part of the first piston 50 functions as a seal portion 51 which slides on the internal surface of the small-diameter cylinder portion 24 fluid-tightly, and the upper part opening margin of the first piston 50 functions as a valve seat 52.

The upper part valve body 35 of the liquid suction valve 30 is projected upward from the upper-part opening of the first piston 50 and can be brought into contact with and separated from the valve seat 52 of the first piston 50 to open and close the upper part opening of the first piston 50.

As shown in FIG. 35, normally, in the inside of the first piston 50, the small-diameter portion 34 of the liquid suction valve 30 is inserted into the space between the internal surface of the first piston 50 and the small-diameter portion 34 in a state that there is the enough space between them. As shown in FIG. 36, when the stem 40 is descended by depressing the pump head 100, the large-diameter portion 33 of the liquid suction valve 30 can be inserted into the space between the internal surface of the first piston 50 and the large-diameter portion 33 in a state that there is the enough space between them, and the liquid passage is secured by the vertical groove 33*a* at the time.

The coil spring 39 is provided on the space between the upper end of the vertical rib 26 and the first piston 50 in the cylinder member 20, and energizes the first piston 50 upward. On the other hand, the engagement pin 32 of the liquid suction valve 30 can hold the lower end of the coil spring 39 engagedly from the downward, and accordingly the engagement pin 32 controls the upper limit of the liquid suction valve 30 when it is moved upward.

The stem 40 is formed in a cylinder shape in which the upper and lower ends are opened, and is received within the large-diameter cylinder portion 22 and the small-diameter cylinder portion 24 in a state that it can be moved upward and downward. The upper part of the first piston 50 is inserted into and fixed on the lower part of the stem 40, and the seal portion 51 is projected from the lower part of the stem 40.

The valve seat 41 of an annular shape which is projected in a cross section of an L-like shape is formed on the inside upper part of the stem 40. In the inside of the stem 40, the upper side of the valve seat functions as a vapor-liquid mixing chamber 46, and the inside of the valve seat functions as a liquid entrance to the vapor-liquid mixing chamber. The spherical liquid discharge valve 70 which can be brought into contact with and separated from the valve seat 41 is received within the vapor-liquid mixing chamber in a state that it can be moved. The liquid discharge valve 70 functions as a check valve, and comes into contact with the valve seat 41 to prevent the liquid and air from returning to the part lower than the valve seat 41.

In the inside of the stem 40, a plurality of vertical ribs 42 which are extended in the vertical direction are provided on the portion from a region on which the first piston 30 is fixed, to the lower part of the valve seat 41 in a state that they are dispersed with respect to the circumferential direction. As shown in FIG. 36, the upper-part valve body 35 and small-diameter portion 34 of the liquid suction valve 30 can be inserted into the inside of the vertical rib 42, when the pump head is depressed to make the stem 40 descend. At the time, the space between the vertical ribs 42 and the vertical groove 34*a* in the small-diameter portion 34 of the liquid suction valve 30 function as a liquid passage.

The pump head 100 linked to the upper part of the stem 40 is formed in a topped cylinder shape in which the outside cylinder portion 101, the inside cylinder portion 102 and the top board portion 103 are formed in a body. The nozzle 104 is opened to the upper-part one side of the outside cylinder portion 101, and the nozzle 104 is linked to the inside cylinder portion 102 through the bubble passage formed on the upper-part inside of the pump head 100. In the inside of the inside cylinder portion 102, the bubbling unit 130 is received within the upper part fixedly, and the upper part of the stem 40 is inserted into the lower side of the bubbling unit 130 fixedly.

In the internal surface of the inside cylinder portion 102, a plurality of vertical grooves 102*a* which are extended in the vertical direction are provided on the region to which the stem 40 is fitted inwardly in a state that they are dispersed with respect to the circumferential direction. The upper end of the vertical groove 102*a* is extended to the position a little upper than the upper end of the stem 40, and the vertical groove 102*a* functions as an air passage. The lower end portion of the inside cylinder portion 102 is formed in thin wall, and functions as a cylinder-shaped valve body 102*b*.

The bubbling unit 130 comprises a casing 131 of a hollow cylinder shape in which the upper and lower ends are opened and two bubbling elements 132 provided on the casing 131. The upper side of the casing 131 functions as a large-diameter portion 131*a* and the lower end of the casing 131 functions as a small diameter portion. 131*b*, the large-diameter portion 131*a* is inserted into and fixed on the inside of the inside cylinder portion 102, and the small-diameter portion 131*b* is inserted into the stem 40 in a state that there is the gap in the diametral direction. Besides, there is the gap between the bottom of the large-diameter portion 131*a* and the upper end of the stem 40, and the gaps function as an air passage.

The bubbling element 132 is formed in a state that the net (bubbling member) 133 is provided on one end opening of the cylinder body in which the upper part and lower part are opened. In the bubbling element 132 arranged on the lower end of the casing 131, the net 133 is provided on the lower end opening of the cylinder body. In the bubbling element 132 arranged on the upper side of the casing 131, the net 133 is provided on the upper end opening of the cylinder body-132*a*.

A plurality of vertical grooves which are extended upward from the lower end surface are formed on the lower-part internal surface of the small diameter portion 131*b* of the casing 131 so that the passage for liquid and air can be secured even when the liquid discharge valve 70 comes into contact with the lower end of the small diameter portion 131*b*.

The small-diameter portion 131*b* has a function as a limitation member for controlling the upward movement region of the liquid discharge valve 70, and as shown in FIG. 39, the distance between the valve seat 41 and the small-diameter portion 131*b* is set up so that the movement length S in which the liquid discharge valve 70 is moved upward in the vertical direction to come into contact with the lower end of the small-diameter portion 131*b* will be from 0.1 mm and to 1.0 mm.

In the periphery of the stem, the annular flange portion 43 which is projected to the outside is formed near the center in the vertical direction, and the annular rising wall 44 is provided upwardly and projectingly on the upper surface of the flange portion 43. The internal surface of the rising wall 44 is formed on the taper surface whose diameter gets wider as it proceeds upward.

In the stem 40, the second piston 60 is fitted outwardly to the space between the flange portion 43 and the pump head 100 in a state that it can be moved upward and downward a little. The second piston 60 is formed in a hollow cylinder shape in which the upper and lower ends are opened, the utmost outside portion is formed on the seal cylinder portion 61 which slides on the internal surface of the large-diameter cylinder portion 22 of the cylinder member 20 air-tightly, the utmost inside portion is formed on the basic cylinder portion. 62 to which the stem 40 is fitted outwardly, and the seal cylinder portion 61 and the basic cylinder portion 62 are connected with one another by the stepped cylinder portion 63 whose cross section is bent in a step shape.

The upper part of the basic cylinder portion 62 is in contact with the internal surface of the cylinder-shaped valve body 102*b* of the pump head 100 with pressure air-tightly in a state that it can be slid. The air holes 64 are provided in the portion where the basic cylinder portion 62 is connected to the stepped cylinder portion 63 in a state they are dispersed with respect to the circumferential direction, and the air holes are opened and closed by relative upward and downward movement between the pump head 100 and the second piston 60. Namely, the air holes 64 are closed when the pump head 100 is moved upward and downward relatively to the second piston 60 and the cylinder-shaped valve body 102*b* of the pump head 100 comes into contact with the portion where the basic cylinder portion 62 is connected to the stepped cylinder portion 63, and the air holes 64 are opened when the cylinder-shaped valve body 102*b* is separated from the above-mentioned connection portion.

The lower end of the basic cylinder-portion 62 is brought into contact with and separated from the rising wall 44 of the stem 40 by relative upward and downward movement between the stem 40 and the second piston 60. In the external surface of the stem 40, a plurality of vertical grooves 45 which are extended in the vertical direction are provided in the region to which the basic cylinder portion 62 is fitted outwardly in a state that they are dispersed with respect to the circumferential direction. The vertical groove 45 is linked to the inside of the large-diameter cylinder portion 22 when the lower end of the basic cylinder portion 62 is separated from the rising wall 44 of the stem 40, and the vertical groove 45 is shut off from the inside of the large-diameter cylinder portion 22 when the lower end of the basic cylinder portion 62 comes into contact with the rising wall 44.

The second air suction valve 90 is fixed on the lower part of the basic cylinder portion 62. The second air suction valve 90 is provided with an annular diaphragm 91 of upward taper which is extended in the diametral direction outside from the lower end. The diaphragm 91 has an elasticity, and the outside marginal portion of the diaphragm-91 is normally brought into contact with the lower surface of the stepped cylinder portion 63 with pressure to be sealed, and it is operated so that the outside margin of the diaphragm 91 is pulled downward by the negative pressure within the large-diameter cylinder portion 22 to be separated from the stepped cylinder portion 63.

In the attaching trunk 150, the cylinder-shaped rib 152 is provided on the outside of the central cylinder portion 151, and the first air suction valve 80 which seals the space between the attaching trunk 150 and the internal surface of the large-diameter cylinder portion 22, is fixed on the lower end of the cylinder-shaped rib 152. The seal cylinder portion 81 of the first air suction valve 80 attached to the large-diameter cylinder portion 22 is formed in a taper cylinder shape to be extended in the diagonal upper direction and has an elasticity. Besides, it is operated so that the upper end part of the seal cylinder portion 81 is pulled to the diametrical direction inside by the negative pressure within the container body 1 to be separated from the internal surface of the large-diameter cylinder portion 22.

Further, a clear cover 202 is detachably provided on the attaching trunk 150.

Then, the operation of the container with a pump for discharging bubbles in the embodiment 7 will be described.

FIG. 35 and FIG. 37 indicate a state that the pump head 100 is not yet depressed, namely, a state that the pump head is positioned at the upper limit. First of all, the cover 202 is removed when the bubbles are discharged.

In the state that the pump head is not yet depressed, the liquid suction valve 30 is pushed up by the coil spring 39 through the first piston 50, the lower-part valve body 31 is separated from the valve seat 24*a* of the cylinder member 20, and the inside of the small diameter cylinder portion 24 is made to communicate with the inside of the container body 1 through the suction pipe 201. The upper-part valve body 35 of the liquid suction valve 30 is in contact with the valve seat 52 of the first piston 50 to close the upper-part opening of the first piston 50. The lower end of the basic cylinder portion 62 of the second piston 60 is attached to the rising wall 44 of the stem 40, the first air suction valve 80 is in contact with the stepped cylinder portion 63 of the second piston 60 and the large-diameter cylinder portion 22 of the cylinder member 20 with pressure, and the lower end of the cylinder-shaped valve body 102*b* of the pump head 100 is separated from the stepped cylinder portion 63 of the second piston 60 to open the air hole 64.

If the pump head 100 is depressed in the above-mentioned state, the stem 40 and the first piston 50 will be descended together with the pump head 100. As a result, as shown in FIG. 38, the upper part valve body 35 of the liquid suction valve 30 is separated from the valve seat 52 of the first piston 50 to open the upper-part opening of the first piston 50. At almost the same time, the inside of the small-diameter cylinder portion 24 is pressurized by descending of the first piston 50, the liquid suction valve 30 is descended by the hydraulic pressure within the small-diameter cylinder portion 24, and the lower-part valve body 31 comes into contact with the valve seat 24*a* to close the lower-part opening of the small diameter cylinder portion 24. On the other hand, the second piston 60 is standing by the frictional force between the seal cylinder portion 61 and the large-diameter cylinder portion 22 right after the depressing of the pump head 100 has been started. As a result of descending the stem 40 in the state, the lower end of the basic cylinder portion 62 of the second piston 60 is separated from the rising projection 44 of the stem 40, and the lower end of the cylinder-shaped valve body 102*b* of the pump head 100 comes into contact with the stepped cylinder portion 63 of the second piston 60 to close the air hole 64.

The second piston 60 is descended together with the pump head 100, the stem 40 and the first piston 50, after the lower end of the cylinder-shaped valve body 102*b* of the pump head 100 comes into contact with the stepped cylinder portion 63 of the second piston 60.

If the pump head 100 is descended after that, the liquid within the small-diameter portion 24 pressurized by the first piston 30 passes through the upper-part opening of first piston 30 and the vertical grooves 33*a* and 34*a* of the liquid suction valve 30 and passes through the space between the vertical ribs 42 of the stem 40 to be pushed out to the upper-part of the upper part valve body 35, and pushes up the liquid discharge valve 70 with the hydraulic pressure from the valve seat 41 to flow into the vapor-liquid mixing chamber 46 (See FIG. 36). On the other hand, the air received within the large-diameter cylinder portion 22 passes through the space between the flange portion 43 and rising projection 44 of the stem 40 and the lower end of the basic cylinder portion 62 in the second piston 60, passes through the vertical groove 45 of the stem 40, passes through the vertical groove 102*a* of the inside cylinder portion 102 in the pump head 100, and passes through the passage between the casing 131 of the bubbling unit 130 and the stem 40 to flow into the vapor-liquid mixing chamber 46.

Figure 40:
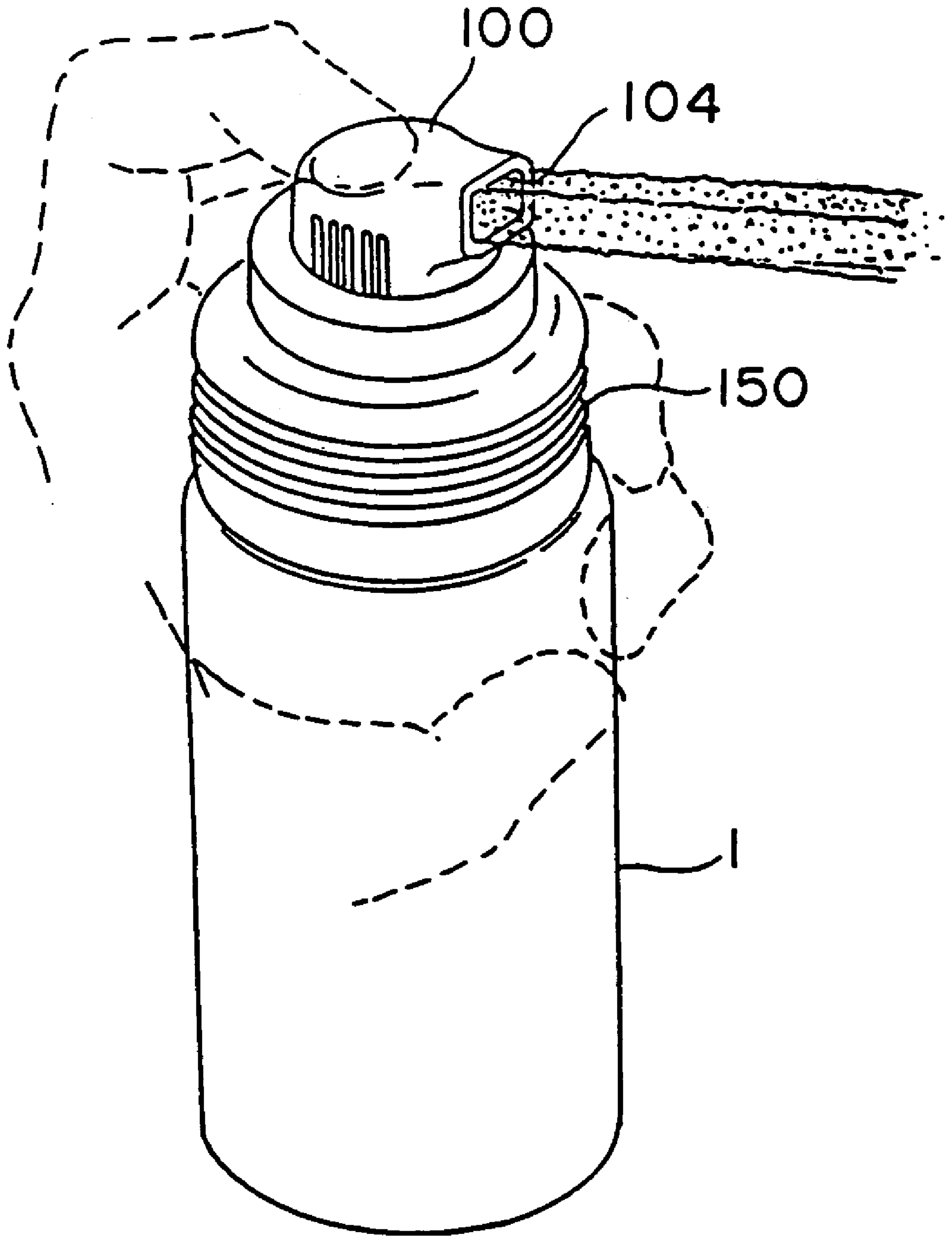
FIG. 40 is a diagram indicating a discharging state of bubbles of a container with a pump for discharging bubbles of the embodiment 7.
Figure 41:
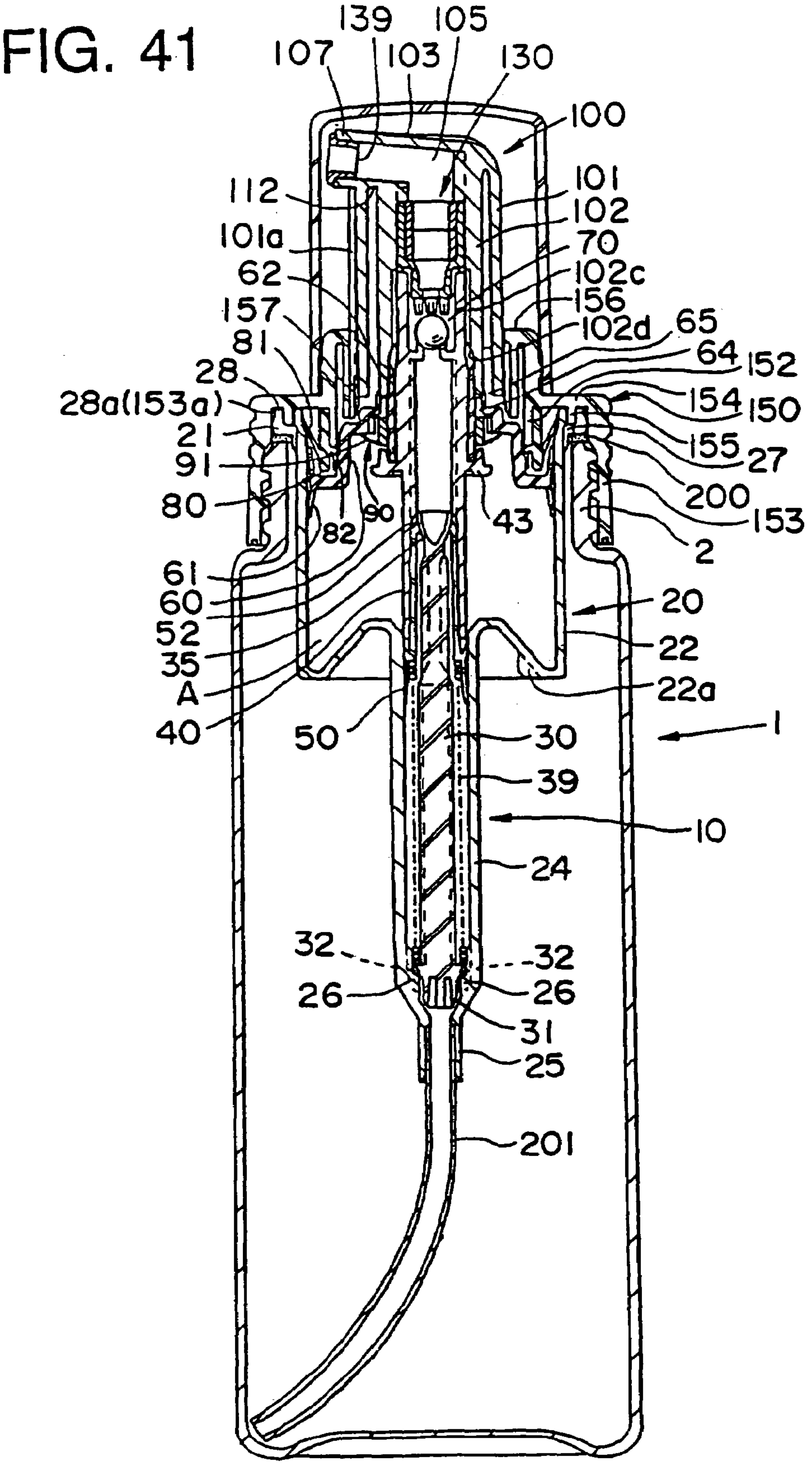
FIG. 41 is a longitudinal section diagram of a container with a pump for discharging bubbles in the embodiment 8.
Figure 42:
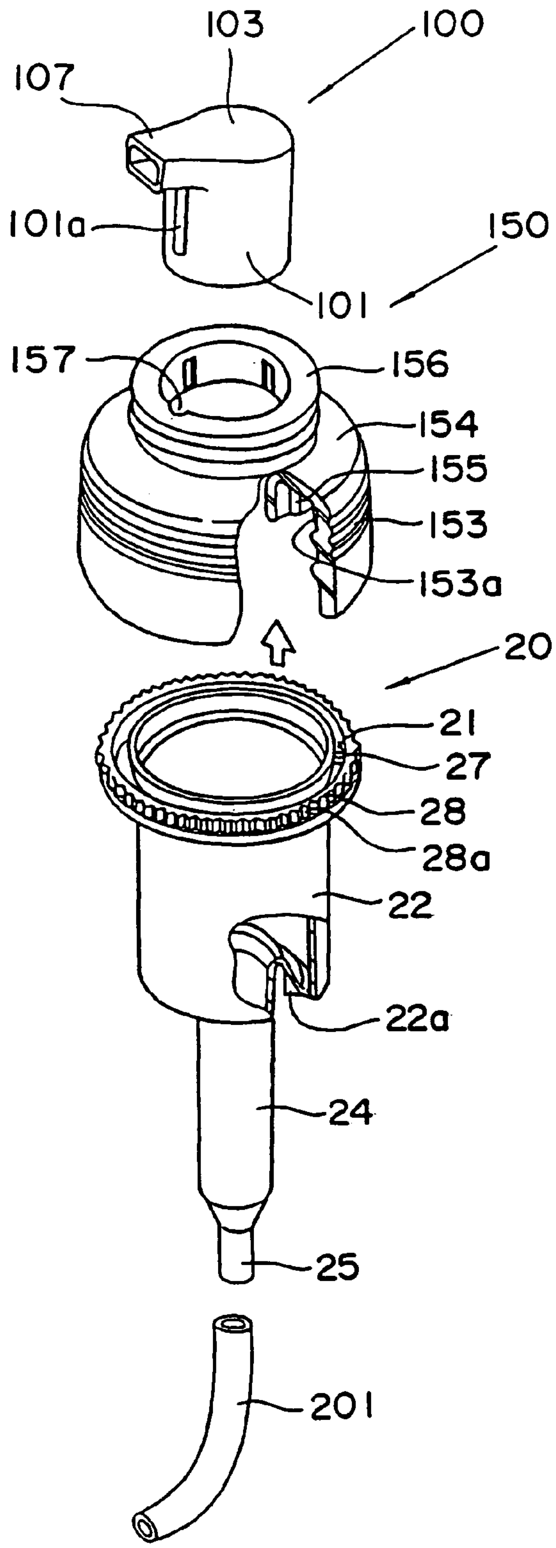
FIG. 42 is a perspective exploded diagram indicating part of a pump for discharging bubbles in the embodiment 8.
Figure 43:
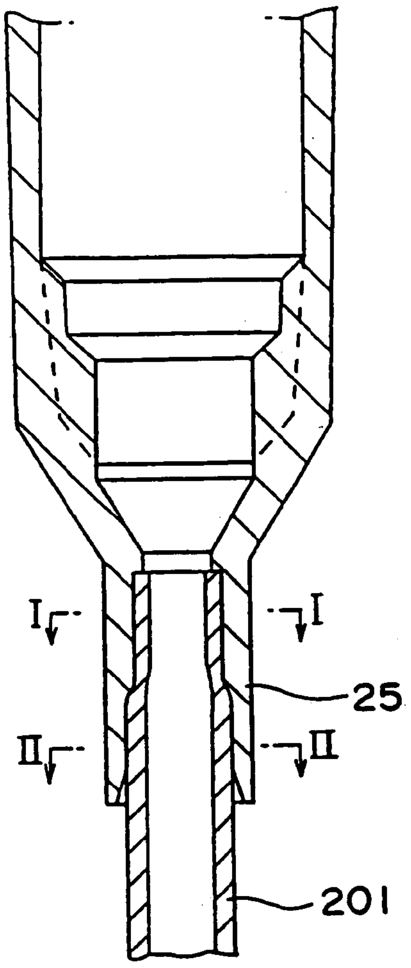
FIG. 43 is a longitudinal section diagram of a suction pipe connection part of a pump for discharging bubbles in the embodiment 8.

Then, the liquid and air are joined and mixed in the vapor-liquid mixing chamber to be delivered into the bubbling unit 130. After that, the liquid is bubbled when it passes through the upper and lower two nets 133 of the bubbling unit 130 and the bubbled liquid is pushed into the bubble passage 105 of the pump head 100 to be discharged from the nozzle 104 of the pump head 100. FIG. 40 indicates a discharging state of the bubbles at this time.

When the finger is off from the pump head 100 after the depressing of the pump head 100 has been completed, the hydraulic pressure within the small-diameter cylinder portion 24 and the air pressure within the large-diameter cylinder portion 22 fall, the liquid discharge valve 70 comes into contact with to the valve seat 41, and the first piston 50, the stem 40 and the pump head 100 is pushed upward by the elasticity of the coil spring 39.

Hereupon, the second piston 60 is standing by the frictional force between the seal cylinder portion 61 and the large-diameter cylinder portion 22 right after the pushing up of the stem 40 has begun. As a result of ascending the stem 40 in the state, the internal surface of the rising projection 44 of the stem 40 comes into-contact with the lower end of the basic cylinder portion 62 of the second piston 60 with pressure, and the space between the inside of the large-diameter cylinder portion 22 and the vertical groove 45 of the stem 40 is shut off. At the same time, the lower end of the cylinder-shaped valve body 102*b* of the pump head 100 is separated from the stepped cylinder portion 63 of the second piston 60 to open the air hole 64.

The first piston 50, the stem 40, the second piston. 60 and the pump head 100 are ascended together after the internal surface of the rising projection 44 comes into contact with the lower end of the basic cylinder portion 62.

The inside of the small diameter cylinder portion 24 is pressurized negatively when the first piston 50 is ascended, and accordingly the liquid suction valve 30 is pulled up, the lower-part valve body 31 is separated from the valve seat 24*a*, and the inside of the small-diameter cylinder portion 24 is made to communicate with the inside of the container body 1. As a result, the liquid within the container body 1 is sucked up into the small-diameter cylinder portion 24 as the first piston 50 is ascended.

The inside of the container body 1 is pressurized negatively when the liquid is pumped up into the small-diameter cylinder portion 24, and accordingly the seal cylinder portion 81 of the first air suction valve 80 is drawn in the direction away from the internal surface of the large-diameter cylinder portion 22.

Besides, the inside of the large-diameter cylinder portion 22 is also pressurized negatively as the second piston 60 is ascended, and accordingly the diaphragm 91 of the second air suction valve 90 is drawn downward to be separated from the stepped cylinder portion 63 of the second piston 60, and the gap is generated.

As a result of operating of the first air suction valve 80 and the second air suction valve 90 in the above-mentioned way, the outside air is sucked into the attaching trunk 150 from the space between the central cylinder portion 151 of the attaching trunk 150 and the pump head 100. Then, part of the air passes through the air hole 64 of the second piston 60 to get into the large-diameter cylinder portion 22, and the other air passes through the air hole 27 of the flange portion 21 in the cylinder member 20 to get into the container body 1. Accordingly, the pressures within the large-diameter portion 22 and the container body 1 are equal to the air pressure, the first piston 50 and the second piston 60 are ascended smoothly, and the liquid is pumped up into the small-diameter cylinder portion 24 smoothly.

As mentioned hereinbefore, when the finger is off from the pump head 100 after the depressing of the pump head 100 has been completed, the hydraulic pressure within the small-diameter cylinder portion 24 falls, and the liquid discharge valve 70 separated upward from the valve seat 41 is descended to be brought into contact with the valve seat 41 so as to close the liquid entrance of the vapor-liquid mixing chamber 46.

It takes a little time to bring the liquid discharge valve 70 into contact with the valve seat 41 so as to close the liquid entrance, and the liquid and air within the vapor-liquid mixing chamber 46 flow into the stem 40 positioned in a portion lower than the valve seat 41 in the meantime. The air which has flown into the stem 40 at this moment may have a bad effect upon the pump for discharging bubbles 10 such as deteriorating the pump efficiency for the liquid and generating large bubbles at the beginning of discharging bubbles, when the bubbles are discharged for the next time.

However, in this pump for discharging bubbles 10, since the maximum movement range of the liquid discharge valve 70 from the state that it is in contact with the valve seat 41 to the state that it is moved to the vertical upper direction is limited within the range of from 0.1 mm to 1.0 mm by the small-diameter portion 131*b* of the bubbling unit 130, the time required for bringing the liquid discharge valve 70 separated from the valve seat into contact with the valve seat 41 is reduced extremely, and the liquid entrance of the vapor-liquid mixing chamber 46 can be closed it a moment. Accordingly, the air that flows backward into the stem 40 from the vapor-liquid mixing chamber 46 can be removed almost completely.

As a result, the pump efficiency for the liquid is improved, and as shown in FIG. 40, the small bubbles are generated from the beginning of discharging without generating the large bubbles.

Further, it has been confirmed-that the particularly preferred result can be obtained and the effect is remarkable, if the vertical movement range from the state that the liquid discharge valve 70 is in contact with the valve seat 41 to the state that the liquid discharge valve 70 comes into contact with the small diameter portion 131*b* of the bubbling unit 130 is within the range of 0.2 mm–0.3 mm.

Embodiment 8

The container with a pump for discharging bubbles of the embodiment 8 will be described in accordance with FIG. 41 to FIG. 48.

The container with a pump for discharging bubbles is provided with a container body 1 in which a neck portion 2 is provided on an upper end, a pump for discharging bubbles provided on the neck portion 2 and an attaching trunk 150 for fixing the pump for discharging bubbles 10 on the neck portion 2.

The pump for discharging bubbles 10 comprises a cylinder member 20, a liquid suction valve 30, a stem 40, a first piston 50, a second piston 60, a liquid discharge valve 70, a first air suction valve 80, a second air suction valve 90, a pump head 100 and a bubbling unit 130.

The attaching trunk 150 comprises a peripheral wall 153 screwed on the neck portion 2 of the container body 2, a top wall 154 linked to the upper end of the peripheral wall 153 and a rising cylinder portion 156 of a double cylinder shape which is extended upward from the center of the top wall 154 in a state that it is stood up. A window-hole into which the pump head 100 is inserted is opened in the center of the rising cylinder portion 156, and the rising cylinder portion 156 guides the pump head 100 so that it can be moved upward and downward.

The cylinder member 20 comprises a large-diameter cylinder for air 22 which is fixed on the neck portion 2 by the attaching trunk 150 and is inserted into the container body 2 and a small diameter cylinder portion 24 which is extended downward in a concentric arrangement from the lower part of the large-diameter cylinder portion 22.

A flange portion 21 which is projected to the outside is provided on the upper end of the large-diameter cylinder portion 22, and a fitting cylinder portion 28 is stood up from the marginal portion of the flange portion 21. The cylinder member 20 is fixed on the neck portion 2 by the attaching trunk 150 in a state that the fitting cylinder portion 28 is fitted to the space between the peripheral wall 153 of the attaching trunk 150 and an engaging cylinder 155 and the packing 200 is made to lie in the space between the flange portion 21 and the upper surface of the neck portion 2.

The upper end of a suction pipe 201 is inserted into and fixed on a connection cylinder 25 which is provided extendedly on the lower end portion of the small diameter cylinder-portion 24. The suction pipe 201 is formed curvedly, and the lower end opening of the suction pipe 201 is positioned in the lower-end corner portion of the container body 2.

Figure 44:
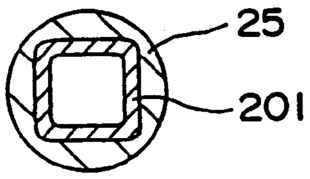
FIG. 44 is a I—I cross section diagram of FIG. 43.
Figure 45:
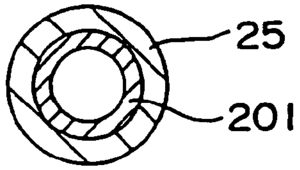
FIG. 45 is a II—II cross section diagram of FIG. 43.
Figure 46:
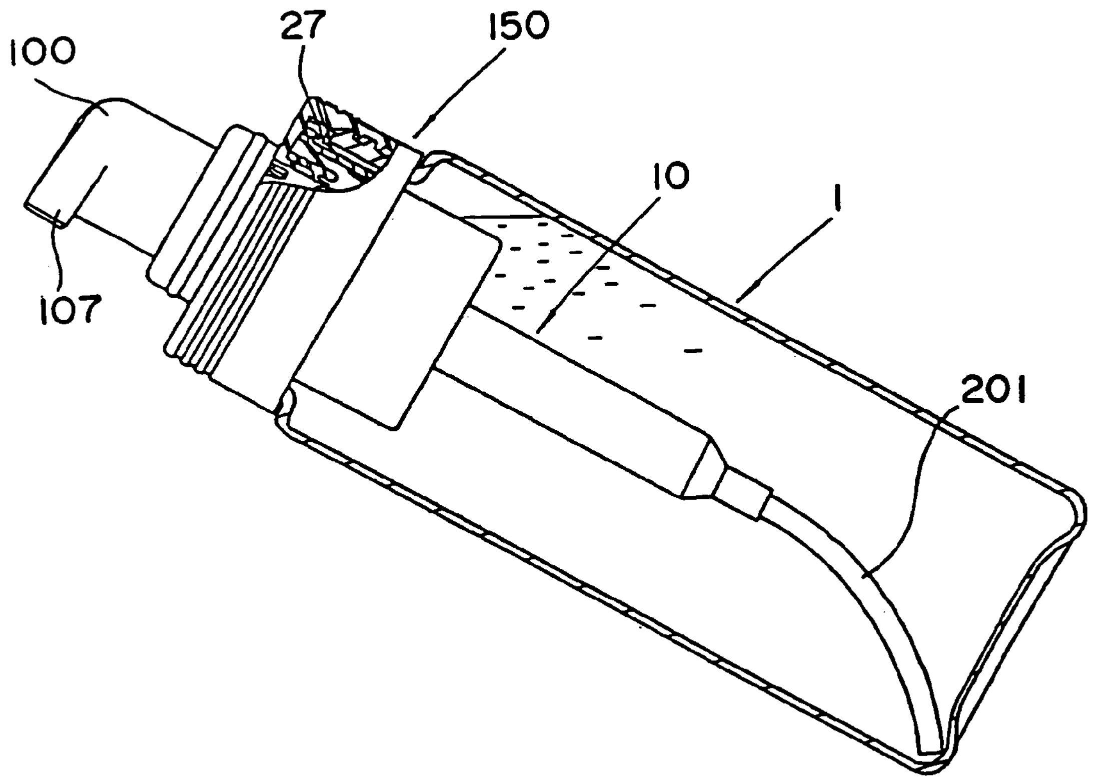
FIG. 46 is a side view diagram in which a working condition of a container with a pump for discharging bubbles of the embodiment 8 is indicated in which part of it is sectioned.

In the embodiment 8, the suction pipe 201 is formed in a cylinder shape. On the other hand, as shown in FIG. 44, in the connection cylinder 25, the upper-half internal surface of the connection cylinder 25 is formed in a cross section square shape, the suction pipe 201 which has been fixed on the connection cylinder 25 once is not rotated against the connection cylinder 25 when the pump for discharging bubbles 10 is provided on the container body 1 and so on, and as shown in FIG. 45, the lower part of the connection cylinder 25 is formed in a cross section of circle so that the suction pipe 201 can be easily provided on the connection cylinder 25 even if the upper internal surface of the connection cylinder 25 is formed in a square shape.

In the embodiment 8, a rotation-preventing mechanism is provided on the region where the attaching trunk 150 is fitted to the cylinder member 20. The rotation-preventing mechanism is made up of a large number of vertical ribs 28*a* provided on the periphery of the fitting cylinder portion 28 of the cylinder member 20 and a large number of vertical ribs 153*a* provided on the internal surface upper end portion of the peripheral wall 153 of the attaching trunk 150. The mutual rotation of the attaching trunk 150 and the cylinder member 20 can be prevented by making the vertical ribs 28*a* and the vertical ribs 153*a* engage with one another.

If the rotation-preventing mechanism is provided in the above-mentioned way, the mispositioning of the attaching trunk 150 and the cylinder member 20 by the tightening torque can be prevented when the attaching trunk 150 is tightened into the neck portion 2 of the container body 1.

A plate-shaped projection 22*a* for indicating a position of an air hole 27 mentioned later is provided projectingly on the predetermined position in the lower surface of the large-diameter cylinder portion 22 so that the attaching trunk 150 can be provided on the proper position of the cylinder member 20 mechanically.

The stem 40 and the pump head 100 are provided on the cylinder member 20 in a state they can be moved upward and downward freely and they are energized upward. The second piston 60 fitted into the large-diameter cylinder portion 22 and the first piston 50 fitted into the small-diameter cylinder portion 24 are provided on the stem 40.

In the container of the present invention, the internal bubble-discharging mechanism is operated so as to discharge the bubbles from the nozzle 107 of the pump head 100 by moving the pump head upward and downward.

The circular first piston 50 fitted to the upper part of the small-diameter cylinder portion 24 is provided on the lower end of the stem 40 in a state that the lower part of the first piston 50 is projected from the lower end of the stem 40. The stem 40 is energized upward by the coil spring 39 lying in the space between the first piston 50 and the lower end portion of the small-diameter cylinder portion 24 all the time, and accordingly the pump head 100 is also energized upward all the time. Besides, the liquid discharge valve 70 is provided on the upper part of the inside of the stem 40.

The liquid suction valve 30 is received within the small-diameter cylinder portion 24. The upper end portion of the liquid suction valve 30 functions as an upper-part valve body 35 which is formed in an upward skirt shape, and the upper part valve body 35 comes into contact with the valve seat 52 provided on the upper-end internal surface of the first piston 50 to shut off between the upper part and lower part of the stem 40 normally, and the upper part valve body 35 is separated from the valve seat 52 to make the upper part and the lower part communicate with one another by depressing the pump head 100. Accordingly, the inconveniences such as leakage of the liquid from the nozzle 107 can be prevented to the utmost, even if the liquid discharge valve 70 is mispositioned when the container is upset by mistake.

The engagement pin 32 provided projectingly from the lower part periphery of the liquid suction valve 30 is engaged to the space among the plurality of vertical ribs 26 provided on the lower-end internal surface of the small-diameter cylinder portion 24 in a state that it can be moved upward and downward, and the lower end surface of the coil spring 39 is in contact with and held engagedly on the upper surface of each vertical rib 26.

The lower end of the liquid suction valve 30 is formed on the lower-part valve body 31 so that the lower-part valve body 31 can be brought into contact with and separated from the bottom face portion of the small-diameter cylinder portion 24. Namely, if the pump head 100 is depressed, the upper-part valve body 35 is fitted to the internal surface of the descending stem 40 to push down the liquid suction valve 30, and the lower-part valve body 31 comes into contact with the bottom face portion of the small-diameter cylinder portion 24 to shut off between the inside of the suction pipe 201 and the inside of the small-diameter cylinder portion 24.

The pump head 100 has a casing of a cylinder shape in which the upper end of the outside cylinder portion 101 is closed by the top board portion 103 and the lower end of the outside cylinder portion 101 is opened, and the projecting portion 112 of a cylinder shape is extended horizontally from the upper end of the inside cylinder portion 102 provided on the center of the casing in a body. The front end of the projecting portion 112 is projected to the position outer than the outside cylinder portion 101 to function as a nozzle 107.

The upper end portion of the stem 40 is fitted to and fixed on the lower part of the inside cylinder portion 102 so that the stem 40 and the pump head 100 are moved upward and downward together. The inside of the inside cylinder portion 102 functions as a bubble passage 105 which is extended to the discharging hole at the end of the nozzle 107 from the inside of the stem 40.

The container is provided with a directional control mechanism for directing the lower part opening of the suction pipe 201 and the nozzle 107 of the pump head 100 to the same direction all the time when the pump head 100 is moved upward and downward.

The directional control mechanism in the embodiment 8 comprises a concave groove 157 in the vertical direction provided on the internal surface of the rising cylinder portion 156 of the attaching trunk 150 and a vertical projection 110*a* provided on the front face predetermined position of the outside cylinder portion 101 of the pump head 100, and the vertical projection 101*a* is engaged to the concave groove 157 in a state that it can be moved upward and downward.

Accordingly, the pump head 100 can be moved upward and downward while directing the discharging hole at the point of the nozzle 107 and the lower opening of the suction pipe 201 to the same direction all the time. The directional control mechanism comprising the concave groove 157 and the vertical projection 101*a* as mentioned above can be easily structured and can be easily manufactured.

The above-mentioned directional control mechanism is not limited to the directional control mechanism in the embodiment 8, and for instance, a directional control mechanism in which the window hole of the central part of the rising cylinder portion 156 of the attaching trunk 150 is formed into a non-circle window hole and the peripheral lower part of the pump head 100 is formed like the non-circle window hole, can be substituted for the directional control mechanism in the embodiment 8. If the directional control mechanism is structured in the above-mentioned way, the appearance of the container is improved because the extra projection and concave groove are not exposed to the pump head 100, and the individualization of the container can be planned due to the non-circle pump head 100.

Figure 47:
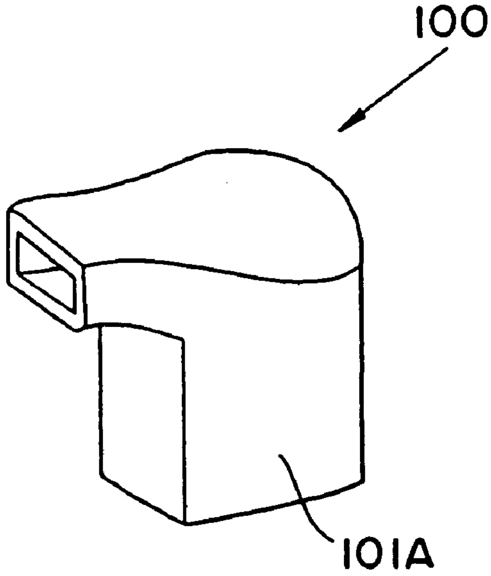
FIG. 47 is a perspective outside diagram indicating a modified embodiment of a pump head in the embodiment 8.
Figure 48:
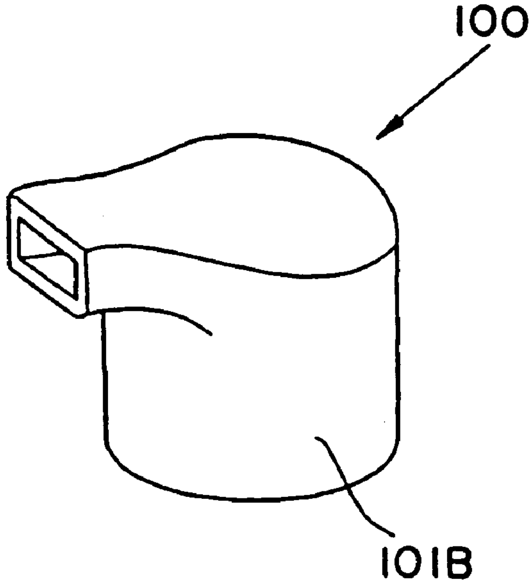
FIG. 48 is a perspective outside diagram indicating another modified embodiment of a pump head in the embodiment 8.

To put it concretely, a directional control mechanism in which the window hole of the attaching trunk 150 is formed in a square shape and the lower part of the outside cylinder portion 101 of the pump head 100 is formed into a square outside cylinder portion 101A like the above-mentioned square window hole as shown in FIG. 47 can be substituted for the directional control mechanism in the embodiment 8, or the directional control mechanism in which the window hole of the attaching trunk 150 is formed into an elliptical window hole and the lower part of the outside cylinder portion 101 is formed into an elliptical outside cylinder portion 101B like the above-mentioned elliptical window hole as shown in FIG. 48 can be substituted for the directional control mechanism in the embodiment 8.

A bubbling unit 130 is provided within the bubble passage 105 in the portion upper than the liquid discharge valve 70. The bubbling unit 130 is provided with a net woven with polyester fiber and the like and it is constructed so that the vapor-liquid mixed solution is bubbled to be formed into the bubbles when the vapor-liquid mixed solution passes through the net. In the embodiment 8, the bubbling portion 130 in which two cylinder bodies whose upper and lower ends are provided with the net are arranged vertically, is fitted to the inside cylinder portion 102 of the pump head 10 fixedly.

A unit for regulating bubbles 139 having a net is provided within the projecting portion 112 in the downstream position of the bubbling unit 130. The unit for regulating bubbles 139 functions to equalize almost the bubbles which have been bubbled once by the upstream bubbling unit 130.

An air passage 102*c* for supplying the stem 40 with the air within an air pressurizing chamber A mentioned later is provided on the periphery of the stem 40. One end of the air passage 102*c* is opened to the internal surface of the stem 40 in the space between the liquid discharge valve 70 and the bubbling unit 130, and the other end of the air passage 102*c* is opened to the concave portion 102*d* formed in an annular shape on the lower part periphery of the inside cylinder portion 102.

The second piston 60 is formed separating from the stem 40. Besides, in the second piston 60, the seal cylinder portion 61 fitted to the internal surface of the large-diameter cylinder portion 2Z is provided on the peripheral portion, and the basic cylinder portion 62 fitted to the outside of the stem 40 is provided on the inside portion.

The upper end of the basic cylinder portion 62 is fitted air-tightly to the outside surface of the concave portion 102*d* in a state that it can be moved upward and downward, and the lower end of the basic cylinder portion 62 can be brought into contact air-tightly with the upper surface of the flange portion 43 provided on the stem 40. The air pressurizing chamber A is constructed by the second piston 60 and the large-diameter cylinder portion 22.

At the utmost ascending position of the stem 40 and the pump head 100 pushed up by the coil spring 39, the lower end of the basic cylinder portion 62 is brought into contact air-tightly with the upper surface of the flange portion 43 to shut off between the inside of the large-diameter cylinder portion 22 and the inside of the air passage 102*c*.

A plurality of air holes 64 are provided on the inside marginal portion of the second piston 60 in a state that they are dispersed with respect to the circumferential direction, and an annular valve cylinder 65 is provided on the outside of the air hole 64 in a state that it is stood up. The valve body 65 can be brought into contact air-tightly with the lower-end peripheral portion of the inside cylinder portion 102.

The second air suction valve 90 is fitted to the basic cylinder portion 62 positioned in a portion lower than the air hole 64, and the diaphragm 91 of doughnut board shape provided on the second air suction valve 90 is constructed so that it can close the air hole 64 air-tightly. Namely, the dual seal structure is formed by the valve cylinder 65 and the diaphragm 91.

If the pump head 100 is depressed in the above-mentioned state, the second piston 60 is ascended relatively to the stem 40 to make the inside of the air pressurizing chamber A and the inside of the stem 40 communicate with one another through the air passage 102*c*. On the other hand, when the pump head 100 is ascended, the lower end of the basic cylinder portion 62 is brought into contact air-tightly with the upper surface of the flange portion 43 to close the air passage 102*c* and open the second air-suction valve 90 so that the outside air is introduced into the large-diameter cylinder portion 22.

The large-diameter cylinder portion 22 is provided with an air hole 27 for introducing the outside air into the container body 1. The air hole 27 is arranged in a position opposite to the opening direction of the nozzle 107 of the pump head 100. In the embodiment 8, the air hole 27 is opened in the flange 13 of the rear of the large-diameter cylinder portion 22.

The first air suction valve 80 for opening and closing the air hole 27 is provided on the attaching trunk 150. The first air suction valve 80 comprises an annular basic portion and two seal cylinder portions 81 and 82 which are extended in the vertical direction from the annular basic portion. The annular basic portion is fitted and fixed on the periphery of the cylinder-shaped rib 152 which is extended downward from the lower surface of the top wall 154 of the attaching trunk 150.

The seal cylinder portion 81 is extended in a skirt shape in the diagonal upper direction from the peripheral lower portion of the annular basic portion, and the outside marginal portion of the seal cylinder portion 81 is brought into contact air-tightly with the inside upper end portion of the large-diameter cylinder portion 22.

The seal cylinder portion 82 is extended in a skirt shape in the diagonal lower direction from the internal surface lower part of the annular basic portion, and the outside marginal portion of the seal cylinder portion 82 is brought into contact air-tightly with the outside surface of the vertical wall part of the second piston 60. A dual seal structure is formed by the seal cylinder portions 81 and 82.

Further, it is preferable that each of the members is formed from synthetic resin, elastomer and the like.

Then, the operation of the embodiment 8 will be described.

When the pump head 100 is depressed, the lower part valve body 31 is closed to pressurize the inside of the small diameter cylinder portion 24, and the liquid within the small-diameter cylinder portion 24 pushes up the liquid discharge valve 70 to be introduced into the bubble passage 105. At the same time, the air pressurizing chamber A is pressurized and the second piston 60 is ascended relatively to the stem 40 to open the seal of the lower end of the basic cylinder portion 62, the pressurized air within the air pressurizing chamber A passes through the air passage 102*c* to be introduced into the bubble passage 105, and the vapor-liquid mixed solution which has been mixed hereupon passes through the bubbling unit 130 to be bubbled, then passes through the unit for regulating bubbles 139 to be discharged from the end of the nozzle 107 in a foamy state.

Then, when the pump head 100 is released from the depressing, the stem 40 and the pump head 100 are ascended by the action of the coil spring 39 and the inside of the small-diameter cylinder portion 24 is pressurized negatively, and accordingly the liquid discharge valve 70 is closed, the suction valve 55 is opened, and the liquid within the container body 2 is sucked into the small diameter cylinder portion 24. On the other hand, the second piston 60 is descended relatively to the stem-40 to seal the lower end of the basic cylinder portion 62 and close the air passage 102*c*, and the outside air is introduced into the air pressurizing chamber A which has been pressurized negatively through the second air suction valve 90.

At the same time, the first air suction valve 80 is opened and the outside air is introduced into the container body 1 from the air hole 27, since the inside of the container body 1 is pressurized negatively due to the fact that the liquid within the container body 1 is sucked into the small diameter cylinder portion 24.

The air exists all the time in the air hole 27 portion and the portion is never submerged in the liquid, because the opening of the nozzle 107 and the opening of the suction pipe 201 are in the same direction all the time, and the air hole 27 is in a position opposite to the opening direction of the nozzle 107, when the bubbles are discharged.

Accordingly, the introduced outside air never gets to the liquid surface through the inside of the liquid. As a result, the inconvenience that the upper part of the liquid surface is filled with the bubbles and so on will never occur.

The liquid within the container body 1 can be discharged entirely, because the lower end opening of the suction pipe 201 is directed to the same direction as the opening direction of the nozzle 107 and is positioned in the lower end portion within the container body 1.

The Embodiment 9

The container with a pump for discharging bubbles of the embodiment 9 will be described in accordance with FIG. 49 to FIG. 53.

The container with a pump for discharging bubbles comprises a container body 1 in which a neck portion 2 is provided on the upper end, a pump for discharging bubbles 10 provided on the neck portion 2 and an attaching trunk 150 for fixing the pump for discharging bubbles 10 on the neck portion 2.

The pump for discharging bubbles 10 comprises a cylinder member 20, a liquid suction valve 30, a stem 40, a first piston 50, a second piston 60, a liquid discharge valve 70, a first air suction valve 80, a second air suction valve 90, a pump head 100 and a bubbling element 132.

The attaching trunk 150 comprises a peripheral wall 153 screwed on the neck portion of the container body 2, a top wall 154 linked to the upper end of the peripheral wall 153 and a rising cylinder portion 156 which is extended upward from the center of the top wall 154 in a state that it is stood up.

The top wall central portion of the rising cylinder portion 156 is opened, and a central cylinder portion 151 having an outside air flowing groove in the internal surface is extended downward from the opening margin. A cylinder-shaped rib 152 is extended downward from the peripheral lower part of the rising cylinder portion 156.

In the cylinder member 20, the upper half is formed to a large-diameter cylinder portion 22 for air, the lower half is formed to a small-diameter cylinder portion 24 for liquid, and both cylinder portions 22 and 24 are linked to a bottom board portion 23.

A flange portion 21 which is projected to the outside is formed on the upper end of the large-diameter cylinder portion 22, and the flange portion 21 is held between the upper end surface of the neck portion 2 of the container body 1 and the top wall peripheral portion of the attaching trunk 150.

An fitting cylinder portion 28 is stood up from the marginal portion of the flange portion 21, and an air hole 27 is provided on the basic end portion of the flange portion 21. The fitting cylinder portion 28 is held between the short cylinder hanging vertically from the top wall peripheral portion of the attaching trunk 150 and the upper part of the peripheral wall of the attaching trunk 150.

The lower end of the small diameter cylinder portion 24 is formed in a taper shape whose diameter is reduced as it proceeds downward, the connection cylinder 25 is extended downward from the lower end, and the upper end of suction pipe 201 is fitted to the connection cylinder 25.

A plurality of vertical ribs 26 are provided on the internal surface of the taper-shaped portion of the small diameter cylinder portion 24, a plurality of projections **26*a* are provided also on the internal surface of the small-diameter cylinder portion 24 in a position upper than the vertical ribs 26, and the inscribed circle diameter of the projections 26*a* is larger than the inscribed circle diameter of the vertical ribs 26. The lower end of a coil spring 39 mentioned later is inserted into the projection 26*a*, and the lower end of the coil spring 39 is mounted on the upper end surface of the vertical rib 26**.

The stem 40 and the pump head 100 are provided on the cylinder 20 in a state that they can be moved upward and downward freely and they are energized upward. The pump head 100 is fixed on the upper end of the stem 40.

Besides, the second piston 60 fitted into the large-diameter cylinder portion 22 and the first piston 50 fitted into the small-diameter cylinder portion 24 are provided on the stem 40. The second piston 60 is provided in a state that it can be moved upward and downward only a little stroke relative to the stem 40.

The first piston 50 is provided on the stem 40 in a state that the cylinder portion 53 is fitted to the lower end inside of the stem 40, and the seal portion 51 is projected from the lower end of the stem 40. The stem 40 is energized upward all the time by the coil spring 39 which is kept in the space between the first piston 50 and the upper end surface of the vertical rib 19 of the small diameter cylinder portion 24, and accordingly the pump head 100 is also energized upward all the time.

The liquid discharge valve 70 is provided on the upper part within the stem 40, the annular flange portion 43 which is projected to the outside is provided on the middle part of the stem 40, and the annular rising wall 44 is stood up from the periphery of the flange portion 43.

In the pump head 100, the fitting cylinder 108 is extended downward from the peripheral portion of the top board portion 103, the nozzle 107 in which the basic end is opened on the upper end internal surface of the fitting cylinder 108 is extended in the horizontal direction, and the end portion of the nozzle 107 is projected to the outside. In the embodiment 9, although the fitting cylinder 108 is formed into a dual cylinder, a single cylinder may be substituted for the fitting cylinder 108.

The lower part of the fitting cylinder 108 is inserted into the central cylinder portion 151 of the attaching trunk 150 in a state that it can be slid. The lower part inside of the fitting cylinder 108 is formed on the large inside diameter portion, and the upper end portion of the stem 40 is fitted to the lower half of the upper cylinder part. A plurality of vertical grooves **108*a* are provided on the internal surface of the part to which the stem 40 is fitted, and the upper end of the vertical groove 108*a* is arranged in apposition higher than the upper end surface of the stem 40**.

An opening cylinder **107*a* is fitted to the end of the nozzle 107, and a net 107*b* for regulating bubbles is provided extendedly on the internal end of the opening cylinder 107*a***.

The casing 131 which has been inserted into the upper end portion of the stem 40 and the lower part of which is made to a small-diameter portion **131*b* is fitted to the upper part inside of the above-mentioned fitting cylinder 108. In the casing 131, the length of the part to which the bubbling element 132 is fitted is set up in the length to which a plurality of bubbling elements 132** can be fitted in a state that they are piled upward and downward.

In the small-diameter portion **131*b* inserted into the upper end portion of the stem 40, an inward flange is provided on the lower end, and a blocking piece 131*c* is extended downward from the inward flange. The blocking piece 131*c* prevents the liquid discharge valve 70 from closing the hole 134 of the inward flange, when the liquid discharge valve 70 is pushed up by the liquid flowing into the casing 131 from the inside of the stem 40**.

The space between the inward flange and the liquid discharge valve 70 functions as a vapor-liquid mixing chamber-46, and the liquid which has passed through the liquid discharge valve 70 and the high-pressure air which has passed through the vertical groove **108*a* and the space between the upper part internal surface of the stem 40 and the outer surface of the small-diameter portion 131***b* to be flown out are mixed in the vapor-liquid mixing chamber 46.

Further, the casing 131 is not always required, and the bubbling element 132 can be fitted to the upper part inside of the fitting cylinder 108 directly.

The bubbling element 132 is structured such that the net 133 is provided extendedly on the upper surface of the short cylinder 135. The outside diameter of the short cylinder 135 has the size in which the short cylinder 135 can be fitted fixedly into the internal surface of the casing 131. In the container shown in FIG. 49 to FIG. 51, the bubbling element arranged on the lower side is provided in a state it is inverted, and the bubbling element 132 arranged on the upper side is provided in a state that it is erected.

Figure 52:
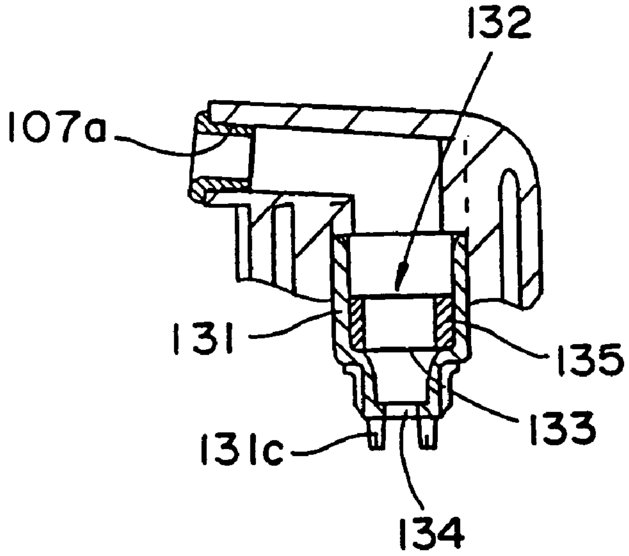
FIG. 52 is a longitudinal section diagram of the principal part indicating a provision example of a bubbling element in a container with a pump for discharging bubbles of the embodiment 9.

Besides, in one shown in FIG. 52, only one inverted bubbling element 132 is fitted into the lower part of the casing 131. In one shown in FIG. 53, only one erected bubbling element 132 is fitted into the upper part of the casing 131.

The second piston 60 comprises a basic cylinder portion 62 fitted to the upper part external surface of the stem 40 in a state that it can be slid, a seal cylinder portion 61 fitted to the internal surface of the large-diameter cylinder portion 22 in a state that it can be slid and a stepped cylinder portion 63 which connects the basic cylinder portion 62 to the seal cylinder portion 61. The stepped cylinder portion 63 is formed in a step shape in which the basic cylinder portion 62 side is high and the seal cylinder portion 61 side is low.

In the stepped cylinder portion 63, a plurality of air holes 64 are provided in the portion adjacent to the basic cylinder portion 62. The upper portion of the basic cylinder portion 62 functions as a thin-wall elastic portion which is enlarged to a little upper outside, and the end of the basic cylinder portion 62 is brought into contact air-tightly with the lower part internal surface with pressure.

A plurality of projections 66 are provided on the internal surface of the vertical cylinder part in the stepped cylinder portion 63. In the stepped cylinder portion 63, an engaging cylinder 67 is provided from the upper horizontal board shape portion in a state that it is stood up so as to open a little gap in the space between the engaging cylinder 67 and the basic cylinder portion 62, and the air hole 64 is provided on the horizontal board shape portion positioned in the gap.

Figure 49:
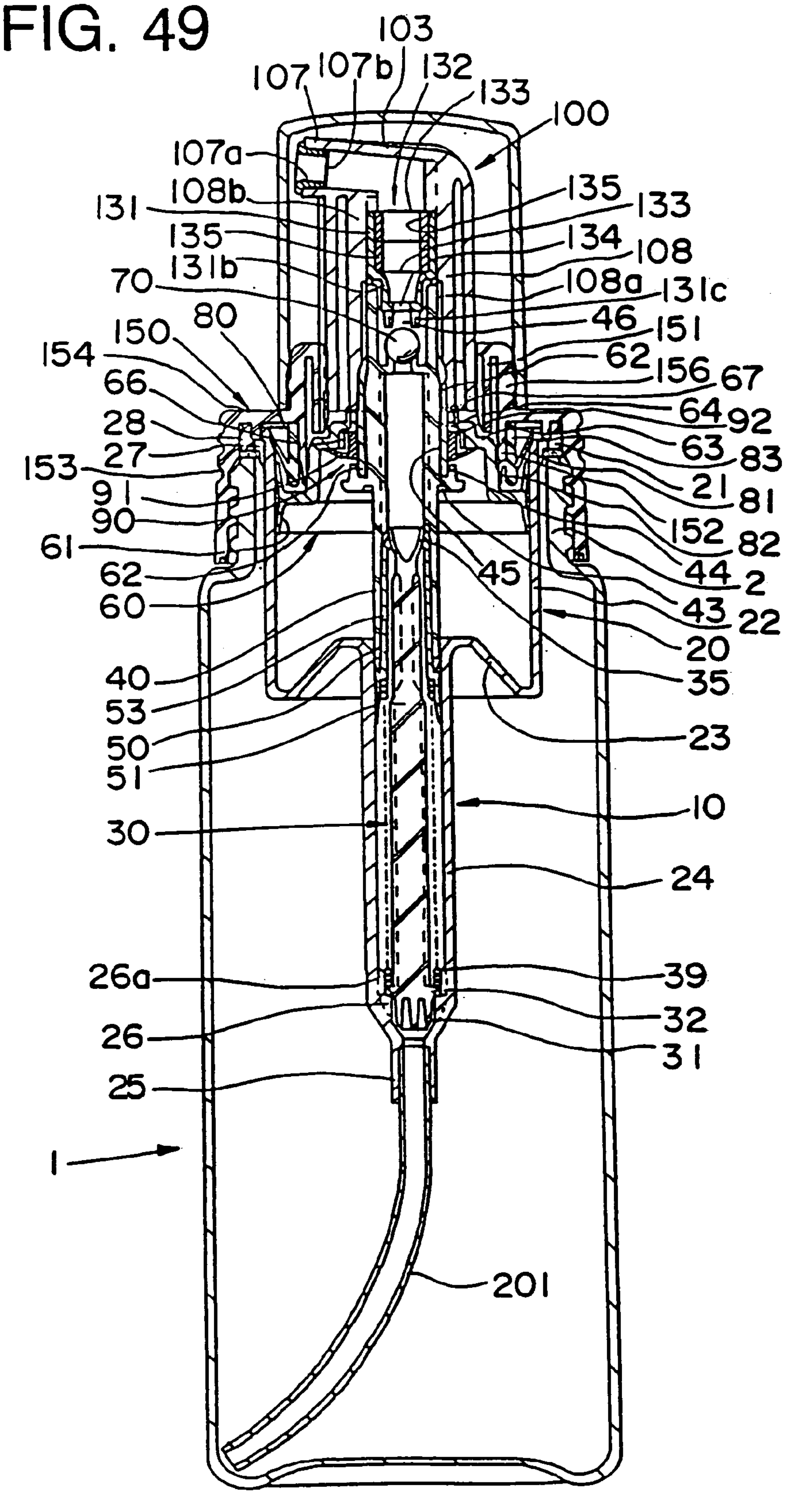
FIG. 49 is a longitudinal section diagram of a container with a pump for discharging bubbles of the embodiment 9.
Figure 50:
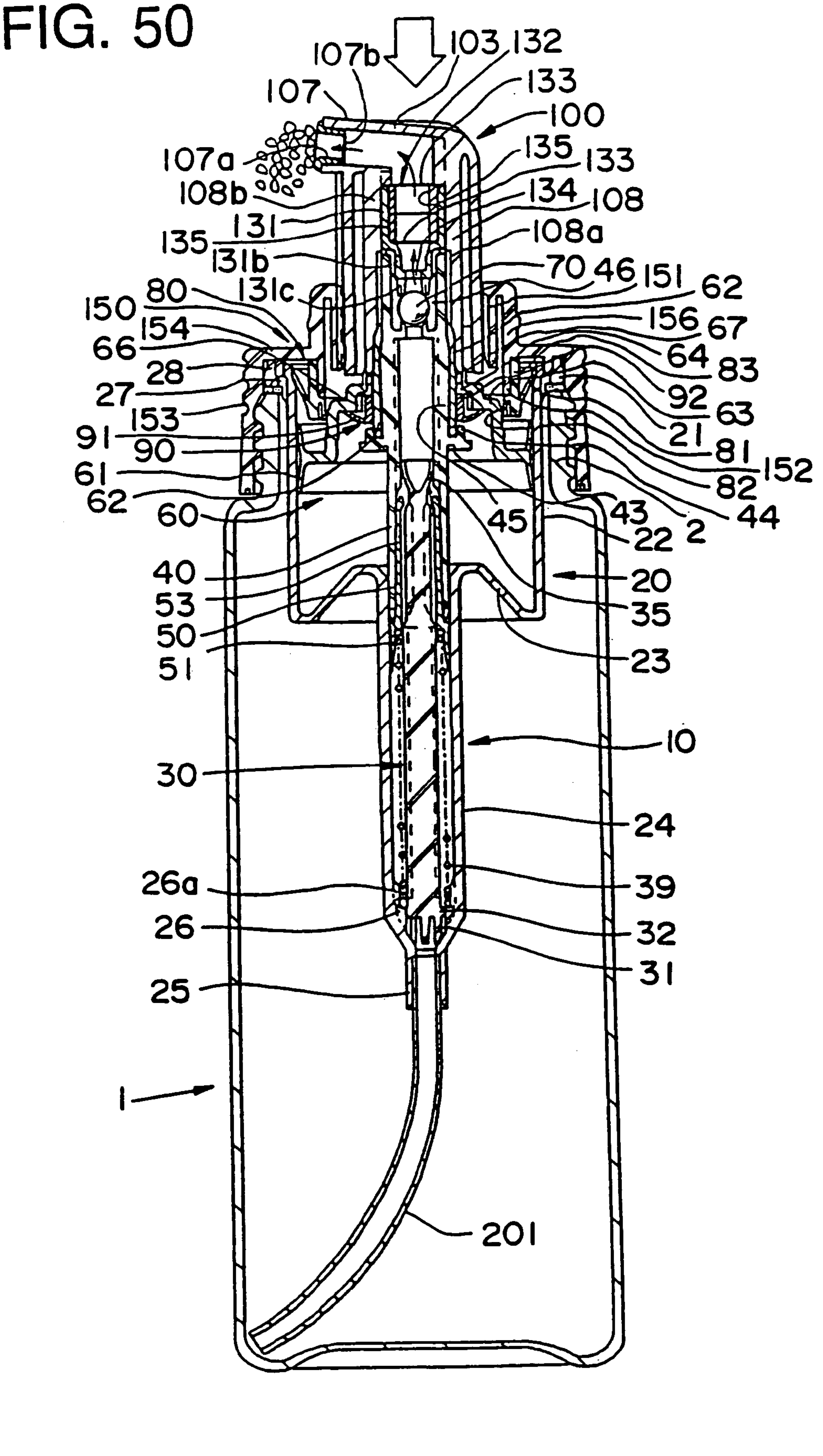
FIG. 50 is a longitudinal section diagram indicating a state that a pump head is being depressed in a container with a pump for discharging bubbles of the embodiment 9.

The second piston 20 is provided on the stem 40 in a state that it can be moved upward and downward only a little stroke in which the position where the lower end of the basic cylinder portion 62 is fitted to the internal surface in the rising wall 44 of the flange portion 43 of the stem 40 as shown in FIG. 49 is the lower limit, and the position where the lower end of the inside cylinder portion 108*b* of the fitting cylinder 108 is fitted air-tightly to the space between the basic cylinder portion 62 of the second piston 60 and the engaging cylinder 67 to seal the air hole 64 like FIG. 50 is the upper limit.

A plurality of vertical grooves 45 are provided on the external surface of the stem 40 within the portion in which the basic cylinder portion 62 of the second piston 60 is slid in the range that it is moved upward and downward only a little stroke, and the communication between the lower end of the vertical groove 45 and the inside of the large diameter cylinder portion 22 is shut off by bringing the lower end of the basic cylinder portion 62 into contact with the flange portion 43, when the second piston 60 is descended to the lower limit for the stem 40.

The second air suction valve 90 is fitted to the lower half external surface of the basic cylinder portion 62 of the second piston 60. The second air suction valve 90 comprises a short cylinder 92 fitted to the lower half external surface of the basic cylinder portion 62 and a thin-wall diaphragm 91 having an elasticity which is projected annularly to the diagonal upper outside from the lower end of the short cylinder 92.

The end portion of the diaphragm 91 is formed in a thick wall portion, and the upper surface of the thick wall portion is in contact with the lower surface of the middle horizontal board shape portion in the stepped cylinder portion 63 of the piston 60 with pressure.

In the second air suction valve 90 structured in the above-mentioned way, the elastic deformation of the diaphragm 91 can be easily made, and the second air suction valve 90 can be opened and closed securely, because the thick wall portion is provided on the end portion of the diaphragm 91.

As shown in FIG. 50, the second air suction valve 90 is descended in a state that it is closed to pressurize the inside of the large-diameter cylinder portion 22 when the stem 40 is descended. If the second air suction valve 90 is provided in the position opposite to FIG. 50 (namely, in a state that it is inverted) due to any mistakes, it is impossible to pressurize the inside of the large-diameter cylinder portion 22 and the pressurization is irresponsive, and accordingly the trouble which has occurred in the second air suction valve 90 can be discovered without delay, because the diaphragm 91 is in contact with the projecting portion 63 in the stepped cylinder portion 63 of the second piston 60 so that the valve can not be closed by the second air suction valve 90.

The first air suction valve 80 is provided on the cylinder-shaped rib 152 of the attaching trunk 150. The first air suction valve 80 comprises a cylinder portion 83 fitted to the external surface of the cylinder-shaped rib 152 of the attaching trunk 150, a seal cylinder portion 81 which is extended in a reverse-skirt shape to the diagonal upper outside and has an elasticity and a seal cylinder portion 82 which is extended downward from the lower part internal surface of the cylinder portion 83.

A little gap is formed in the space between the cylinder portion 83 and the peripheral wall internal surface of the large-diameter cylinder portion 22. The end portion of the seal cylinder portion is in contact with the upper internal surface of the peripheral wall of the large-diameter cylinder portion 22 with pressure. As shown in FIG. 49, in the seal cylinder portion 82, the internal surface of the seal cylinder portion 82 is brought into contact water-tightly with the external surface of the vertical cylinder portion in the stepped cylinder portion 63 of the second piston 60 with pressure when the stem 40 is at the upper limit.

There is not any possibilities that the first air suction valve 80 falls off from the cylinder-shaped rib 152 by the high-pressure air, even if the air within the container body high-pressurized by temperature rise and the like passes through the air hole 27 of the flange portion 21 of the cylinder member 20 to get into the upper part of the large-diameter cylinder portion 22, because the first air suction valve 80 is structured in the above-mentioned way.

The liquid suction valve 30 is received within the small-diameter cylinder portion 24 to insert the upper part of the liquid suction valve 30 into the lower part of the stem 40.

A plurality of engagement pins 32 are projected in a portion of a little upper from the lower end of the liquid suction valve 30, and the engagement pins 32 are fitted to the space among the vertical ribs 26 provided vertically on the lower part internal surface of the small-diameter cylinder portion 24 in a state that they can be moved upward and downward. The lower end of the liquid suction valve 30 functions as a lower-part valve body 31, and the lower part valve body 31 closes the liquid suction hole of the small diameter cylinder portion 24, when the liquid suction valve 30 is descended.

The upper end of the liquid suction valve 30 functions as an upper-part valve body 35, and the upper part valve body 35 is held by the internal surface of the projections provided vertically on the internal surface of the stem 40 and can be slid to the internal surface of the projections. Accordingly, when the stem 40 is descended, the stem 40 and the liquid suction valve 30 are descended together in the beginning. After the lower-part valve body 31 of the liquid suction valve 30 comes into contact with the lower end of the small diameter cylinder portion 24 to close the liquid suction valve hole, the liquid suction valve 30 is stopped and the stem 40 continues to be descended.

On the other hand, when the stem 40 is ascended, although the liquid suction valve 30 is ascended with the stem 40 in the beginning, the liquid suction valve 30 is stopped by contact of the engagement pin 32 with the lower surface of the coil spring 39 and the stem 40 continues to be ascended.

In the container structured in the above-mentioned way, the bubble whose diameter is suitable for the use can be bubbled easily by changing the number of the bubbling elements 132 to be provided and the direction of the bubbling element 132 and so on, because the net 133 is provided extendedly on the upper end of the short cylinder 135 to form the bubbling element 132, the cylinder hole portion (casing 131) for fitting the bubbling element 132 is formed long in the vertical direction, and the cylinder hole portion is set up in the length into which a plurality of bubbling elements 132 can be fitted in a line so as to fit a single or a plurality of bubbling elements 132 to the cylinder hole part.

Figure 51:
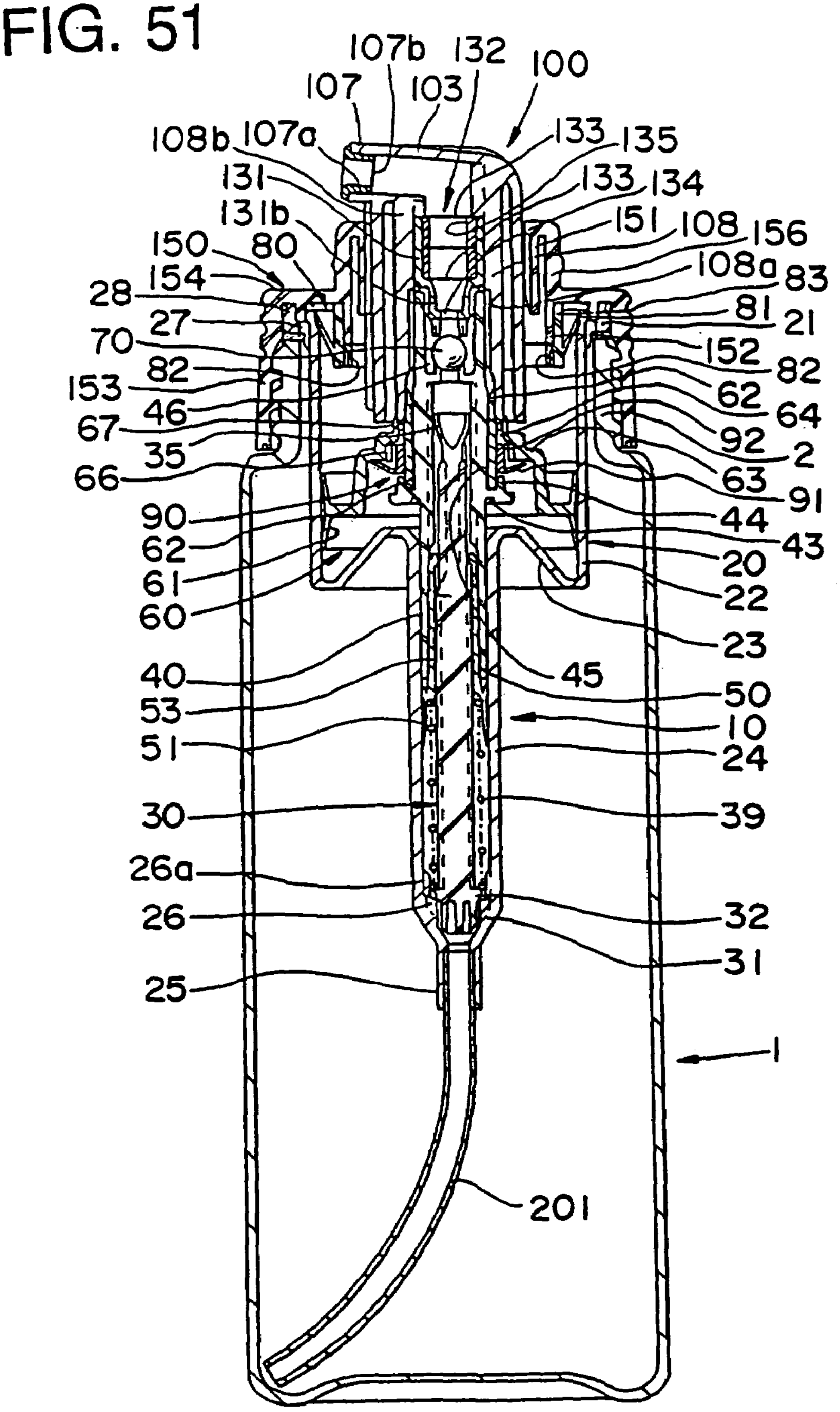
FIG. 51 is a longitudinal section diagram indicating a state that a pump head is ascending in a container with a pump for discharging bubbles of the embodiment 9.

According to an experiment, the bubbling of the fine and equalized bubbles could be obtained, when one bubbling, element 132 in which a net 133 was provided extendedly on the upper end of the short cylinder 135 was fitted to the upper part, and one similar bubbling element 132 was fitted to the lower part in a state that it was inverted within the casing 131, respectively as shown in FIG. 49 to FIG. 51. The bubbles of medium diameter could be bubbled, when only one bubbling element 132 in which the net 133 was provided on the lower end of the short cylinder 83 was fitted to the lower part of the casing 131 as shown in FIG. 52, and the bubbles of large-diameter could be bubbled when only one bubbling element 132 in which the net was provided extendedly on the upper end of the short cylinder 83 was fitted to the upper part of the casing 131 as shown in FIG. 53.

Figure 53:
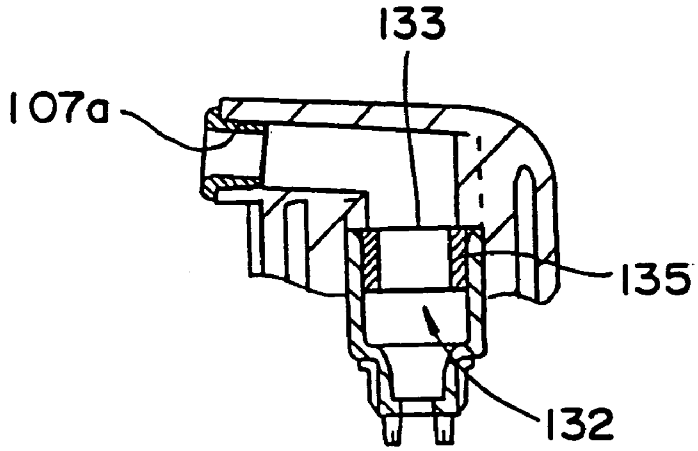
FIG. 53 is a longitudinal section diagram of the principal part indicating another provision example of a bubbling element in a container with a pump for discharging bubbles of the embodiment 9.

Besides, the diameter of the bubbles could be changed gradually within the range of the diameter of the bubbles in the case shown in FIG. 52 to the diameter of the bubbles in the case shown in FIG. 53, when the fitting position of the bubbling element 132 of FIG. 52 was moved upward in order and the fitting position of the bubbling element 132 of FIG. 53 was moved downward in order.

The diameter of the bubbles which were discharged could be further shortened a little and could be equalized, when the mouth cylinder 107*a* was fitted into the end of the nozzle 107 and the net 107*b* was provided extendedly on the mouth cylinder 107*a*.

Embodiment 10

The container with a pump for discharging bubbles of the embodiment 10 will be described in accordance with FIG. 54 and FIG. 55.

The container with a pump for discharging bubbles comprises a container body 1 in which a neck portion 2 is provided on the upper end, a pump for discharging bubbles 10 provided on the neck portion 2 and an attaching trunk 150 for fixing the pump for discharging bubbles 10 on the neck portion 2.

The pump for discharging bubbles 10 comprises a cylinder member 20, a liquid suction valve 30, a stem 40, a first piston 50, a second piston 60, a liquid discharge valve 70, a first air suction valve 80, a second air suction valve 90, a pump head 100 and a bubbling element 132.

The attaching trunk 150 comprises a peripheral wall 153 screwed on the neck portion 2 of the container body 2, a top wall 154 linked to the upper end of the peripheral wall 153 and a rising cylinder portion 156 which is extended upward from the margin of the central opening in a state that it is stood up and in which a thread is provided on the outside surface. In the lower surface of top wall 154, a cylinder-shaped rib 152 is extended downward from the region separated from the peripheral wall 153.

In the cylinder member 20, the upper half is formed to a large-diameter cylinder portion 22 for air and the lower half is formed to a small-diameter cylinder portion 24 for liquid, and the cylinder portions 22 and 24 are linked one another by a bottom board portion 23.

A flange portion 21 which is projected to the outside is formed on the upper end of the large diameter cylinder portion 22, and the flange portion 21 is held by the upper end surface of the neck portion 2 of the container body 1 and the top wall 154 of the attaching trunk 150.

A fitting cylinder portion 28 is stood up from the marginal portion of the flange portion 21, and an air hole 27 is provided on the basic end portion of the flange portion 21. The fitting cylinder portion 28 is held by the small-cylinder hanging vertically from the top wall peripheral portion of the attaching trunk 150 and the upper part of the peripheral wall of the attaching trunk 150.

The lower end of the small-diameter cylinder portion 24 is formed in a taper shape whose diameter is reduced as it proceeds downward, a connection cylinder 25 is extended downward from the lower-end of the small-diameter cylinder portion 24, and the upper end of a suction pipe 201 is fitted to the connection cylinder 25.

A plurality of vertical ribs 26 are provided on the internal surface of the above-mentioned taper shape part of the small diameter cylinder portion 24, a plurality of projections 26*a* are provided also on the internal surface of the small diameter cylinder portion 24 in a position upper than the vertical ribs 26, and the inscribed circle diameter of the projections 26*a* is larger than the inscribed circle diameter of the vertical ribs 26. The lower end of a coil spring 39 mentioned later is inserted into the projection 26*a*, and the lower end of the coil spring 39 is mounted on the upper end surface of the vertical rib 26.

The stem 40 and the pump head 100 are provided on the cylinder member 20 in a state that they can be moved upward and downward freely and they are energized upward. The pump head 100 is fixed on the upper end of the stem 40.

The second piston 60 fitted into the large-diameter cylinder portion 22 and the first piston 50 fitted into the small-diameter cylinder portion 24 are provided on the stem 40. The second piston 60 is provided in a state that it can be moved upward and downward only a little stroke to the stem 40.

The first piston 50 is provided on the stem 40 in a state that the cylinder portion 53 is fitted to the lower end inside of the stem 40 and the seal portion 51 is projected from the lower end of the stem 40. The stem 40 is energized upward all the time by the coil spring 39 which is made lie in the space between the first piston 50 and the upper end surface of the vertical rib 26 of the small-diameter cylinder portion 24, and accordingly the pump head is also energized to upward all the time.

The liquid discharge valve 70 is provided on the upper part within the stem 40, the annular flange portion 43 which is projected to the outside is provided on the central portion of the stem 40, and an annular rising wall 44 is stood up from the periphery of the flange portion 43.

In the pump head 100, a fitting cylinder 108 is extended downward from the peripheral portion of the top board portion 103, a nozzle 107 whose basic end is opened to the upper end internal surface of the fitting cylinder 108 is extended horizontally, and the end portion of the nozzle 107 is projected to the outside. The lower part of the fitting cylinder 108 is inserted into the rising cylinder portion 156 of the attaching trunk 150 in a state that it can be moved upward and downward.

The lower-part inside of the fitting cylinder 108 is formed to the large-inside-diameter portion, and the upper end portion of the stem 40 is fitted to the lower half of the upper cylinder part of the fitting cylinder 108. An annular concave portion 108*c* is formed on the space between the large-inside-diameter portion and the periphery of the stem 40. In the fitting cylinder 108, a plurality of vertical grooves 108*a* which function as an air passage are provided on the internal surface of the stem-fitting-part, the upper end of the vertical groove 108*a* is opened in a position higher than the upper end surface of the stem 40, and the lower end of the vertical groove 108*a* is opened in the upper end of the concave portion 108*c*.

In the pump head 100, a thread cylinder 108*d* to be screwed on the periphery of the rising cylinder 156 of the attaching trunk 150 is provided in a position lower than the nozzle 107 in the outside of the fitting cylinder 108 and the rising cylinder portion 156 can be screwed on the thread cylinder 108*d* one another in a state that the pump head 100 is pushed down so that the pump head can be fixed on the lower limit position.

The pump head 100 is not pushed down by mistake if the pump head 100 is pushed down to be stopped engagedly on the attaching trunk 150 when it is not used, and accordingly the unexpected leak of the liquid can be prevented securely without a cover cap. Besides, if the pump head 100 is formed in the above-mentioned way, the container can be miniaturized wholly, and the pump head 100 formed in the above-mentioned way is convenient when it is stored.

The casing 131 whose lower part is made as a small-diameter portion 131*b* and is inserted into the upper end portion of the stem 40 is fitted to the upper-part inside of the above-mentioned fitting cylinder 108. The bubbling member fitting portion is made up of the casings 131.

In the casing 131, the length of the part to which the bubbling element 132 is fitted is set up in the length to which a plurality of bubbling elements can be fitted in a state that they are piled upward and downward. In the small-diameter portion 131*b* inserted into the upper end portion of the stem 40, an inward flange is provided on the lower end and a blocking piece 131*c* is extended downward from the inward flange.

The blocking piece 131*c* prevents the liquid discharge valve 70 from closing a hole 134 of the inward flange, when the liquid discharge valve 70 is pushed up by the liquid flowing into the casing 131 from the inside of the stem 40.

The space between the inward flange and the liquid discharge valve 70 functions as a vapor-liquid mixing chamber 46. In the vapor-liquid mixing chamber 46, the liquid which has passed through the liquid discharge valve 70 is mixed with the high pressure air which has passed through the vertical groove 108*a* and the space between the upper part internal surface of the stem 40 and the external surface of the small diameter portion 131*b*.

Further, the casing 131 is not always required, and the bubbling element 132 can be fitted to upper part inside of the fitting cylinder 108 directly.

The bubbling element 132 is structured such that the net 133 is provided extendedly on the upper end of the short cylinder 135. The outside diameter of the short cylinder 135 is made to the size which can be inserted fixedly into the internal surface of the casing 131. In the container shown in FIG. 54 and FIG. 55, the bubbling element 132 arranged on the lower side is provided in a state that it is inverted and the bubbling element 132 arranged on the upper side is provided in a state that it is erected.

Further, although the illustration is omitted, the container can be structured such that only one inverted bubbling element 132 is fitted into the lower part of the casing 131, or the container can be structured such that only one erected bubbling element 132 is fitted into the upper part of the casing 131.

As mentioned hereinbefore, the container is structured such that a single or a plurality of bubbling elements 132 can be fitted to the casing 131 which is a bubbling member fitting portion.

The second piston 60 comprises a basic cylinder portion 62 fitted to the upper-part external surface of the stem 40 in a state that it can be slid, a seal cylinder portion 61 fitted to the internal surface of the large-diameter cylinder portion 22 in a state that it can be slid and a stepped cylinder portion 63 which connects the basic cylinder portion 62 to the seal cylinder portion 61. The stepped cylinder portion 63 is formed in a step shape in which the basic cylinder portion 62 side is high and the seal cylinder portion 61 side is low.

In the stepped cylinder portion 63, a plurality of air holes 64 are provided on the part adjacent to the basic cylinder portion 62. The upper end of the basic cylinder portion 62 functions as a thin-wall elastic portion which is enlarged to a little upper outside, and the end of the basic cylinder portion 62 is brought into contact air-tightly with the lower part internal surface of the fitting cylinder 108 with pressure.

In the stepped cylinder portion 63, a plurality of projections 66 are provided on the internal surface of the vertical cylinder part. In the stepped cylinder portion 63, the engaging cylinder 67 is provided from the upper horizontal board shape portion in a state that it is stood up and a little gap is opened in a space between the basic cylinder portion 62 and the engaging cylinder 67, and the air hole 64 is provided on the horizontal board shape portion positioned on the above-mentioned gap.

Figure 54:
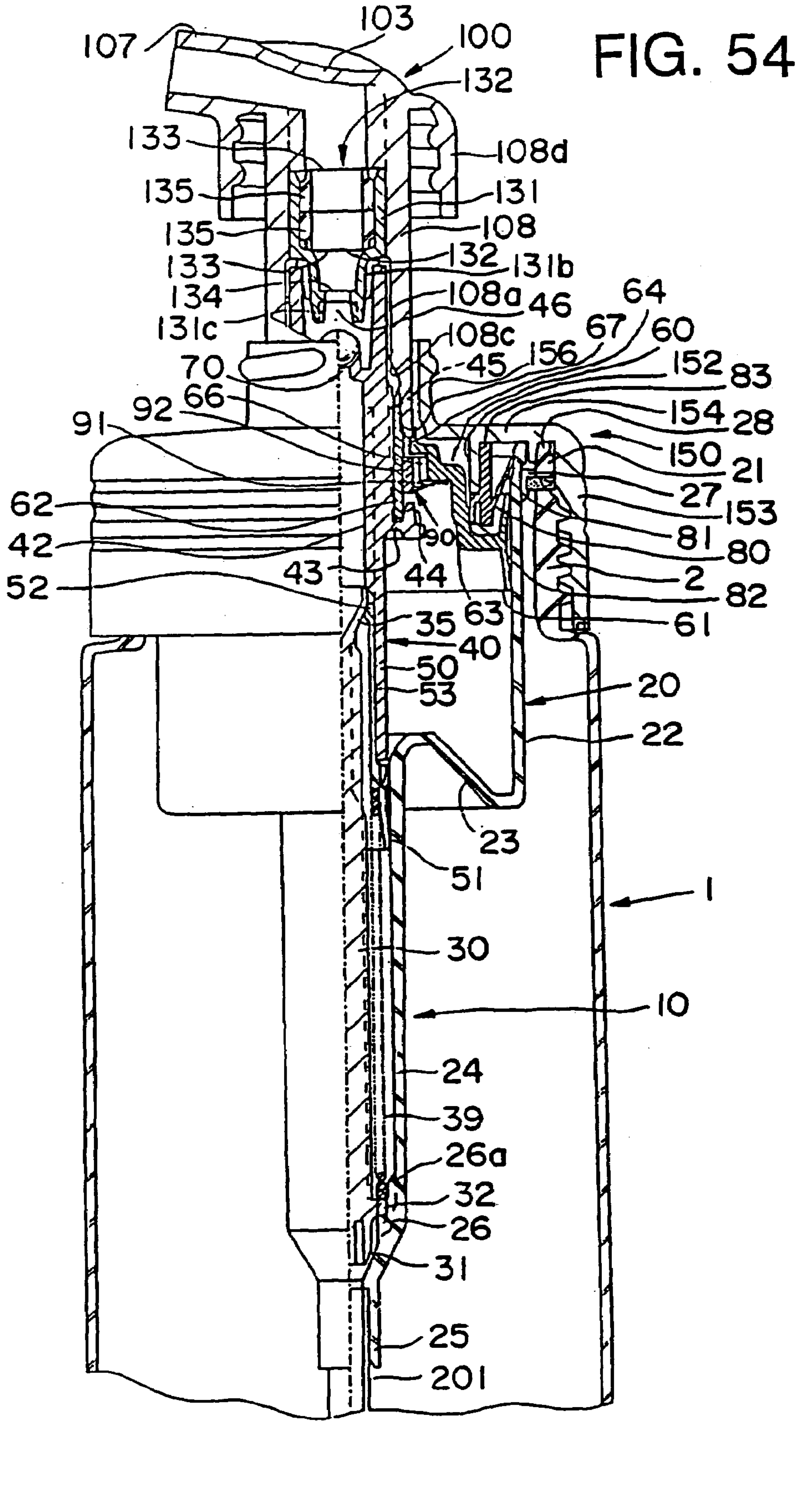
FIG. 54 is a side view diagram indicating a container with a pump for discharging bubbles of the embodiment 10 in which part of it is sectioned.

The second piston 60 is provided on the stem 40 in a state that it can be moved upward and downward only a little stroke in which the position where the lower end of the basic cylinder portion 62 is fitted to the internal surface of the rising wall 44 of the flange portion 43 in the stem 40 as shown in FIG. 54 is a lower limit, and the position where the lower end of the fitting cylinder 108 is fitted air-tightly to the space between the basic cylinder portion 62 of the second piston 60 and the engaging cylinder 67 to close the air hole 64 closely is an upper limit.

A plurality of vertical grooves 45 are provided on the external surface of the stem 40 of the part in which the basic cylinder portion 62 of the second piston 60 can be slid, within the range in which it can be moved upward and downward only a little stroke, and when the second piston 60 is descended to the lower limit for the stem 40, the communication between the lower end of the vertical groove 45 and the inside of the large diameter cylinder portion 22 is shut off by bringing the lower end of the basic cylinder portion 62 into contact with the flange portion 43.

The second air suction valve 90 is fitted to the lower half external surface of the basic cylinder portion 62 of the second piston 60. The second air suction valve 90 is provided with a short cylinder fitted to the lower half external surface of the basic cylinder portion 62 and a thin-wall diaphragm 91 having an elasticity which is projected annularly to the diagonal upper outside from the lower end of the short cylinder 92. The end portion of the diaphragm 91 is formed in a thick-wall portion, and the upper surface of the thick-wall portion is in contact with the lower surface of the middle horizontal board shape portion in the stepped cylinder portion 63 of the second piston 60 with pressure.

In the second air suction valve 90 structured in the above-mentioned way, the elastic deformation of the diaphragm 91 can be easily made, and the second air suction valve 90 can be opened and closed securely, because the thick-wall portion is provided on the end portion of the diaphragm 91.

Figure 55:
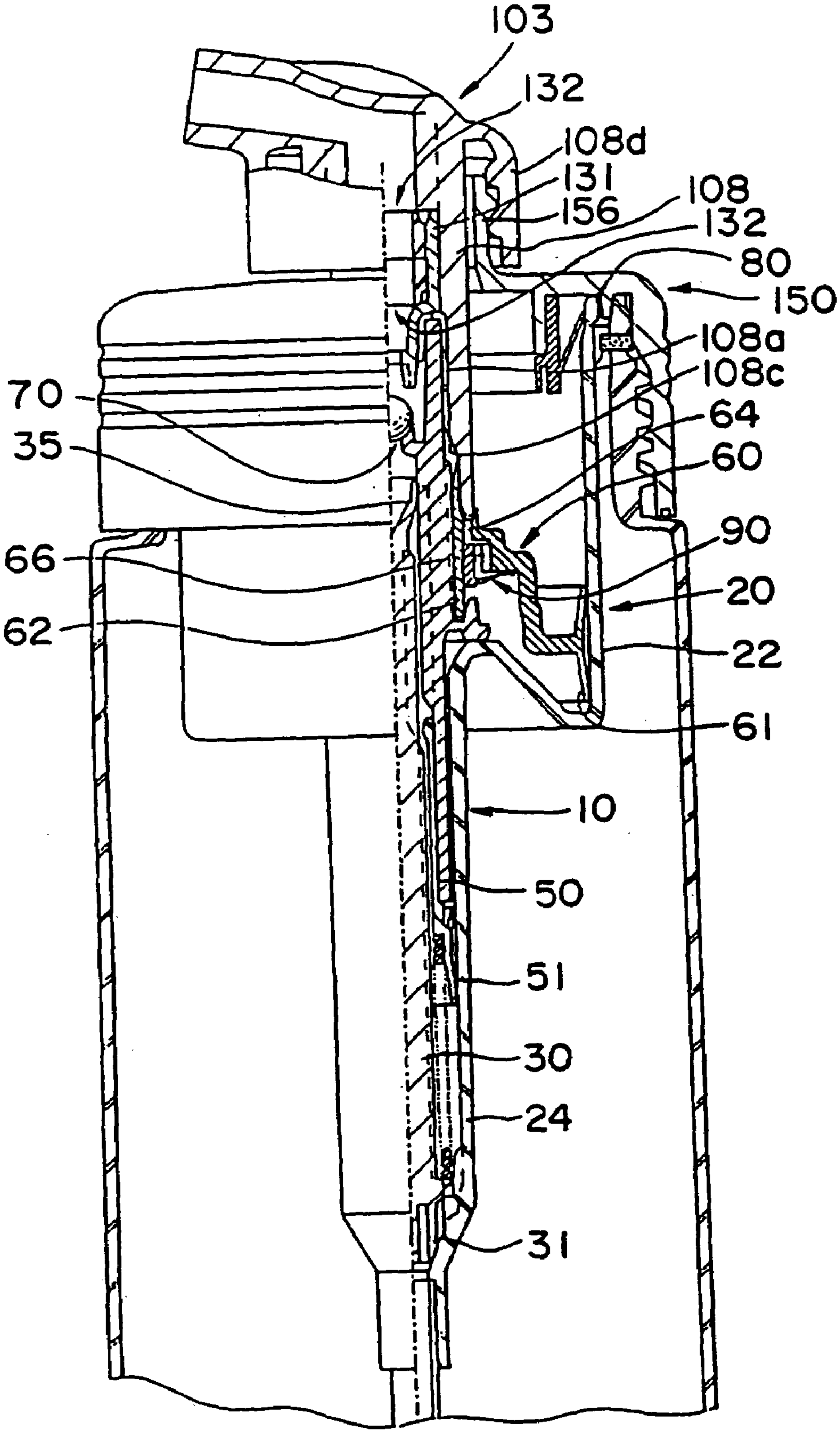
FIG. 55 is a side view diagram indicating a container with a pump for discharging bubbles of the embodiment 10 in a state that part of it is sectioned, which diagram indicating a state that a pump head is depressed to be held on an attaching trunk engagedly.

As shown in FIG. 55, the second air suction valve 90 is descended in a state that it is closed to pressurize the inside of the large-diameter cylinder portion 22 when the stem 40 is descended. If the second air suction valve 90 is provided in the position opposite to FIG. 55 (namely, in a state that it is inverted) due to any mistakes, it is impossible to pressurize the inside of the large-diameter cylinder portion 22 and the pressurization is irresponsive, and accordingly the trouble which has occurred in the second air suction valve 90 can be discovered without delay, because the diaphragm-91 is in contact with the projecting portion 66 in the stepped cylinder portion 63 of the second piston 60 so that the valve can not be closed by the second air suction valve 90.

The first air suction valve 80 is provided on the cylinder-shaped rib 152 of the attaching trunk 150. The first air suction valve 80 comprises a cylinder portion 83 fitted to the external surface of the cylinder-shaped rib 152 of the attaching trunk 150, a seal cylinder portion 81 which is extended in a skirt shape to the diagonal upper outside from the lower part external surface of the cylinder portion 83 and has an elasticity and a seal cylinder portion 82 which is extended downward from the lower part internal surface of the cylinder portion 83.

A little gap is formed in the space between the cylinder portion 83 and the peripheral wall internal surface of the large-diameter cylinder portion 22. The end portion of the seal cylinder portion 81 is in contact with the upper part internal surface of the peripheral wall of the large-diameter cylinder portion 22 with pressure. As shown in FIG. 54, in the seal cylinder portion 82, the internal surface of the seal cylinder portion 82 is brought into contact water-tightly with the external surface of the vertical cylinder portion in the stepped cylinder portion 63 of the second piston 60 when the stem 40 is at the upper limit.

There is not any possibilities that the first air suction valve 80 falls off from the cylinder-shaped rib 152 by the high-pressure air, even if the air within the container body high-pressurized by temperature rise and the like passes through the air hole 27 of the flange portion 21 of the cylinder member 20 to get into the upper part of the large-diameter cylinder portion 22, because the first air suction valve 80 is structured in the above-mentioned way.

The liquid suction valve 30 is received within the small-diameter cylinder portion 24 and the upper part of the liquid suction valve 30 is inserted into the lower part of the stem 40.

A plurality of engagement pins 32 are projected to the portion a little upper from the lower end of the liquid suction valve 30, and the engagement pins 32 are fitted to the space among the vertical ribs 26 provided vertically on the lower part internal surface of the small diameter cylinder portion 24 in a state that they can be moved upward and downward.

The lower end of the liquid suction valve 30 functions as a lower-part valve body 31, and the lower part valve body 31 closes the liquid suction hole of the small-diameter cylinder portion 24, when the liquid suction valve 30 is descended.

The upper end of the liquid suction valve 30 functions as an upper-part valve body 35 in a state that it is formed in an upward skirt shape, and the upper-part valve body 35 is held by the internal surface of the vertical rib 42 provided vertically on the internal surface of the stem 40 and can be slid on the internal surface of the vertical rib 42.

Accordingly, when the stem 40 is descended, the stem 40 and the liquid suction valve 30 are descended together in the beginning. After the lower part valve body 31 of the liquid suction valve 30 comes into contact with the lower end of the small-diameter cylinder portion 24 to close the liquid suction valve hole, the liquid suction valve 30 is stopped and the stem 40 continues to be descended.

On the other hand, when the stem 40 is ascended, although the liquid suction valve 30 is ascended with the stem 40 in the beginning, the liquid suction valve 30 is stopped and the stem 40 continues to be ascended after the engagement pin 32 comes into contact with the lower surface of the coil spring 39.

Further, the plurality of vertical ribs 42 are provided in a state that they are dispersed with respect to the circumferential direction, a right-upward position of the cylinder portion 53 of the first piston 50 is a starting point and the position in which a predetermined space is opened downward from the liquid suction valve 70 is an end point.

In the state of FIG. 54 in which the pump head 100 is in the uppermost position, the upper-part valve body 35 is separated from each of the vertical ribs 42 and is brought into contact fluid-tightly with the valve seat 52 provided on the upper end internal surface of the cylinder portion 53 of the first piston 50 to shut off between the upper and lower parts of the stem 40 in the part. On the other hand, as shown in FIG. 55, in a state that the pump head 100 is depressed to be held engagedly on the attaching trunk 150, the upper part valve body 35 of the liquid suction valve 30 gets to the portion upper than the region in which the vertical ribs 42 are-formed within the stem 40 so as to shut off between the upper and lower parts of the stem 40 fluid-tightly in the part.

In the container structured in the above-mentioned way, the bubble whose diameter is suitable for the use can be bubbled easily by changing the number of the bubbling elements 132 to be provided and the direction of the bubbling element 132 and so on, because the net 133 is provided extendedly on the upper end of the short cylinder 135 to form the bubbling element 132, the fitting portion (casing 131) for fitting the bubbling element 132 is formed long in the vertical direction, and the fitting portion is set up in the length into which a plurality of bubbling elements 132 can be fitted in a line so as to fit a single or a plurality of bubbling elements 132 to the cylinder hole portion.

According to an experiment, the bubbling of the fine and equalized bubbles could be obtained, when one bubbling element 132 in which a net 133 was provided extendedly on the upper end of the short cylinder 135 was fitted to the upper part, and one similar bubbling element 132 was fitted to the lower part in a state that it was inverted within the casing 131 respectively, as shown in FIG. 54 and FIG. 55.

Besides, although it is not illustrated, the bubbles of medium diameter could be bubbled, when only one bubbling element 132 in which the net 133 was provided on the lower end of the short cylinder 135 was fitted to the lower part of the casing 131.

Further, the bubbles of large diameter could be bubbled when only one bubbling element 132 in which the net 133 was provided extendedly on the upper end of the short cylinder 135 was fitted to the upper part of the casing 131.

Besides, the diameter of the bubbles could be changed gradually, when the fitting position of only one fitted bubbling element 132 was moved in order.

Modified Example of the Embodiment 10

Figure 56:
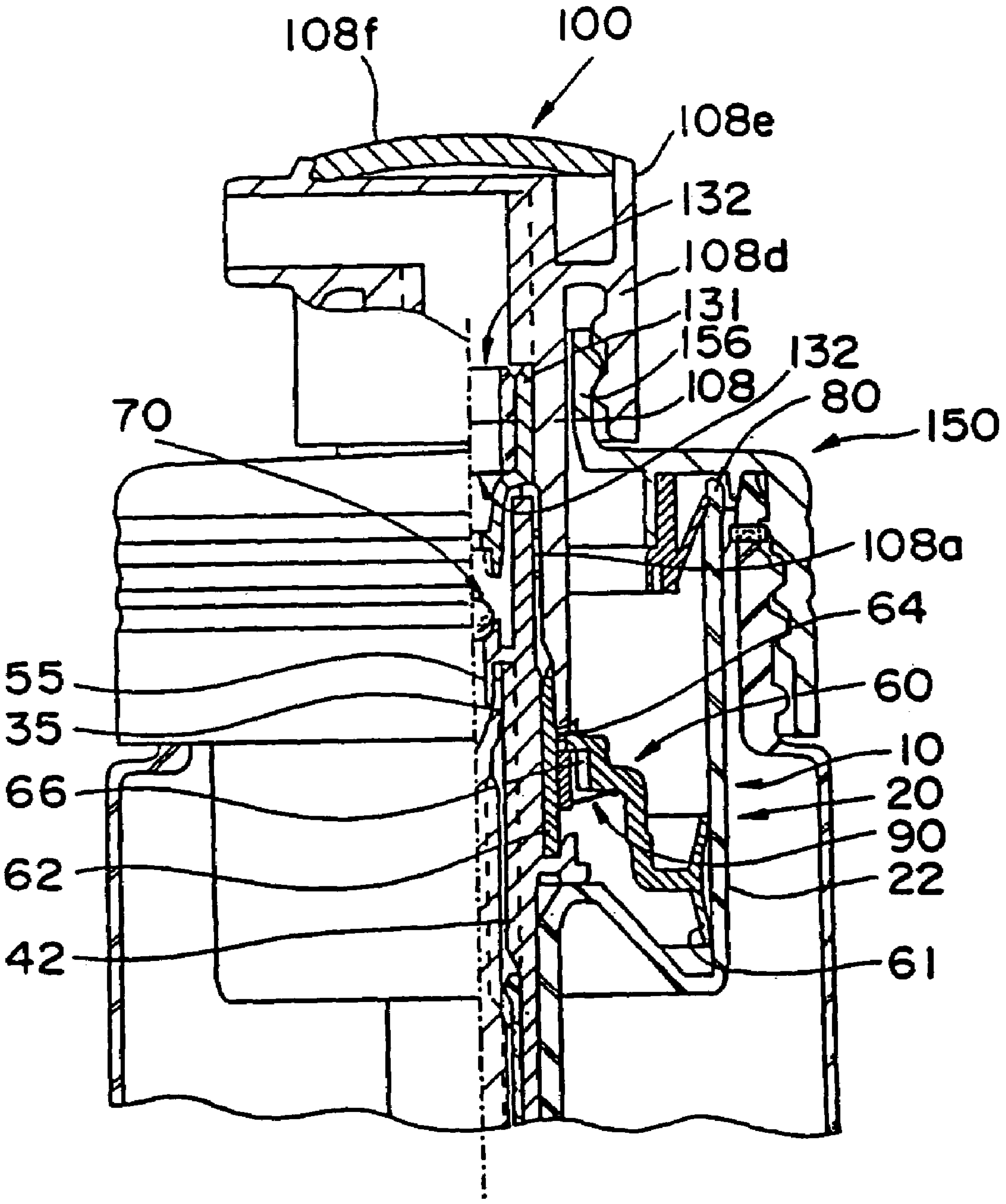
FIG. 56 is a cross section diagram indicating a modified embodiment of a container with a pump for discharging bubbles of the embodiment 10 in which part of it is sectioned.

Then, the modified example of the embodiment 10 will be described in accordance with FIG. 56.

In the modified example, the pump head 100 is structured such that a thread cylinder 108*a* is extended downward from the flange outside margin which is provided projectingly from the peripheral upper part of the fitting cylinder 108, a fitting cylinder 108*e* is provided upward from the flange outside margin in a state that it is stood up and a top board 108*f* is fitted to the upper end portion of the fitting cylinder 108*e*.

Besides, in the stem 40, a vertically hanging wall 55 is provided downward from the upper end portion of the vertical rib 42 in a state that a predetermined width is opened so that the upper part valve body 35 is fitted fluid-tightly to the space between the internal surface of the vertical rib 42 and the vertically hanging wall 55 to shut off between the upper and lower parts of the stem 40 fluid-tightly in this portion, when the pump head 100 is depressed to be stopped engagedly on the attaching trunk 150. The other structures are the same as the cases shown in FIG. 54 and FIG. 55.

Embodiment 11

The container with a pump for discharging bubbles of the embodiment 11 will be described in accordance with FIG. 57 and FIG. 58.

The container with a pump for discharging bubbles comprises a container body 1 in which a neck portion 2 is provided on the upper end, a pump for discharging bubbles 10 provided on the neck portion 2 and an attaching trunk 150 for fixing the pump for discharging bubbles 10 on the neck portion 2.

The pump for discharging bubbles 10 comprises a cylinder member 20, a liquid suction valve 30, a stem 40, a first piston 50, a second piston 60, a liquid discharge valve 70, a first air suction valve 80, a second air suction valve 90, a pump head 100 and a bubbling unit 130.

The attaching trunk 150 comprises a peripheral wall 153 screwed on the neck position 2 of the container body 1, a top wall 154 linked to the upper end of the peripheral wall 153 and a rising cylinder portion 156 which is extended upward from the center of the top wall in a state that it is stood up.

The top wall central portion of the rising cylinder portion 156 is opened, and a central cylinder portion 151 is extended downward from the opening margin of the rising cylinder portion 156. A cylinder-shaped rib 152 is extended downward from the top wall lower surface of the rising cylinder portion 156, and the end of the cylinder-shaped rib 152 is positioned in a portion lower than the central cylinder portion 151.

In the cylinder member 20, the upper half is formed to the large-diameter cylinder portion 22, the lower half is formed to the small diameter cylinder portion 24, and both cylinder portions 22 and 24 are linked to the bottom plate portion 23.

The flange portion 21 which is projected to the outside is formed on the upper end of the large-diameter cylinder portion 22, and the flange portion 21 is held by the upper end surface of the neck portion 2 of the container body 1 and the peripheral portion of the top wall 154 of the attaching trunk 150.

An engaging cylinder portion 28 is stood up from the marginal portion of the flange portion 21, and an air hole 27 is provided on the basic end portion of the flange portion 21. The fitting cylinder portion 28 is held by the small cylinder hanging vertically from the top wall peripheral portion of the attaching trunk 150 and the upper part of the peripheral wall of the attaching trunk 150.

The lower end of the small cylinder portion 24 is formed in a taper shape whose diameter is reduced as it proceeds downward, a connection cylinder 25 is extended downward from the lower end thereof, and the upper end of a suction pipe 201 is fitted to the connection cylinder 25.

A plurality of vertical ribs 26 are provided on the internal surface of the above-mentioned taper shape part of the small diameter cylinder portion 24, a plurality of projections 26*a* are also provided on the internal surface of the small diameter cylinder portion 24 in a position upper than the vertical ribs 26, and the inscribed circle diameter of the projections 26*a* are is larger than the inscribed circle diameter of the vertical ribs 26. The lower end of a coil spring mentioned later is inserted into the projection 26*a*, and the lower end of the coil spring 39 is mounted on the upper end surface of the vertical rib 26.

The stem 40 and the pump head 100 are provided on the cylinder member 20 in a state that they can be moved upward and downward freely and they are energized upward. The pump head 100 is fixed on the upper end of the stem 40.

The second piston 60 fitted into the large diameter cylinder portion 22 and the first piston 50 fitted into the small diameter cylinder portion 24 are provided on the stem 40. The second piston 60 is provided in a state that it can be moved upward and downward a little stroke to the stem 40.

In the first piston 50, the cylinder portion 53 is fitted to the lower end inside of the stem 40 and the seal portion 51 is provided on the stem 40 in a state that it is projected from the lower end of the stem 40. The stem 40 is energized upward by the coil spring 39 which is made to lie in a space between the first piston 50 and the upper end surface of the vertical rib 19 of the small diameter cylinder portion 24 all the time, and accordingly the pump head 100 is also energized upward all the time.

A liquid discharge valve 70 is provided on the upper part within the stem 40, an annular flange portion 43 which is projected to the outside is provided on the middle portion of the stem 40, and an annular rising wall 44 is stood up from the periphery of the flange portion 43.

In the pump head 100, an outside cylinder portion 101 is extended downward from the peripheral portion of the top board portion 103, an inside cylinder portion 102 is extended downward from the central portion of the top board portion 103, a nozzle 107 in which the basic end is opened to the upper end internal surface of the inside cylinder portion 102 is extended horizontally to pass through the outside cylinder portion 101 so as to project the end to the outside.

The lower part of the outside cylinder portion 101 is inserted into the central cylinder portion 151 of the attaching trunk 150 in a state that it can be moved upward and downward. The lower part inside of the inside cylinder portion 102 is formed to the large inside diameter portion, and the upper end portion of the stem 40 is fitted to the lower half of the upward cylinder part of the inside cylinder portion 102.

An annular concave portion 102*d* is formed on the space between the large-inside-diameter portion of the inside cylinder portion 102 and the periphery of the stem 40. In the inside cylinder portion 102, an air passage 102*c* of a plurality of vertical grooves is provided on the internal surface of the stem fitting part, the upper end of the air passage 102*c* is opened in a position higher than the upper end surface of the stem 40, and the lower end of the stem 40 is opened in the upper end of the concave portion 102*d.*

In the pump for discharging bubbles 10, a bubbling unit 130 which is structured so that a plurality of bubbling elements 132 mentioned later can be fitted thereto in a state that it is erected and inverted is provided on the downstream of the confluence in which the liquid introduced from the small diameter portion 24 in the downstream of the liquid discharge valve 70 within the stem 40 and the air introduced from the large-diameter cylinder portion 22 through the air passage 102*c* are Joined, so as to fit a single or a plurality of bubbling elements 132 to them.

To be more specific, the casing 131 whose lower part is formed to a small-diameter portion 131*b* and is inserted into the upper end portion of the stem 40 is fitted to the upper part inside of the above-mentioned inside cylinder portion 102. In the casing 131, the length of the part to which the bubbling element 132 is fitted is set up in the length in which a plurality of bubbling elements 132 can be fitted in a state that they are piled upward and downward.

In the small diameter portion 131*b* inserted into the upper end portion of the stem, the inward flange is provided on the lower end and a blocking piece 131*c* is extended downward from the inward flange. The blocking piece 131*c* prevents the liquid discharge valve 70 from closing a hole 134 of the inward flange, when the liquid discharge valve 70 is pushed up by the liquid flowing into the casing 131 from inside of the stem 40.

The space between the inward flange and the liquid discharge valve 70 functions as a vapor-liquid mixing chamber 46, and the liquid which has passed through the liquid discharge valve 70 and the high-pressure air which has passed through the air passage 102 and the space between the upper part internal surface of the stem 40 and the external surface of the small diameter portion 131*b* to be flown out are mixed in the vapor-liquid mixing chamber 46.

Further, the casing 131 in not always required, and the bubbling element 132 also may be fitted to the upper part inside of the inside cylinder portion 102 directly.

The bubbling element 132 is structured such that a net 133 is provided extendedly on the upper end of a short cylinder 135. The outside diameter of the short cylinder is made to the size which can be fitted fixedly into the internal surface of the casing 131. In the embodiment 11 shown in FIG. 57, the bubbling element 132 arranged on the lower side is provided in a state that it is inverted, and the bubbling element 132 arranged on the upper side is provided in a state that it is erected.

Further, although the illustration is omitted, the container can be structured such that only one inverted bubbling element 132 is fitted into the lower part of the casing 131, or that only one erected bubbling element 132 is fitted into the upper part of the casing 131.

The second piston 60 comprises a basic cylinder portion 62 fitted to the upper part external surface of the stem 40 in a state that it can be slid, a seal cylinder portion 61 fitted to the internal surface of the large-diameter cylinder portion 22 in a state that it can be slid and a stepped cylinder portion 63 which connects the basic cylinder portion 62 to the seal cylinder portion 61.

The stepped cylinder portion 63 is formed in a step shape in which the side of the basic cylinder portion 62 is high and the side of the seal cylinder portion 61 is low.

A plurality of air holes 64 are provided on the part adjacent to the basic cylinder portion 62. The upper end of the basic cylinder portion 62 functions as a thin-wall elastic portion which is enlarged to a little upper outside, and the end of the basic cylinder portion 62 is brought into contact air-tightly with the lower part internal surface of the inside cylinder portion 102 with pressure.

A plurality of projections 66 are provided on the internal surface of the vertical cylinder part in the stepped cylinder portion 63. In the stepped cylinder portion 63, the stood-up engaging cylinder 67 is provided from the upper horizontal plate-shape portion in a state that a little gap is opened in the space between the basic cylinder portion 62 and the engaging cylinder 67, and the air hole 64 is provided on the horizontal plate-shape portion positioned in the above-mentioned gap.

Figure 57:
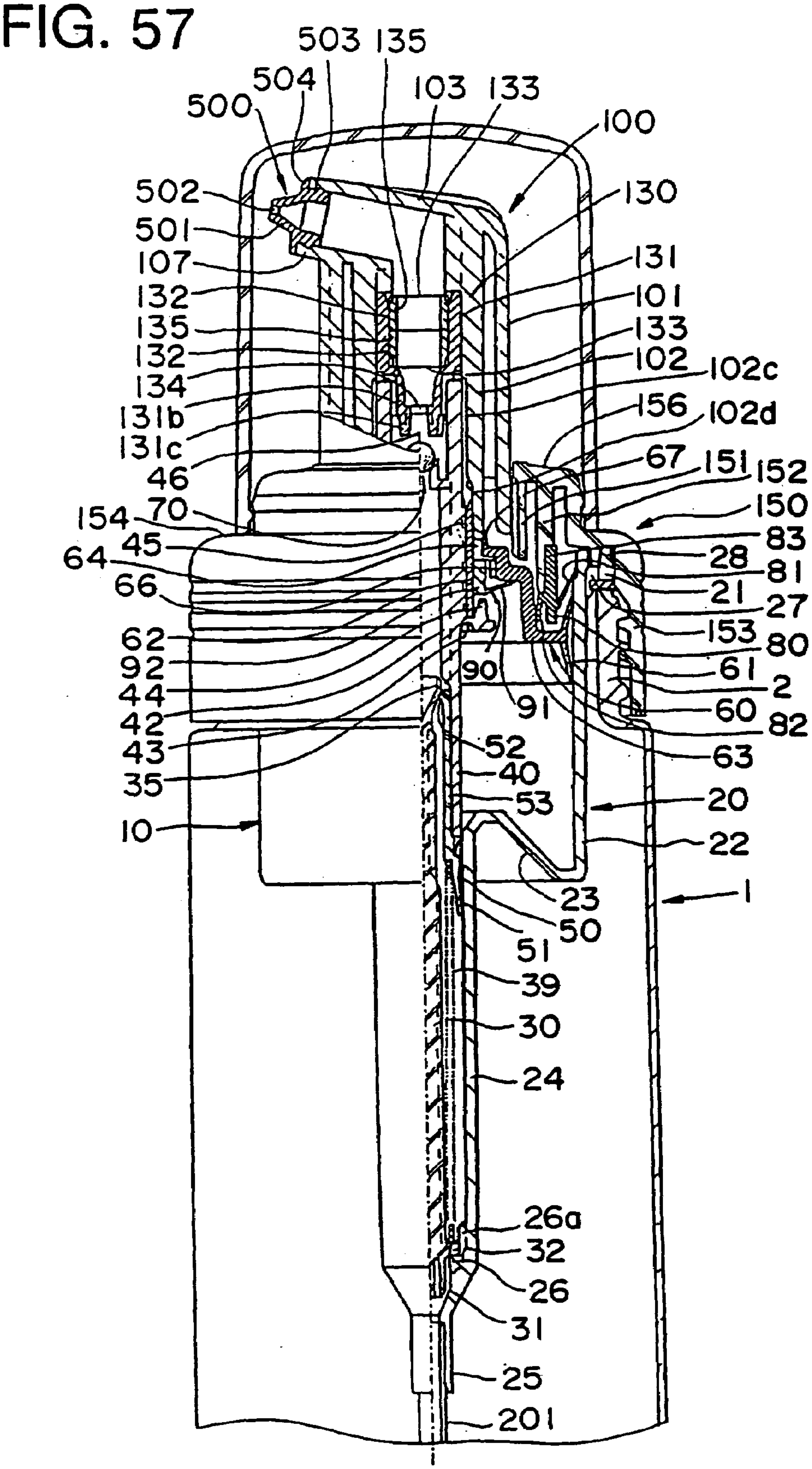
FIG. 57 is a cross section diagram indicating a container with a pump for discharging bubbles of the embodiment 11 in which part of it is sectioned.

The second piston 60 is provided on the stem 40 in a state that it can be moved upward and downward a little stroke in which the position where the lower end of the basic cylinder portion 62 is fitted to the internal surface in the rising wall 44 of the flange portion 43 of the stem 40 as shown in FIG. 57 is a lower limit, and the position where the lower end of the inside cylinder portion 102 which constitutes the outside wall of the concave portion 102*d* is fitted air-tightly to the space between the basic cylinder portion. 62 of the second piston 60 and the engaging cylinder 67 to close the air hole 64 is an upper limit.

In the range in which the second piston 60 is moved upward and downward a little stroke, a plurality of vertical grooves 45 are provided on the external surface of the stem 40 of the part in which the basic cylinder portion 62 of the second piston 60 is slid, and the communication between the lower end of the vertical groove 45 and the inside of the large-diameter cylinder portion 22 is shut off by bringing the lower end of the basic cylinder portion 62 into contact with the flange portion 43, when the second piston 60 is descended to the lower limit for the stem 40.

The second air suction valve 90 is fitted to the lower half external surface of the basic cylinder portion 62 of the above-mentioned second piston 60. The second air suction valve 90 is provided with a short cylinder 92 fitted to the lower half external surface of the basic cylinder portion 62 and a thin-wall diaphragm 91 having elasticity which is projected annularly to the diagonal upper outside from the lower end of the short cylinder 92. The end portion of the diaphragm 91 is formed to the thick-wall portion, and the upper surface of the thick-wall portion of the diaphragm 91 is in contact with the lower surface of the middle horizontal plate shape portion in the stepped cylinder portion 63 of the second piston 60 with pressure.

In the second air suction valve 90 structured in the above-mentioned way, the elastic deformation of the diaphragm can be made easily, and the second air suction valve

90 can be opened and closed securely, because the thick-wall portion is provided on the end portion of the diaphragm 91.

The second air suction valve 90 is descended in a state that it is closed to pressurize the inside of the large-diameter cylinder portion 22 when the stem 40 is descended. If the second air suction valve 90 is provided in the position opposite to the drawing (namely, in a state that it is inverted) due to any mistakes, it is impossible to pressurize the inside of the large diameter cylinder portion 22 and the pressurization is irresponsive, and accordingly the trouble which has occurred in the second air suction valve 90 can be discovered without delay, because the diaphragm 91 is in contact with the projecting portion 63 in the stepped cylinder portion 66 of the second piston 60 so that the valve can not be closed by the second air suction valve 90.

The first air suction valve 80 is provided on the cylinder-shaped rib 152 of the attaching trunk 150. The first air suction valve 80 comprises a cylinder portion 83 fitted to the external surface of the cylinder-shaped rib 152 of the attaching trunk 150, a seal cylinder portion 81 which is extended in an inverse skirt shape to the diagonal upper outside from the lower part external surface of the cylinder portion 83 and has an elasticity and a seal cylinder portion 82 which is extended downward from the lower part internal surface of the cylinder portion 83.

A little gap is formed in the space between the cylinder portion 83 and the internal surface of the peripheral wall of the large-diameter cylinder portion 22. The end portion of the seal cylinder portion 81 is in contact with the upper part internal surface of the peripheral wall of the large-diameter cylinder portion 22 with pressure. As shown in FIG. 57, in the seal cylinder portion 82, the internal surface of the seal cylinder portion 82 is brought into contact water-tightly with the external surface of the vertical cylinder portion in the stepped cylinder portion 63 of the second piston 60 when the stem 40 is at the upper limit.

The liquid suction valve 30 is received within the small diameter cylinder portion 24 so as to insert the upper part of the liquid suction valve 30 into the lower part of the stem 40.

The lower end of the liquid suction valve 30 functions as a lower part valve body 31, and the lower part valve body 31 closes a liquid suction valve hole of the small diameter cylinder portion 24, when the liquid suction valve 30 is descended. In the liquid suction valve 30, a plurality of engagement pins 32 are projected in the portion a little upper than the lower part valve body 31, and the engagement pins 32 are fitted to the space among the vertical ribs 26 provided vertically on the lower part internal surface of the small-diameter cylinder portion 24 in a state that they can be moved upward and downward.

The upper end portion of the liquid suction valve 30 functions as an upper-part valve body 35 and is formed such that the diameter is widened in an upward skirt shape. The upper-part valve body 35 is held by the internal surface of the vertical ribs 42 provided vertically on the internal surface of the stem 40 and can be slid to the internal surface of the vertical ribs 42.

Accordingly, when the stem 40 is descended, the stem 40 and the liquid suction valve 30 are descended together in the beginning and the lower part valve body 31 of the liquid suction valve 30 comes into contact with the lower end of the small diameter cylinder portion 24 to close the liquid suction valve hole. After that, the liquid suction valve 30 is stopped and the stem 40 continues to be descended.

On the other hand, when the stem 40 is ascended, the liquid suction valve 30 is also ascended with the stem 40 in the beginning and the engagement pin 32 comes into contact with the lower end of the coil spring 39. After that, the liquid suction valve 30 is stopped and the stem 40 continues to be ascended.

Further, the plurality of vertical ribs 42 are provided in a state that they are dispersed with respect to the circumferential direction and that the just-upper position of the cylinder portion 53 of the first piston 50 is a starting point and the lower position of the liquid discharge valve 70 is an end point. In the state of FIG. 57 that the pump head is in the uppermost position, the upper-part valve body 35 is separated from each of the vertical ribs 42 to be in contact with the valve seat 52 provided on the upper end inside of the cylinder portion 53 of the first piston 50 so as to shut off between the upper and lower parts of the stem 40 fluid-tightly in the part.

A mouthpiece 500 for injection is provided on the end of the nozzle-107 of the pump head. 100.

Figure 58:
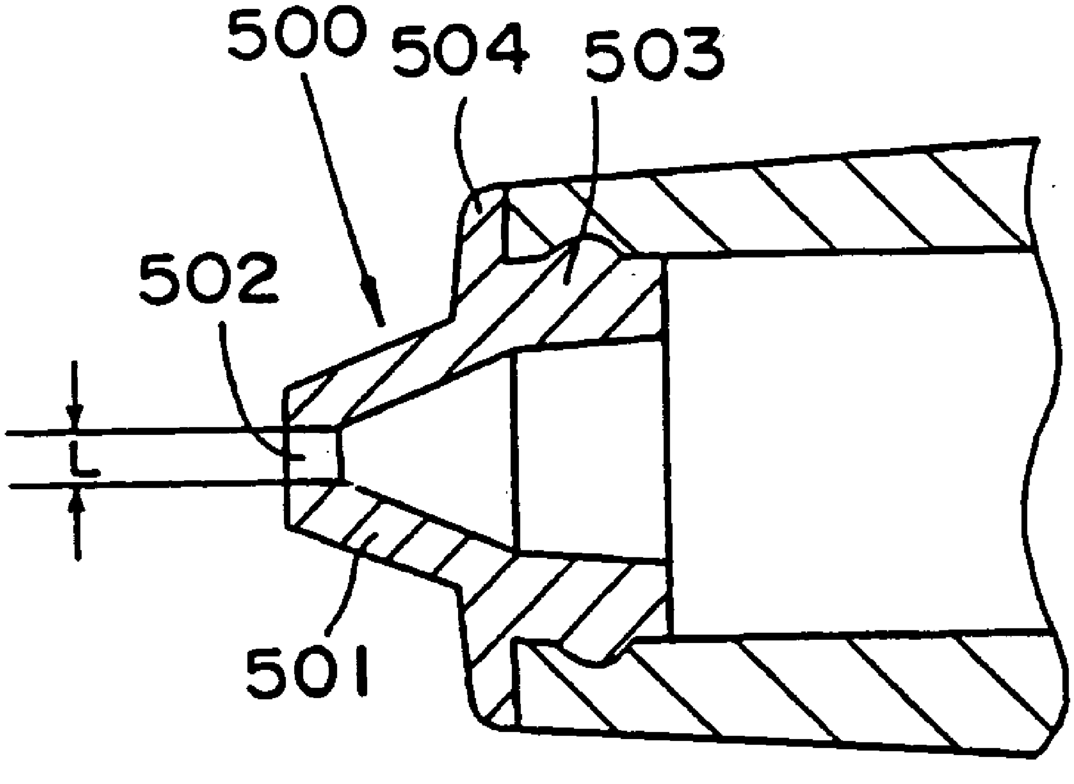
FIG. 58 is an enlarged cross section diagram of a mouth-piece-provided-portion of a container with a pump for discharging bubbles of the embodiment 11.

As shown in FIG. 58, the mouthpiece 500 comprises a fitting cylinder 503 fitted to and fixed on the end inside of the nozzle 107, an annular flange portion 504 which is projected to the outside from the end external surface of the fitting cylinder 503 to be in contact with the front end surface of the nozzle 107, a conical cylinder shaped wall 501 which is extended to the front from the end of the fitting cylinder 503, and a nozzle 502 is opened in the point portion of the conical cylinder shaped wall 501.

In the container with a pump for discharging bubbles, the seal of the lower end of the basic cylinder portion 62 of the second piston 60 is opened by depressing the pump head 100, and the pressurized air within the large-diameter cylinder portion 22 passes through the air passage 102*c* to be introduced into the vapor-liquid mixing chamber 46.

At the same time, the liquid suction valve 30 is descended, the lower end opening of the small-diameter cylinder portion 24 is closed by the lower-part valve body-31 and the liquid within the small diameter cylinder portion 24 pushes up the liquid discharge valve 70 to be introduced into the vapor-liquid mixing chamber 46 so that the liquid and the air are mixed in the vapor-liquid mixing chamber 46.

Then, the liquid is bubbled when the mixture of the air and liquid passes through the net 133 of the bubbling element 132, and the bubbled liquid is accelerated by the mouthpiece provided on the end of the nozzle 107 to be discharged in a linear shape from the nozzle 502.

In the pump for discharging bubbles 10, the bubble whose diameter is suitable for the use can be bubbled easily by changing the number of the bubbling elements 132 to be provided and the direction of the bubbling element 132 and so on, because the net 133 is provided extendedly on the upper end of the short cylinder 135 to form the bubbling element 132, the cylinder hole portion (casing 131) for fitting the bubbling element 132 is formed long in the vertical direction, and the cylinder hole portion is set up in the length into which a plurality of bubbling elements 132 can be fitted in a line so as to fit a single or a plurality of bubbling elements 132 to the cylinder hole portion.

According to an experiment, like the embodiment 11 shown in FIG. 57, the bubbling of the fine and equalized bubbles-could be obtained, when one bubbling element 132 in which a net 133 was provided extendedly on the upper end of the short cylinder 135 was fitted to the upper part, and one similar bubbling element 132 was fitted to the lower part in a state that it was inverted within the casing 131. Although the illustration is omitted, the bubbles of medium diameter could be bubbled, when only one bubbling element 132 in which the net 133 was provided on the lower end of the short cylinder 83 was fitted to the lower part of the casing 131.

Further, the bubbles of large-diameter could be bubbled when only one bubbling element 132 in which the net 133 was provided extendedly on the upper end of the short cylinder 83 was fitted to the upper part of the casing 131.

Besides, the diameter of the bubbles could be changed gradually, when the fitting position of only one fitted bubbling element 132 was moved in order.

In the pump for discharging bubbles 10, the discharged bubbles can be accelerated in the conical cylinder shaped wall 501 to be discharged off at a relatively long distance in a linear shape, because the mouthpiece 500 for injection is provided on the end of the nozzle 107. Accordingly, the diversified use for the container with a pump for discharging bubbles of late years is matched up, and the demand can be met sufficiently.

Besides, the structure of the mouthpiece is very simple, so the productive efficiency of the mouthpiece is excellent and it can be manufactured at a low price. Further, the mouthpiece can be provided and fixed on the conventional pump for discharging bubbles 10 of this kind.

The following experiment was performed in reference to the opening diameter L of the nozzle 502.

The discharging state of the bubbles was measured by using the container with a pump for discharging bubbles of the above-mentioned structure and changing the opening diameter L of the nozzle 502. In the measurement, the discharging state when the bubbles were discharged upon the target body separated at 15 cm from the nozzle 502 was observed visually and the pressure sense at the moment was examined. The result is shown in the following Table 1. Further, the pressure sense of the pump head 100 is referred to as "head pressure" in Table 1.

TABLE 1

| Opening diameter(mm) | Discharging state | Head pressure |
|---|---|---|
| 0.6 | ○ | X |
| 0.7 | ○ | Δ |
| 0.8 | ○ | Δ |
| 1.0 | ○ | ○ |
| 1.2 | ○ | ○ |
| 1.4 | ○ | ○ |
| 1.6 | ○ | ○ |
| 1.8 | ○ | ○ |
| 2.0 | ○ | ○ |
| 2.3 | Δ | ○ |
| 2.5 | Δ | ○ |
| 2.8 | X | ○ |

Further, the codes ○, Δ and X in the item of "discharging state" indicate the following criteria.

○ . . . Discharged in a linear shape smoothly.

Δ . . . Discharged liquid curved and descended in the observed distance.

X . . . Discharge liquid Curved and descended in a shorter distance.

Besides, the codes ○, Δ and X in the item of "head pressure" indicate the following criteria.

○ . . . Can be pressured lightly.

Δ . . . Pressured a little heavily.

X . . . Pressured rather heavily.

Accordingly, it is preferable that the opening diameter of the nozzle 502 is less than 2.0 mm, because the bubbles can be injected linearly at the distance of at least 15 cm when the opening diameter of the nozzle 502 is less than 2.0 mm. On the other hand, it is preferable that the opening of the nozzle 502 is within the range of 1.0 mm–2.0 mm, because the pump head 100 is pressured heavily when the opening is too small.

Embodiment 12

The container with a pump for discharging bubbles of the embodiment 12 will be described in accordance with FIG. 59 and FIG. 60.

The container with a pump for discharging bubbles comprises a container body 1 in which a neck portion 2 is provided on the upper end, a pump for discharging bubbles 10 provided on the neck portion 2 and an attaching trunk 150 for fixing the pump for discharging bubbles 10 on the neck portion 2.

The pump for discharging bubbles 10 comprises a cylinder member 20, a liquid suction valve 30, a stem 40, a first piston 50, a second piston 60, a liquid discharge valve 70, a first air suction valve 80, a second air suction valve-90, a pump head 100 and a bubbling unit 130.

The upper half of the cylinder member 20 is formed to a large-diameter cylinder portion 22 for air and the lower half of the cylinder member 20 is formed to the small-diameter cylinder portion 24 so that the both cylinder portions 22 and 24 are connected with one another by the bottom plate portion 23.

A flange portion 21 which is projected to the outside is formed on the upper end of the large-diameter cylinder portion 22, an annular groove **21*a* is formed on the inside portion of the flange portion 21, and a plurality of air holes 27 are provided on the bottom of the annular groove 21*a*. An annular concave groove 23*a* is provided on the inside portion of the bottom plate portion 23**.

An engaging cylinder 29 in which the projecting portion is provided peripherally on the upper end internal surface is fixed to the lower part internal surface of the small-diameter cylinder portion 24. The lower end of the small-diameter cylinder portion 24 positioned in the lower part of the engaging cylinder 29 is formed to a suction valve seat **24*a* of taper shape whose diameter is reduced as it proceeds downward, a connection cylinder 25 which is made to communicate with a suction hole 24*b* of the valve seat 24*a* is extended downward from the lower end of the small-diameter cylinder portion 24. A suction pipe 201 is fitted into the connection cylinder 25, and the lower end of the suction pipe 201 is extended to the bottom of the container body 1**.

In the attaching trunk 150, a peripheral wall 153 screwed on the external surface of the neck portion 2 is extended downward from the margin of the top wall 154, and a flange portion 21 of the cylinder member 20 is held between the peripheral portion lower surface of the top wall 154 and the upper end surface of the neck portion 2.

A rising cylinder portion 156 is provided from the central part of the top wall 154 in a state that it is stood up. The central portion of the rising cylinder portion is opened, and a central cylinder portion 151 in which an outside air suction groove which is extended to the vertical direction is provided on the internal surface is extended downward from the opening margin of the rising cylinder portion 156.

A cylinder-shaped rib 152 is extended downward from the back of the top wall 154, a short cylinder is extended downward from the peripheral portion of the top wall 154, and the short cylinder is inserted into the annular groove **21*a* of the large-diameter cylinder portion 22** in a state that a gap for sucking the outside air remains.

The pump head 100 is projected from the inside of the cylinder member 20, and stem 40 is connected and fixed on the lower part of the pump head 100.

The stem 40 and the pump head 100 are provided on the cylinder member 20 in a state that they can be moved upward and downward freely and they are energized upward. The second piston 60 fitted into the large diameter cylinder portion 22 and the first piston 50 fitted into the small diameter cylinder portion 24 are provided on the stem 40.

In the first piston 50, the cylinder portion 53 is fitted to the lower end inside of the stem 40 and a seal portion-51 is provided on the stem 40 in a state that it is projected from the lower end of the stem 40. The seal portion 51 is capable of sliding on the internal surface of the small diameter cylinder portion 24 fluid-tightly. The second piston 60 is provided on the stem 40 in a state that it can be moved upward and downward only a little stroke.

A flange portion 43 in which an annular groove is provided on the inside portion is provided on the central portion of the stem 40 in a state that it is projected to the outside, and a metallic coil spring 39*a* for energizing the stem 40 and the pump head 100 upward is made to lie in the space between the annular groove of the flange portion 43 and the concave groove 23*a* of the large-diameter cylinder 22.

A cylinder-shaped valve seat which is stood up through the inward flange is provided on the upper part internal surface of the stem 40, and a spherical liquid discharge valve 70 which can be brought into contact with and separated from the cylinder-shaped valve seat is received in the upper part inside of the stem 40. The liquid discharge valve 70 is made up of the materials other than metals such as synthetic resin and ceramics.

In the pump head 100, an outside cylinder portion 101 and an inside cylinder portion 102 are extended downward in the inside and outside dual cylinder shape from the peripheral portion of the top board portion 103, a nozzle 107 in which the basic end is opened to the upper end internal surface of the inside cylinder portion 102 is extended horizontally, and the end of the nozzle 107 is made to pass through the outside cylinder portion 101 to be projected to the outside.

The lower part of the pump head 100 is inserted into the central cylinder portion 151 of the attaching trunk 150 in a state that it can be slid. The lower part of the inside cylinder portion 102 is formed to the large-inside-diameter portion, and the upper part of the stem 40 is fitted to the inside lower half of the large-inside-diameter portion.

In the internal surface of the large-inside-diameter portion, a plurality of vertical grooves 102*a* are formed on the part to which the stem 40 is fitted. The upper end of the vertical groove 102*a* is positioned in a portion upper than the upper end surface of the stem 40. Further, although the pump head 100 is dual-cylinder-structured in the embodiment 12, a single cylinder structured pump head 100 can be substituted for it.

The second piston 60 comprises a basic cylinder portion 62 fitted to the upper part external surface of the stem 40 in a state that it can be slid, a seal cylinder portion 61 fitted to the internal surface of the large-diameter cylinder portion 22 in a state that it can be slid, and a stepped cylinder portion 63 for connecting the basic cylinder portion 62 to the seal cylinder portion 61. The stepped cylinder portion 63 is formed in a step shape in which the side of the basic cylinder 62 is high and the side of the seal cylinder portion 61 is low. The upper end portion of the basic cylinder portion 62 functions as a thin-wall elastic portion and is brought into contact air-tightly with the lower part internal surface of the inside cylinder portion 102 with pressure.

A stood-up engaging cylinder 67 is provided from the upper horizontal plate shape portion in the stepped cylinder portion 63 in a state that a little gap is opened in the space between the basic cylinder portion 62 and the engaging cylinder 67, and a plurality of air holes 64 are provided on the horizontal plate shape portion positioned in the gap.

Figure 59:
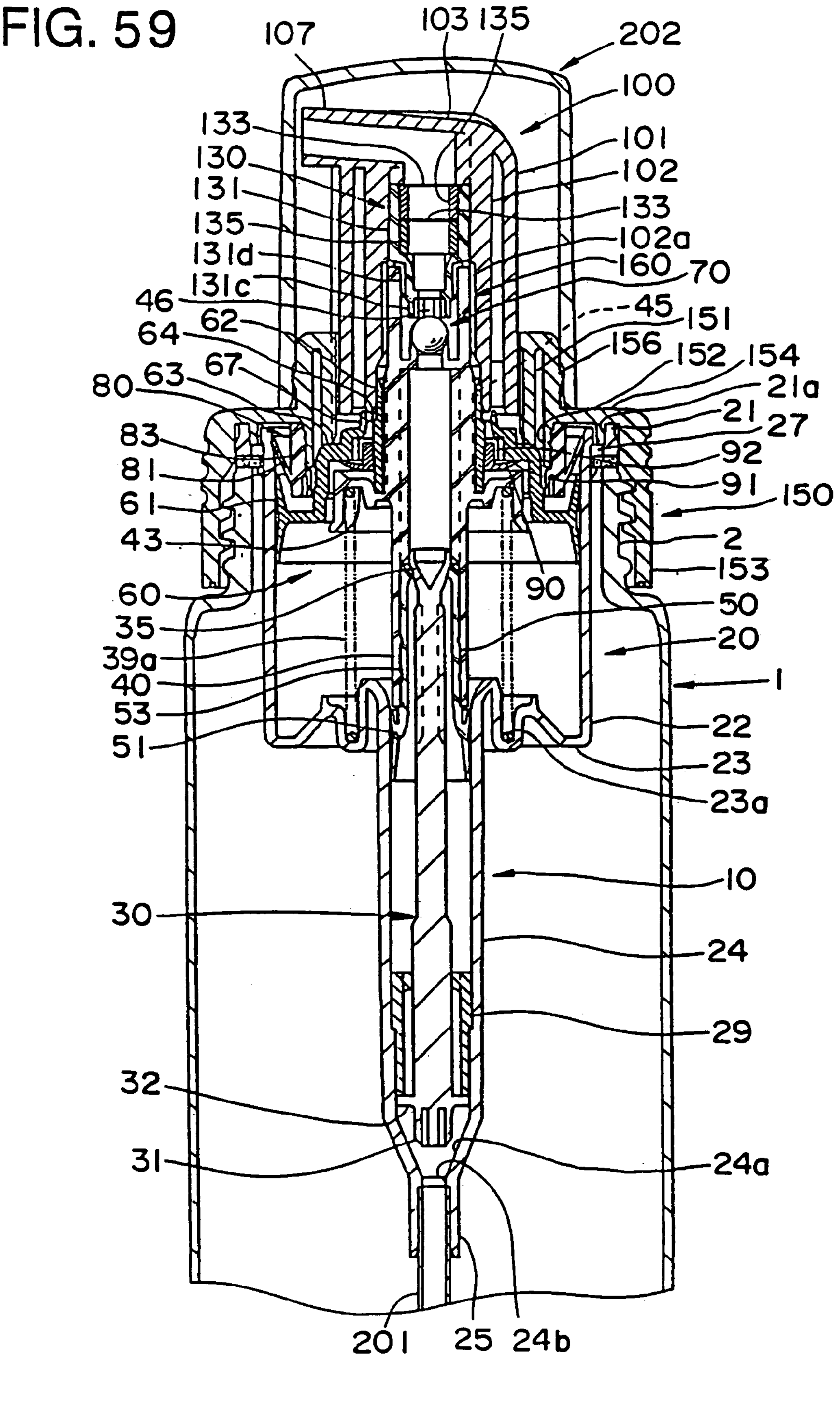
FIG. 59 is a longitudinal section diagram of a container with a pump for discharging bubbles of the embodiment 12.
Figure 60:
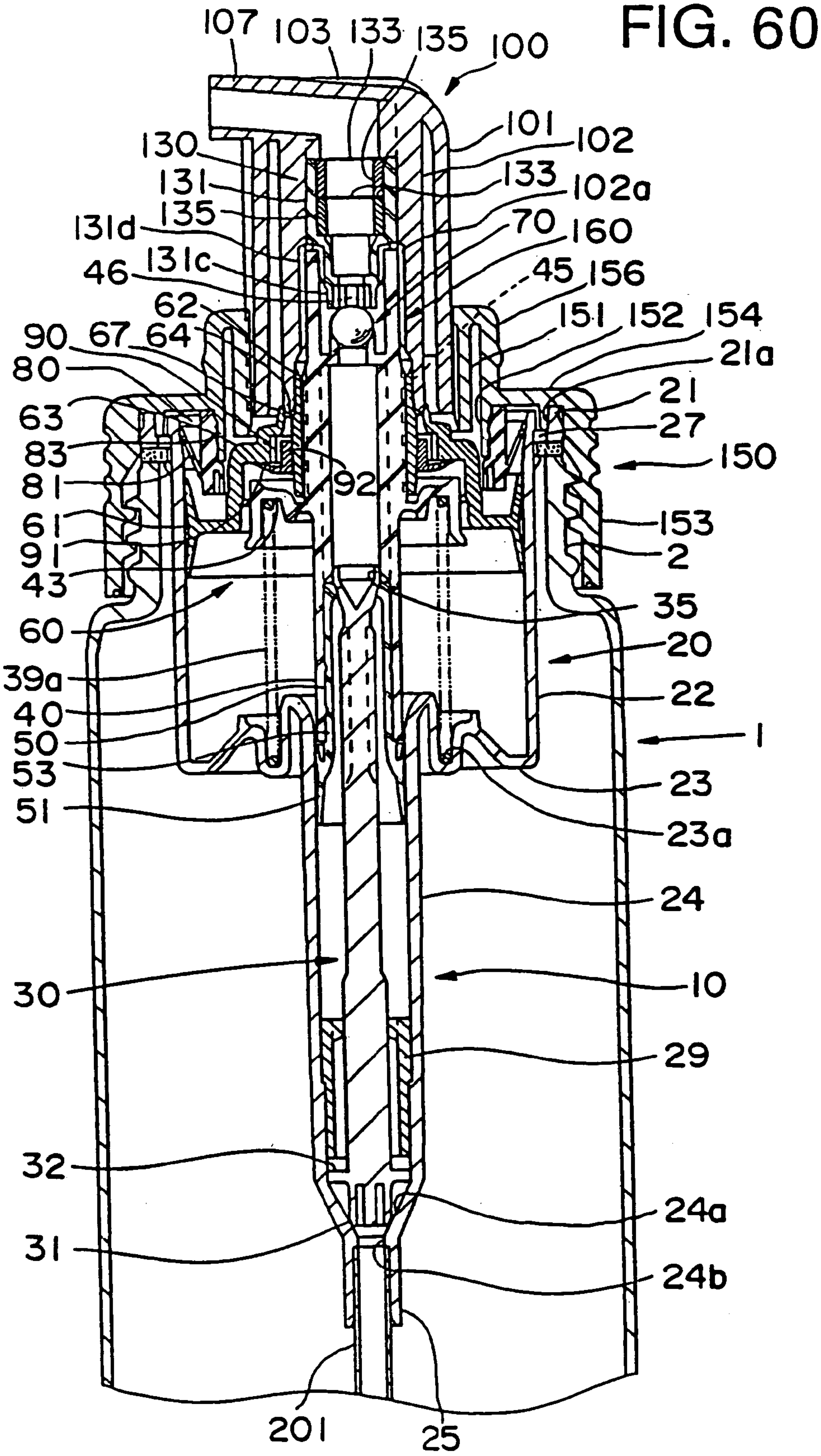
FIG. 60 is a longitudinal section diagram indicating a state that a pump head is being depressed in a container with a pump for discharging bubbles of the embodiment 12.

The second piston 60 is provided on the stem 40 in a state that it can be moved upward and downward only a little stroke in which the position where the lower end of the basic cylinder portion 62 is fitted to the annular groove of the upper surface of the flange portion 43 of the stem 40 as shown in FIG. 59 is a lower limit, and the position where the lower end of the inside cylinder portion 102 is fitted air-tightly to the space between the basic cylinder portion 62 of the second piston 60 and the engaging cylinder 67 to close the air hole 64 like FIG. 60 is an upper limit.

In the range in which the second piston 60 can be moved upward and downward only a little stroke, a plurality of vertical grooves-45 are provided on the external surface of the stem 40 of the part in which the basic cylinder portion 62 of the second piston 60 is slid, and as shown in FIG. 59, when the second piston 60 is descended to the lower limit for the stem, the communication between the lower end of the vertical groove 45 and the inside of the large diameter cylinder portion 22 is shut off by bringing the lower end of the basic cylinder portion 62 in contact with the flange portion 43 air-tightly.

The bubbling unit 130 has a casing 131 in which the upper part is fitted to the inside upper part of the inside cylinder portion 102 and the lower part is formed to a small-diameter portion and is fitted to the upper part inside of the stem, and the short cylinders 135 and 135 in which a net 133 is provided extendedly on the upper end are fitted to the inside of the casing 131 in a state that they are in piles upward and downward.

A groove 131*d* is provided on the external surface of the small diameter portion of the casing 131, and an air passage 160 for making the inside of the large-diameter cylinder portion 22 of the lower part of the second-piston 60 and a vapor-liquid mixing chamber 46 mentioned later communicate with one another is made up of the groove 131*d*, vertical groove 102*a* and a vertical groove 45.

The small-diameter portion of the casing 131 inserted into the upper end portion of the stem 40 has an inward flange on the lower end and a blocking piece 131*c* is extended downward from the inward flange. The blocking piece 131*c* prevents the liquid discharge valve 70 from closing the hole of the inward flange, when the liquid discharge valve 70 is pushed up by the liquid flowing into the casing 131 from the inside of the stem 40.

The space between the inward flange and the liquid discharge valve 70 functions as a vapor-liquid mixing chamber 46, and the liquid which has passed through the liquid discharge valve 70 and the high-pressure air which has passed through the air passage to be flown thereto are mixed in the vapor-liquid mixing chamber 46.

Further, the casing 131 is not always required and the bubbling element 132 can be fitted to the upper part inside of the inside cylinder portion 102 directly.

The second air suction valve 90 is fitted to the lower half external surface of the basic cylinder portion 62 of the second piston 60. The second air suction valve 90 is provided with a short cylinder 92 fitted to the lower half external surface of the basic cylinder portion 62 and a thin-wall diaphragm 91 having an elasticity which is projected in an annular shape to the diagonal upper outside from the lower end of the short cylinder 92. The end portion of the diaphragm 91 is in contact with the lower surface of the middle horizontal plate shape portion in the stepped cylinder portion 63 of the second piston 60 with pressure.

The first air suction valve 80 is provided on the cylinder-shaped rib 152 of the attaching trunk 150. The first air suction valve 80 comprises a cylinder portion 83 fitted to the external surface of the cylinder-shaped rib 152 of the attaching trunk 150 and a seal cylinder portion 81 which is extended in a reverse-skirt shape to the diagonal upper outside from the lower part external surface of the cylinder portion 83 and has an elasticity. The end portion of the seal cylinder portion 81 is in contact with the upper part internal surface of the peripheral wall of the large-diameter cylinder portion 22 with pressure.

When the inside of the container body 1 is pressurized negatively by decreasing the liquid, the elastic deformation of the seal cylinder portion 81 of the first air suction valve 80 to the inside occurs so that the seal cylinder portion 81 approaches the cylinder portion 83. As a result, the outside air flown into the attaching trunk 150 from the space between the central cylinder portion 151 of the attaching trunk 150 and the pump head 100 passes through the space between the upper end surface of the large-diameter cylinder portion 22 and the lower surface of the top wall 154 of the attaching trunk 150, and through the annular groove 21*a* and the air hole 27 to flow into the container body 1 so as to dissolve the negative-pressure state.

The liquid suction valve 30 is received within the small-diameter cylinder portion 24. The liquid suction valve 30 is suspended in a state that the upper part of the liquid suction valve 30 is inserted into the stem 40, and a plurality of engagement pins 32 which are projected from the lower part external surface are positioned in a portion lower than the engaging cylinder 29 fixed on the lower part inside of the small diameter cylinder portion 24 so that they can be held engagedly on the lower end of the suspending cylinder 29.

The lower end of the liquid suction valve 30 functions as a lower part valve body 31, and the lower-part valve body 31 is in contact with the valve seat 24*a* provided on the bottom of the small-diameter cylinder portion 24 to close the suction hole 24*b* when the liquid suction valve 30 is descended.

The upper end portion of the liquid suction valve 30 functions as an upper-part valve body 35, and the upper-part valve body 35 is held by the upper part internal surface of the cylinder portion 53 and can be slid to the internal surface of the stem 40.

Accordingly, when the stem 40 is descended, the stem 40 and the liquid suction valve 30 are descended together in the beginning and the lower part valve body 31 closes the suction hole 24*b* of the small diameter cylinder portion 24. After that, the liquid suction valve 30 is stopped and the stem 40 continues to be descended.

On the other hand, when the stem 40 is ascended, the liquid suction valve 30 is also ascended with the stem 40 in the beginning and the engagement pin 32 comes into contact with the lower end of the engaging cylinder 29 to be engaged. After that, the liquid suction valve 30 is stopped and the stem continues to be ascended.

A cover 202 is fitted to the peripheral surface of the rising cylinder portion 156 of the attaching trunk 150 in a state that it can be removed.

Further, each of the members to which the materials are not restricted is formed by synthetic resin materials according to circumstances.

In the container with a pump for discharging bubbles, the large and small gaps are formed on the space between the valve seat 24*a* of the small diameter cylinder portion 24 and the lower part valve body 31 of the liquid suction valve 30 and the space between the upper surface of the internal surface of the stepped cylinder portion 63 of the second piston 60 and the lower end surface of the outside cylinder portion 101 of the pump head 100 respectively in the state shown in FIG. 59.

Hereupon, the size of the gap in the space between the upper surface of the internal surface of the stepped cylinder portion 63 and the lower end surface of the outside cylinder portion 101 is smaller than the gap in the space between the valve seat 24*a* and the lower part valve body 31. The liquid flows into the vapor-liquid mixing chamber 46 after the pressurized air flows into the vapor-liquid mixing chamber 46 in the beginning, because the size of the gaps is set up in the above-mentioned large and small relation.

To be more specific, when the pump head is depressed in the state shown in FIG. 59, the pump head 100 and the stem 40 and the liquid suction valve 30 are descended against the second piston 60 and the cylinder member 20, and the lower end of the basic cylinder portion 62 of the second piston 60 is separated from the upper surface of the flange portion 43 of the stem 40 to open the air passage 160 extending to the vapor-liquid mixing chamber 46 from the large diameter cylinder portion 22.

Then, the lower end of the outside-cylinder portion 101 comes into contact with the upper surface of the stepped cylinder portion 63 of the second piston 60, and the second piston 60 is descended with the stem 40 to the cylinder member 20, and accordingly the air within the large-diameter cylinder portion 22 is pressurized, the high pressure air passes through the air passage 160 and starts flowing into the vapor-liquid mixing chamber 46.

After that, the lower part valve body 31 of the liquid suction valve 30 comes into contact with the valve seat 24*a* of the small-diameter cylinder portion 24 to close the suction hole 24*b*. Then, the stem 40 in which the first piston 50 is provided on the lower end is descended to the liquid suction valve 30, and accordingly the liquid within the small-diameter cylinder portion 24 and the stem 40 is pressurized to open the liquid discharge valve 70 and the liquid starts flowing into the vapor-liquid mixing chamber.

Accordingly, the liquid flows into the vapor-liquid mixing chamber 46 after the pressurized air flows into the vapor-liquid mixing chamber 46 in the beginning.

As a result, the mixing ratio of the air volume and liquid volume can be kept proper even in the early stage of depressing the pump head 100, and the bubbling is never incomplete due to the lack of the air volume for the liquid volume as in the prior art.

After that, the liquid which has been mixed with the air in the vapor-liquid mixing chamber 46 is bubbled when it passes through the net 133 of the bubbling unit 130 to be discharged in a foamy state from the nozzle 107.

Besides, the coil spring 39*a* never touches the liquid to become rusted, because the coil spring 39*a* which energizes the stem 40 upward is received within the large-diameter cylinder portion 22 which functions as a cylinder for air. Accordingly, the received liquid is never discolored nor degenerated by the rust adhered to the external surface of the coil spring as in the prior art.

Embodiment 13

The container with a pump for discharging bubbles of the embodiment 13 will be described in accordance with FIG. 61 and FIG. 62.

The container with a pump for discharging bubbles comprises a container body 1 in which a neck portion 2 is provided on the upper end, a pump for discharging bubbles 10 provided on the neck portion 2 and an attaching trunk 150 for fixing the pump for discharging bubbles 10 on the neck portion 2.

The pump for discharging bubbles 10 comprises a cylinder member 20, a liquid suction valve 30, a stem 40, a first piston 50, a second piston 60, a liquid discharge valve 70, a first air suction valve 80, a second air suction valve 90, a pump head 100 and a bubbling element 132.

In the cylinder member 20, a flange portion 21 provided on the upper-part external surface is engaged to the upper end portion of the neck portion 2 of the container body 1 to be hung down into the container body 1, and the upper part of the cylinder member 20 functions as a large-diameter cylinder portion 22 and the lower half which is hung down through a bottom plate portion 23 from the lower end of the large-diameter cylinder portion 22 functions as a small cylinder portion 24.

The large-diameter cylinder portion 22 is stood up to the upper part of the flange portion 21, and an air hole 27 to the container body 1 is provided on the basic end portion of the flange portion 21.

A taper cylinder shaped valve seat 24*a* is provided on the lower end internal surface of the small diameter cylinder portion 24 through an upward stepped portion 24*c* to hang down a connection cylinder 25 while making it communicate with a valve hole of the valve seat 24*a*, the upper end portion of suction pipe 201 is fitted into the connection cylinder 25 to hang down the suction pipe 201 to the inside bottom of the container 1, and a plurality of vertical ribs 26 are stood up at regular intervals from the upward stepped portion 24*c*.

The cylinder member 20 is attached at flange portion 21 by the attaching trunk 150 screwed on the neck portion 2 of the container body 1. In the attaching trunk 150, the flange portion 21 is held between the top wall 154 of the upper end of the peripheral wall 153 screwed on the external surface of the neck portion 2 and the upper end surface of the neck portion 2, and the top wall 156*a* is provided in the inside projectingly from the rising cylinder portion 156 stood up from the top wall 154 and a central cylinder portion 151 is hung down from the internal of the top wall 156*a*. A concave groove 157 can be provided vertically on the internal surface of the central cylinder portion 151. The first air suction valve 80 is fitted to the internal surface of the central cylinder portion 151.

In the first air suction valve 80, an elastic plate which is opened to upper outside is projected from the lower end of a fitting cylinder to the central cylinder portion 151, the elastic plate upper end external surface is in contact with the upper end cylinder part internal surface of the cylinder member 20 with pressure and when the inside of the container body 1 is pressurized negatively due to the decrease in the liquid, the elastic plate upper end portion is widened and the air passes through the space between the upper end surface of the upper end cylinder part of the cylinder member 20 and the top wall 156*a*, the space between the upper-end cylinder part of the cylinder member 20 and the rising cylinder portion 156 and the air hole 27 to get into the container body 1 so as to dissolve the negative pressurization state.

The stem 40 is projected from the small diameter cylinder portion 24 in a state that it is energized upward by the coil spring 39 whose lower end is mounted on the plurality of vertical ribs 26 and is received within the small diameter cylinder portion 24. The first piston 50 is fitted to the lower end of the stem 40, and the internal surface of the fitting cylinder 108 hung down from the pump head 100 with a nozzle 107 is fitted to the upper end of the stem 40.

The liquid discharge valve 70 is provided on the upper part internal surface of the stem 40, and a bubbling element 132 in which both upper and lower ends of a short cylinder 135 are closed with a net 133 is fitted to the upper part internal surface of the fitting cylinder 108 of the upper part of the liquid discharge valve 70.

A fitting plate 71 is formed such that it is attached fittingly to the upper end part internal surface of the stem 40 so that an elastic piece 72 will brings a valve body 73 into contact with a valve seat 41 with pressure by the valve seat 41 of taper shape of lower part small diameter provided on the upper part internal surface of the stem 40 and the liquid discharge valve 70 in which the valve body 73 of lower part small diameter is provided on the lower end of the plurality of elastic pieces 72 hung down from the lower surface of the fitting plate 71 provided with a hole. A plurality of vertical ribs 42 are provided vertically on the internal surface of the stem 40 in the lower part of the valve seat 41.

The fitting cylinder 108 hung down from the pump head 100 is formed in a dual cylinder shape so as to prevent the fitting cylinder 108 from becoming wall-thicken. The lower end portion of the fitting cylinder 108 to which the upper part of the stem 40 is fitted functions as a large inside diameter portion 108. Besides, a vertical groove 108*a* is provided on the internal surface of the fitted cylinder 108 in the space between the upper end of the large inside diameter portion 108*g* and the fitting part of the short cylinder 135, and the external surface of the short cylinder 135 is provided with the vertical groove 135 which makes a vapor-liquid mixing chamber 46 formed on the space between the fitting plate 71 of valve member 41 and the short cylinder 135 and the vertical groove 108*a* communicate with one another so that both upper ends of vertical grooves 108*a* and 135*a* are connected with one another to function as a part of an air passage 160 mentioned later.

A flange portion 43 which projects a cylinder portion to the diagonal upper outside from the outside end of a plate portion which is projected to the outside is provided on the middle portion external surface of the stem 40 so that the flange portion 43 can be engaged to the second piston 60 fitted into the large-diameter cylinder portion 22.

The second piston 60 is formed such that a stepped cylinder portion 63 which is projected from a basic cylinder portion 62 fitted to the external surface of the stem 40 in the upper part of the flange portion 43 is connected to the seal cylinder portion 61 fitted to the large diameter cylinder portion 22, and a passage is provided on the space between the external surface of the stem 40 to which the basic cylinder portion 62 is fitted and the basic cylinder portion 62 by installing a groove 62*a* on the internal surface vertically and so on, and the upper end of the basic cylinder portion 62 is enlarged to the upper outside to fit the upper end periphery to the internal wall surface of the large-inside-diameter portion 108*g* air-tightly.

An air hole 64 is provided on the stepped cylinder portion 63, and an elastic cylinder is fitted air-tightly to the external surface of the basic cylinder portion 62 in the lower part of the stepped cylinder portion 63 to close the air hole 64 an elastic thin-plate 93 which is projected to the outside from the elastic cylinder, and the second air suction valve 90 to the inside of the large-diameter cylinder portion 22 is formed by the air hole 64 and the elastic thin plate 93.

However, the second air suction valve 90 may be needless, if the above-mentioned air hole 64 is provided so as to close the lower end surface of the fitting cylinder 108 when the pump head 100 is depressed.

The second piston 60 can be moved-upward and downward only a little stroke to the stem 40, and when the stem 40 is descended to the second piston 60 by depressing the pump head 100, the flange portion 43 is separated from the lower end of the basic cylinder portion 62 to open the air passage-160 which is formed by the groove 62*a*, vertical groove 108*a* and the like are formed so as to make the inside of the large-diameter cylinder portion 22 and the vapor-liquid mixing chamber 46 communicate with one another. The lower end surface of the fitting cylinder 108 comes into contact with the upper surface of the stepped cylinder portion 63 to push down the second piston 60.

After the stem 40 is descended, when the pump head 100 is released, the flange 43 comes into contact with the lower end surface of the basic cylinder portion 62 to close the air passage, and the second piston 60 and the stem 40 are pushed up together so that the outside air passes through the space between the central cylinder portion 151 and the fitting cylinder 108 and the air hole 64 to get into the large diameter cylinder portion 22.

A liquid suction valve 30 whose lower end functions as a lower-part valve body 31 is projected from the inside of the bottom of the small cylinder portion 24 in a state that the upper part is fitted into the stem 40 so as to be moved upward and downward a little stroke freely by the frictional engagement with the stem 40.

Figure 62:
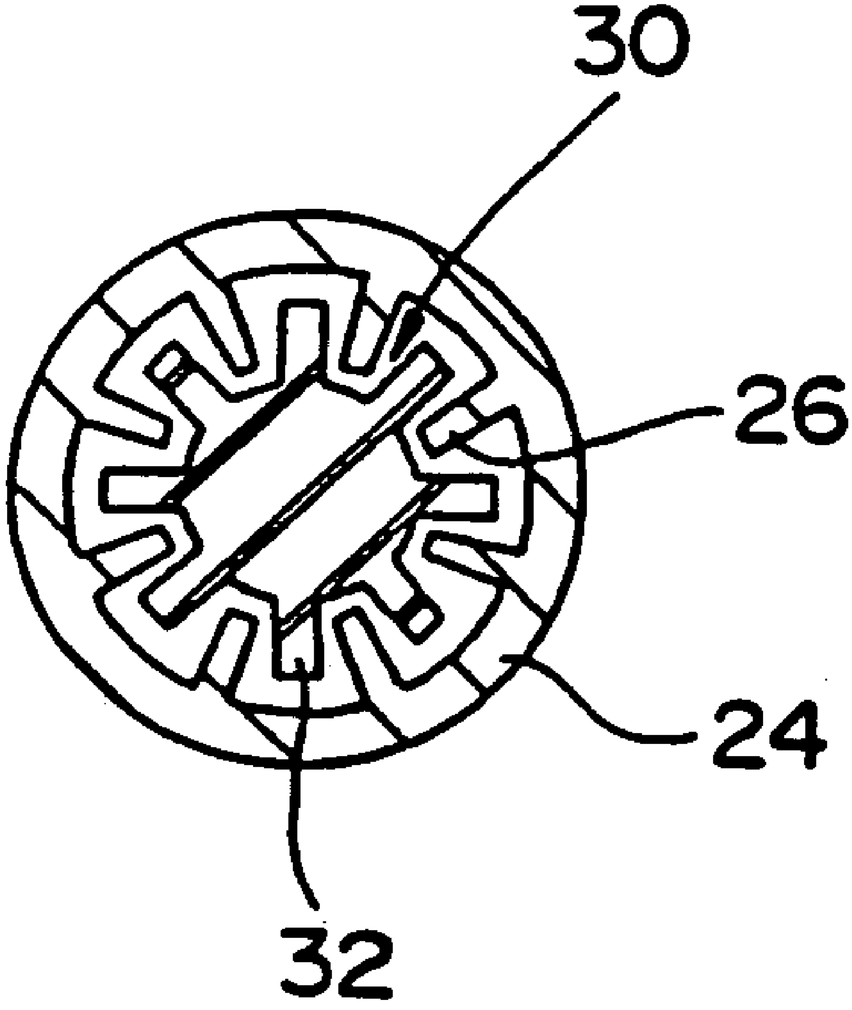
FIG. 62 is a III—III section view diagram of FIG. 61.

In the liquid suction valve 30, a plurality of engagement pins 32 are projected radially from the lower part external surface, and as shown in FIG. 62, the engagement pins 32 are fitted to the vertical ribs 26 in the bottom of the small-diameter cylinder portion 24 in a state that they can be moved upward and downward so that the upper limit of the liquid suction valve 30 is determined by enlarging the liquid suction valve 30 to the lower end of the coil spring 39 mounted on the upper end of the vertical rib 26, and the lower limit is determined by bringing the lower part valve body 31 into contact with the valve seat 24*a* to close the valve when the stem 40 is descended.

A vertical groove 33*a* is provided on the liquid suction valve 30 and an upper-part valve body 35 which is extended to the diagonal upper outside is provided on the upper end portion of the liquid suction valve 30 so as to engage the upper end external surface of the upper-part valve body 35 to the internal surface of the stem 40 by frictional force.

Further, although the cylinder portion 53 stood up from the seal portion 51 is fitted into the lower part of the stem 40 in the embodiment 13, the stem 40 and the first piston 50 may be formed in a body.

Figure 61:
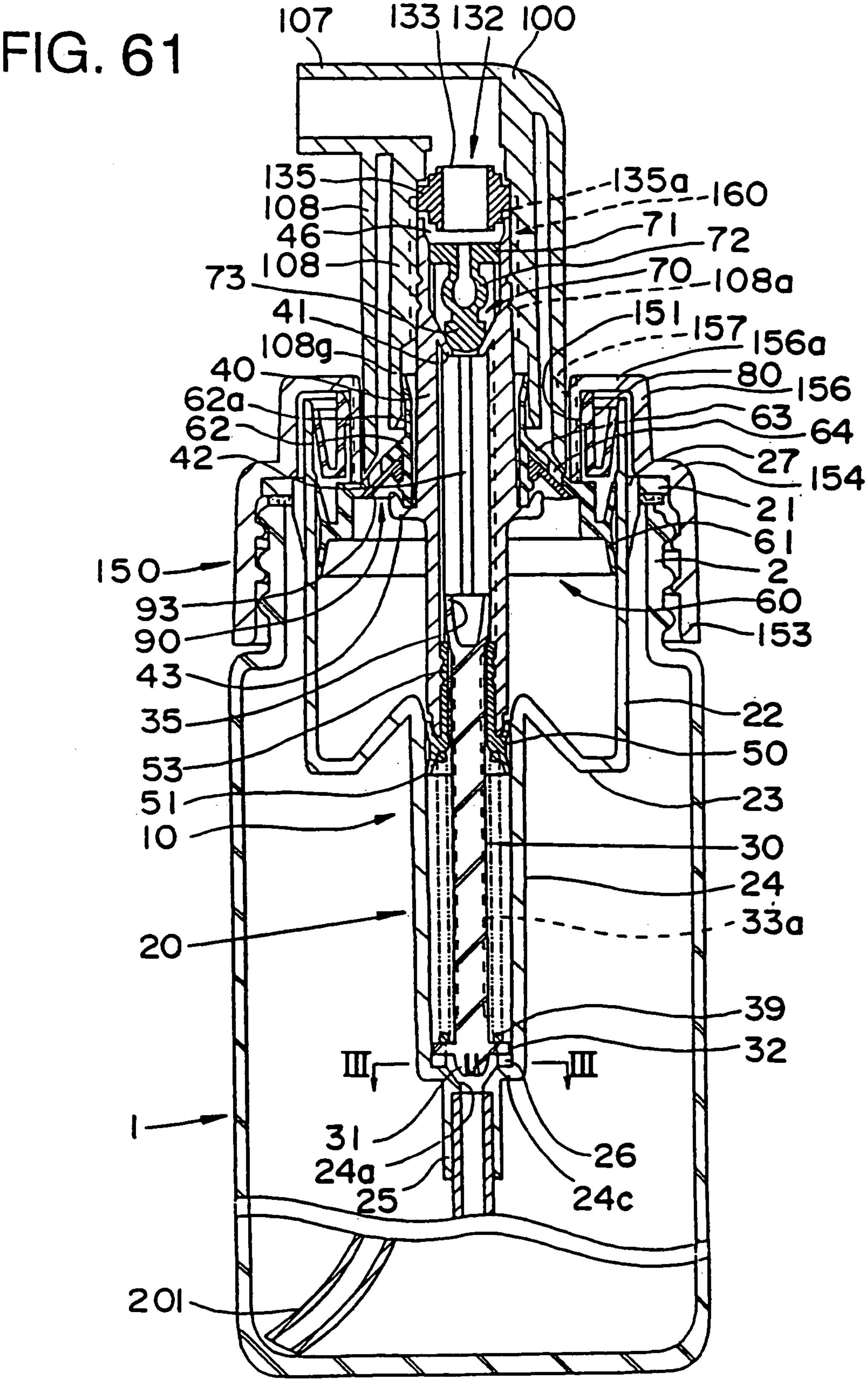
FIG. 61 is a longitudinal section diagram of a container with a pump for discharging bubbles of the embodiment 13.

In the state shown in FIG. 61, the large and small gaps are formed on the space between the valve seat 24*a* formed on the bottom internal surface of the small diameter cylinder portion 24 and the lower part valve body 31 of the lower end of the liquid suction valve 30 which is stood up from the inside of the bottom and whose upper part is fitted into the stem 40, and the space between the stepped cylinder portion 63 of the second piston 60 fitted into the large-diameter cylinder portion 22 and the lower end of the fitting cylinder 108 hung down from the pump head 100 respectively.

If the pump head 100 is depressed in the state, the pump head 100, the stem 40 and the liquid suction valve 20 are descended to the second piston 60 and the cylinder member 20, and the second piston 60 is also descended to the cylinder member 20 by contacting the lower end of the fitting cylinder 108 with the stepped cylinder 63, and then the lower part valve body 31 is descended to the valve seat 24*a* to close the valve.

The air passage 160 is opened by descending the pump head 100 and the like and the air within the large-diameter cylinder portion 22 is pressurized by descending the second piston 60 to get into the vapor-liquid mixing chamber 46. After that, the liquid within the small diameter cylinder portion-24 and the stem 40 are pressurized to open the liquid discharge valve 70, the liquid gets into the mixed air to be mixed with the air and the liquid passes through the bubbling element 132 to be discharged in a foamy state from the nozzle 107, when the valve which is formed by the valve seat 24*a* and the lower part valve body 31 is closed and the first piston 50 and the stem 40 are descended to the liquid suction valve 30.

If the pump head 100 is released after being depressed, the liquid suction valve 30 and the stem 40 are ascended to the cylinder member 20 and the second piston 60, the flange portion 43 of the stem 40 comes into contact with the lower end surface of the basic cylinder portion 62 to push up the second piston 60, and the liquid suction valve 30 is stopped to the cylinder member 20 and the stem 40 is moved to the upper limit by bringing the engagement pin 32 which is projected radially from the lower part external surface of the liquid suction valve 30 into contact with the lower end surface of the coil spring 39.

The mixing ratio of the air volume and liquid volume can be kept proper even in the beginning of depressing the pump head 100, and the bubbling is never incomplete due to the lack of the air volume for the liquid volume as in the prior art, because, first of all, when the pump head is depressed, the valve seat 24*a* of the small diameter cylinder portion 24 is closed by the lower part valve body 31 of the liquid suction valve 30 after the air passage 160 for making the large diameter cylinder portion 22 communicate with the vapor-liquid mixing chamber 46 is opened and the pressurized air starts flowing into the vapor-liquid mixing chamber 46, and accordingly the inside of the small diameter cylinder portion 24 between the liquid suction valve 30 and the liquid discharge valve 70 and the inside of the stem 40 are pressurized to open the liquid discharge valve 70 and the liquid gets into the vapor-liquid mixing chamber 46 after the pressurized air starts flowing into the vapor-liquid mixing chamber 46 in the above-mentioned way. This is due to the fact that the gap between the stepped cylinder portion 63 of the second piston 60 and the fitting cylinder 108 hung down from the pump head 100 is smaller than the gap between the valve seat 24*a* of the small-diameter cylinder portion 24 and the lower part valve body 31 of the liquid suction valve 30.

The air within the large-diameter cylinder portion 22 does not leak through the air hole 64, and accordingly the air within the large-diameter cylinder portion 22 can be delivered securely to the vapor-liquid mixing chamber 46 through the air passage 160 when the pump head 100 is depressed, because the elastic cylinder of the first air suction valve 80 is fitted air-tightly to part of the external surface of the basic cylinder portion 62 in the lower part of the stepped cylinder portion 63 of the second piston 60, and the air hole 64 provided on the stepped cylinder portion 63 is closed by the elastic thin plate 93 which is projected to the outside from the elastic cylinder to function as the second air suction valve 90 to the inside of the large-diameter cylinder portion 22.

The inside of the stem 40 in the lower part of the liquid discharge valve 70, the inside of the small diameter cylinder portion 24 and the like are filled with the liquid all the time, because the liquid discharge valve 70 is closed elastically by energization, and accordingly the liquid within the stem 40 and the like flow into the vapor-liquid mixing chamber 46 simultaneously with the release of the liquid discharge valve 70 by the depressing of the pump head 100. As a result, the bubbles in which the air and liquid are mixed at the proper ratio can be discharged simultaneously with the depressing of the pump head 100.

Modified Example of the Embodiment 13

Figure 63:
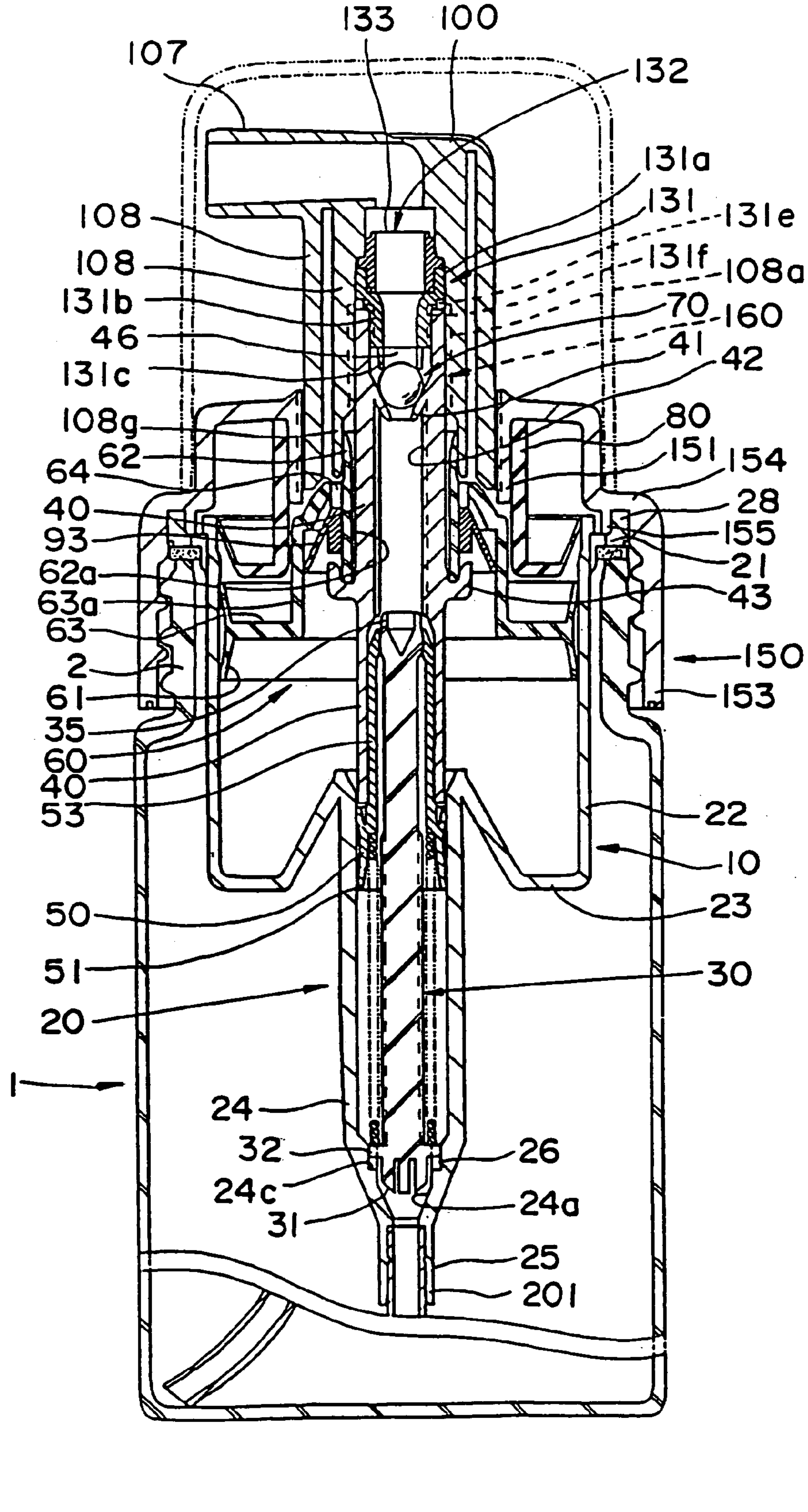
FIG. 63 is a longitudinal section diagram of a modified embodiment of a container with a pump for discharging bubbles of the embodiment 13.

Then, the modified example of the embodiment 13 will be described in accordance with FIG. 63.

Although the modified example is almost the same as those shown in FIG. 61 and FIG. 62, the constructions of the modified example are partially different from those shown in FIG. 61 and FIG. 62. So only the important parts which are different from those shown in FIG. 61 and FIG. 62 will be described. In the cylinder member 20, the fitting cylinder portion 28 is stood up from the periphery of the flange portion 21, the fitting cylinder portion 28 is fitted fixedly to the space between the upper part internal surface of the peripheral wall 153 of the attaching trunk 150 and the engagement cylinder 155 hung down from the top wall 154 so that the whole pump for discharging bubbles 10 is formed in a state that it can be removed in a body by removing the attaching trunk 150 from the neck portion 2 of the container body 1.

The upper end portion of the large diameter cylinder portion 22 is projected a little to the upper part of the flange portion 21. Accordingly, the fitting cylinder of the first air suction valve 80 is extended to the lower part of the central cylinder portion 151, the elastic plate is projected to the upper outside through the flange from the lower end of the fitting cylinder, and the upper end of the elastic plate is in contact with the upper end portion of the internal surface of the large-diameter cylinder portion 22 with pressure.

The upper end of the cylinder portion 53 stood up from the seal portion 51 of the firs piston 50 to be fitted into the lower part of the stem 40 is curved to the upper inside, and the upper end surface of the cylinder portion 53 is brought into contact water-tightly with the middle portion external surface of the upper part valve body 35 with pressure in a state that the elastic deformation can occur. The upper-part valve body 35 is provided such that the middle portion within the stem 40 is closed when the stem is ascended so that there is no trouble even if the liquid discharge valve 70 is opened when the container falls down and so on.

The liquid discharge valve 70 is formed in a ball valve, and the casing 131 is fitted to the space between the bubbling element 132 in the upper part of the liquid discharge valve 70 and the liquid discharge valve 70. The upper part of the casing 131 functions as a large diameter portion 131*a*, the lower half of the bubbling element 132 and fitted into the large-diameter portion 131*a*, the lower part of the casing 131 is formed to a small-diameter portion 131 and fitted into the upper end portion of the stem 40 and a plurality of blocking pieces 131*a* are hung down from the lower end surface of the small diameter portion 131*b* so that the liquid discharge valve 70 does not close the lower end opening of the casing 131 by the pushing up of the liquid passing through the discharge valve hole.

The air passage 160 is formed by the vertical groove 108*a* of the internal surface of the fitting cylinder 108 to which the upper part of the stem 40 is fitted, a horizontal groove 131*e* provided on the lower end surface of the large diameter portion 131*a* and a groove 131*f* provided vertically on the external surface of the small diameter-portion 131*b*.

The air hole 64 of the second piston 60 is provided on the end portion of the basic cylinder portion 62 of the stepped cylinder portion 63, and the elastic thin plate 93 which functions as a valve body for opening and closing the air hole 64 is in contact with to the middle portion internal surface of the cylinder portion 63*a* whose outside end portion is provided on the middle portion of the stepped cylinder portion 63 with pressure.

THE INDUSTRIAL APPLICATIONS

As mentioned hereinbefore, the container with a pump for discharging bubbles of the present invention have many advantages as follows. It is capable of performing the operation of discharging bubbles securely, it is capable of forming the bubbles securely, it is capable of discharging the bubbles from the nozzle securely, further, it is capable of changing the discharging form of the bubbles and it is capable of setting up the diameter of the bubble at a user's request. Accordingly, the container with a pump for discharging bubbles of the present invention is useful as a container for receiving the solutions which are used in a foamy state such as daily necessaries like the cleansing foam and shaving foam and the washing foam used for washing the tires of automobiles and the windows.

What is claimed is:

1. A container with a pump for discharging bubbles, comprising:

a container body having a neck portion; and a pump for discharging bubbles provided on the neck portion of the container body, the pump for discharging bubbles comprising:

(a) a cylinder for liquid in which a first piston slides;

(b) a cylinder for air in which a second piston slides;

(c) a pump head on which a nozzle is provided and which is connected to the first piston and the second piston so as to drive both the first and second pistons;

(d) a vapor-liquid mixing chamber in which liquid from the cylinder for liquid and air delivered from the cylinder for air are joined; and (e) a bubbling member provided between the nozzle and the vapor-liquid mixing chamber;

wherein liquid within the container body and outside air are joined in the vapor-liquid mixing chamber and the joined vapor-liquid is bubbled via the bubbling member so as to be discharged in a foamy state from the nozzle by depressing the pump head;

a closing device for opening and closing the nozzle, the closing device being provided on the nozzle of the pump head; and a coil spring that is provided within the cylinder for air and energizes the pump head in the direction away from the cylinder for air wherein the coil spring is not immersed in liquid.

2. The container with a pump for discharging bubbles according to claim 1, wherein the closing device has a slit provided on a front wall portion thereof.

3. The container with a pump for discharging bubbles according to claim 2, wherein the slit is Y-shaped.

4. The container with a pump for discharging bubbles according to claim 2, wherein the slit is cross-shaped.

5. The container with a pump for discharging bubbles according to claim 1, wherein the closing device has a plurality of slits formed in a radial shape provided on a front wall portion thereof.

6. A container with a pump for discharging bubbles, comprising:

a container body having a neck portion; and a pump for discharging bubbles provided on the neck portion of the container body, the pump for discharging bubbles comprising:

(a) a cylinder for liquid in which a first piston slides;

(b) a cylinder for air in which a second piston slides;

(c) a pump head on which a nozzle is provided and which is connected to the first piston and the second piston so as to drive both the first and second pistons;

(d) a vapor-liquid mixing chamber in which liquid from the cylinder for liquid and air delivered from the cylinder for air are joined; and (e) a bubbling member provided between the nozzle and the vapor-liquid mixing chamber;

wherein liquid within the container body and outside air are joined in the vapor-liquid mixing chamber and the joined vapor-liquid is bubbled via the bubbling member so as to be discharged in a foamy state from the nozzle by depressing the pump head;

a closing device for opening and closing the nozzle, the closing device being provided on the nozzle of the pump head;

a cylinder member comprising the cylinder for liquid and the cylinder for air, the cylinder for liquid and the cylinder for air being inserted into the container body from the neck portion and provided in an axial direction in a concentric arrangement, the cylinder member having a flange portion on the neck portion;

an attaching trunk that is provided on the neck portion and holds the flange portion of the cylinder member in cooperation with the neck portion;

the pump head forming a piston head that passes through the attaching trunk, the piston head being movable upward and downward within the attaching trunk, and in which pump head the nozzle is provided on a portion exposed from the attaching trunk;

a stem that has a hollow-cylinder-shape in which upper and lower ends are made open, the stem being received within the cylinder member such that the stem is movable upward and downward, an upper part of the stem being connected to the piston head so as to communicate with the nozzle, and an annular flange portion being provided on a portion of the stem received within the cylinder for air;

the first piston being circular, provided on the lower end of the stem, and arranged for sliding upward and downward in an air-tight manner on an internal surface of the cylinder for liquid;

the second piston being provided on an external surface of the stem such that the second piston is movable upward and downward with only a short stroke, the second piston closing the opening end of the cylinder for air and having a basic cylinder portion fitted into the external surface of the stem and a seal cylinder portion that slides upward and downward in a fluid-tight manner on the internal surface of the cylinder for air, the upper part of the basic cylinder portion being fitted to the lower part of the piston head in an air-tight manner, an air suction valve being provided on a connecting portion for connecting the basic cylinder portion to the seal cylinder portion and the lower part of the basic cylinder portion being connected to the flange portion of the stem in a fluid-tight manner;

a liquid suction valve suspended from the stem such that the upper part of the liquid suction valve is inserted into the stem so that the liquid suction valve is movable upward and downward, the liquid suction valve being movable upward and downward together with the stem by engaging with the stem, a lower part of the liquid suction valve being inserted into the cylinder for liquid such that the liquid suction valve is movable upward and downward to make the lower end function as a lower part valve body for opening and closing the liquid entrance of the cylinder for liquid;

a liquid discharge valve arranged on the upper part of the stem;

the bubbling member being disposed between the liquid discharge valve and the nozzle of the pump head;

the vapor-liquid mixing chamber being provided between the liquid discharge valve and the bubbling member;

an air passage being provided among the piston head, the stem and the basic cylinder portion of the second piston, such that the cylinder for air communicates with the vapor-liquid mixing chamber;

a liquid passage being formed among the liquid suction valve, the internal surface of the cylinder for liquid and the internal surface of the stem;

a coil spring that energizes the stem in the direction approaching the piston head; and a limitation mechanism that prevents the upward movement of the liquid suction valve against the cylinder for liquid when the stem is positioned at the upper limit, wherein a stroke from the starting of the downward movement of the pump head when the pump head positioned at the upper limit is depressed until the pump head is moved downward synchronously with the second piston is smaller than an opening-closing stroke of the lower-part valve body of the liquid suction valve.

7. The container with a pump for discharging bubbles according to claim 6, wherein the closing device has a slit provided on a front wall portion thereof.

8. A container with a pump for discharging bubbles, comprising:

a container body having a neck portion; and a pump for discharging bubbles provided on the neck portion of the container body, the pump for discharging bubbles comprising:

(a) a cylinder for liquid in which a first piston slides;

(b) a cylinder for air in which a second piston slides;

(c) a pump head on which a nozzle is provided and which is connected to the first piston and the second piston so as to drive both the first and second pistons;

(d) a vapor-liquid mixing chamber in which liquid from the cylinder for liquid and air delivered from the cylinder for air are joined; and (e) a bubbling member provided between the nozzle and the vapor-liquid mixing chamber;

wherein liquid within the container body and outside air are joined in the vapor-liquid mixing chamber and the joined vapor-liquid is bubbled via the bubbling member so as to be discharged in a foamy state from the nozzle by depressing the pump head;

a closing device comprising a cylinder body portion provided on the nozzle and a closing body which is provided on an end of the cylinder body portion via a hinge, such that the closing device swings on the hinge and opens and closes an end opening of the cylinder body portion, the closing device being provided on the nozzle of the pump head; and a coil spring which is provided within the cylinder for air and energizes the pump head in the direction away from the cylinder for air, wherein the coil spring is not immersed in liquid.

9. A container with a pump for discharging bubbles, comprising:

a container body having a neck portion; and a pump for discharging bubbles provided on the neck portion of the container body, the pump for discharging bubbles comprising:

(a) a cylinder for liquid in which a first piston slides;

(b) a cylinder for air in which a second piston slides;

(c) a pump head on which a nozzle is provided and which is connected to the first piston and the second piston so as to drive both the first and second pistons;

(d) a vapor-liquid mixing chamber in which liquid from the cylinder for liquid and air delivered from the cylinder for air are joined; and (e) a bubbling member provided between the nozzle and the vapor-liquid mixing chamber;

wherein liquid within the container body and outside air are joined in the vapor-liquid mixing chamber and the joined vapor-liquid is bubbled via the bubbling member so as to be discharged in a foamy state from the nozzle by depressing the pump head;

a closing device comprising a cylinder body portion provided on the nozzle and a closing body which is provided on an end of the cylinder body portion via a hinge, such that the closing device swings on the hinge and opens and closes an end opening of the cylinder body portion, the closing device being provided on the nozzle of the pump head;

a cylinder member comprising the cylinder for liquid and the cylinder for air, the cylinder for liquid and the cylinder for air being inserted into the container body from the neck portion and provided in an axial direction in a concentric arrangement, the cylinder member having a flange portion on the neck portion;

an attaching trunk that is provided on the neck portion and holds the flange portion of the cylinder member in cooperation with the neck portion;

the pump head forming a piston head that passes through the attaching trunk, the piston head being movable upward and downward within the attaching trunk, and in which pump head the nozzle is provided on a portion exposed from the attaching trunk;

a stem that has a hollow-cylinder-shape in which upper and lower ends are made open, the stem being received within the cylinder member such that the stem is movable upward and downward, an upper part of the stem being connected to the piston head so as to communicate with the nozzle, and an annular flange portion being provided on a portion of the stem received within the cylinder for air;

the first piston being circular, provided on the lower end of the stem, and arranged for sliding upward and downward in an air-tight manner on an internal surface of the cylinder for liquid;

the second piston being provided on an external surface of the stem such that the second piston is movable upward and downward with only a short stroke, the second piston closing the opening end of the cylinder for air and having a basic cylinder portion fitted into the external surface of the stem and a seal cylinder portion that slides upward and downward in a fluid-tight manner on the internal surface of the cylinder for air, the upper part of the basic cylinder portion being fitted to the lower part of the piston head in an air-tight manner, an air suction valve being provided on a connecting portion for connecting the basic cylinder portion to the seal cylinder portion and the lower part of the basic cylinder portion being connected to the flange portion of the stem in a fluid-tight manner;

a liquid suction valve suspended from the stem such that the upper part of the liquid suction valve is inserted into the stem so that the liquid suction valve is movable upward and downward, the liquid suction valve being movable upward and downward together with the stem by engaging with the stem, a lower part of the liquid suction valve being inserted into the cylinder for liquid such that the liquid suction valve is movable upward and downward to make the lower end function as a lower part valve body for opening and closing the liquid entrance of the cylinder for liquid;

a liquid discharge valve arranged on the upper part of the stem;

the bubbling member being disposed between the liquid discharge valve and the nozzle of the pump head;

the vapor-liquid mixing chamber being provided between the liquid discharge valve and the bubbling member;

an air passage being provided among the piston head, the stem and the basic cylinder portion of the second piston, such that the cylinder for air communicates with the vapor-liquid mixing chamber;

a liquid passage being formed among the liquid suction valve, the internal surface of the cylinder for liquid and the internal surface of the stem;

a coil spring that energizes the stem in the direction approaching the piston head; and a limitation mechanism that prevents the upward movement of the liquid suction valve against the cylinder for liquid when the stem is positioned at the upper limit, wherein a stroke from the starting of the downward movement of the pump head when the pump head positioned at the upper limit is depressed until the pump head is moved downward synchronously with the second piston is smaller than an opening-closing stroke of the lower-part valve body of the liquid suction valve.

* * * * *